United States Patent [19]

Iwamura et al.

[11] Patent Number: 5,321,752
[45] Date of Patent: Jun. 14, 1994

[54] METHOD OF AND APPARATUS FOR ENCRYPTION AND DECRYPTION OF COMMUNICATION DATA

[75] Inventors: Keiichi Iwamura, Kawasaki; Takahisa Yamamoto, Atsugi, both of Japan

[73] Assignee: Canon Kabushiki Kaisha, Tokyo, Japan

[21] Appl. No.: 941,236

[22] Filed: Sep. 4, 1992

[30] Foreign Application Priority Data

Sep. 5, 1991 [JP] Japan .................. 3-225986
May 18, 1992 [JP] Japan .................. 4-124982

[51] Int. Cl.$^5$ .................................. H04K 1/00
[52] U.S. Cl. ......................... 380/24; 380/28; 380/49
[58] Field of Search ............ 380/23, 24, 25, 28, 380/29, 30, 42, 48, 49, 50; 364/746

[56] References Cited

U.S. PATENT DOCUMENTS

| | | | |
|---|---|---|---|
| 4,514,592 | 4/1985 | Miyaguchi | 380/30 |
| 4,633,036 | 12/1986 | Hellman et al. | 380/30 |
| 4,870,681 | 9/1989 | Sedlak | 380/30 |
| 4,996,711 | 2/1991 | Chaum | 380/30 |
| 5,101,431 | 3/1992 | Even | 380/30 |
| 5,142,577 | 8/1992 | Pastor | 380/23 X |

OTHER PUBLICATIONS

Math of Computation, vol. 44, 1985, pp. 519–521, Montgomery, "Modular multiplication without trial division".
Eurocrypt '90, Advance in Cryptology, May 1990, pp. 230–244, Dusse et al.
"A Cryptographic Library for the Motorola DSP 56000", IEEE J. Solid State Cir., vol. 23, No. 1, Feb. 1988, pp. 204–207, Lu et al.
"A Programmable VLSI Architecture for Computing Multiplication etc.", Advances in Cryptology Crypto '90, pp. 619–624, Even Systolic Modular Multiplication.

*Primary Examiner*—Tod R. Swann
*Attorney, Agent, or Firm*—Fitzpatrick, Cella, Harper & Scinto

[57] ABSTRACT

A method and apparatus which enables a circuit of a small circuit scale to perform high-speed modular multiplication or modular exponentiation which are necessary in encryption or decryption in cryptic communication. To this end, modular multiplication $Q = A \cdot M \bmod N$ and modular exponentiation $C = M^e \bmod N$ are executed by repetition of computation of $Z = U \cdot V \cdot R^{-1} \bmod N$ employing an integer R which is prime to N. The repetition of computation is executed by repeatedly operating a single circuit or by simultaneously operating a plurality of circuits of the same construction in a parallel manner.

20 Claims, 30 Drawing Sheets

METHOD OF AND APPARATUS FOR ENCRYPTION AND DECRYPTION OF COMMUNICATION DATA

BACKGROUND OF THE INVENTION

1. Field of the Invention

The present invention relates to cryptographic scheme employed in various communication services using a computer network, such as home banking, firm banking, electronic mail service and electronic conference.

More particularly, the present invention is concerned with cryptographic scheme which conducts encryption of data to transmit and decryption of received cryptogram by using a computation in which two integers A and B are multiplied with each other and the product is divided by a third integer N to determine the residue, i.e., modular multiplication expressed by A·B mod N, as well as a computation known as modular exponentiation which is expressed by $C = M^e \bmod N(C, M, N, e)$, where E, M, N and e are integers and which is executed by repeating the above-mentioned modular multiplication.

Still more particularly, the present invention is concerned with a communication system which conducts cryptic communication by employing various cryptosystems such as RSA cryptosystem, ElGamal cryptosystem, DH type public key distribution system, ID-based key sharing cryptosystem and zero-knowledge certificate cryptosystem.

2. Description of the Related Art

In recent years, communication systems using computer networks have made a rapid progress, which has given a rise to the demand for cryptographic schemes employed for the purpose of protecting data contents. High-speed cryptographic schemes are essential in the current trends for greater capacity and higher communication speeds of networks.

Modular exponentiation and modular multiplication are very important computations which are used in various cryptographic schemes. For instance, these computations are used as follows.

It is known that criptosystem is classified into two types: namely, public-key criptosystem and common-key criptosystem. The public-key cryptosystem employs different keys for encryption and decryption. An encryption key is opened to public, while decryption key is kept confidential. With this system, it is easy to administrate keys but it is difficult to infer the decryption key from the opened encryption key. Cryptosystems which are based on modular exponentiation and modular multiplication, such as RSA cryptosystem and ElGamal cryptosystem are used most often as the public-key cryptosystem.

It has been noted that public-key cryptosystem has a specific use known as authentication, besides the confidential communication function. Authentication is a function to confirm whether the transmitter of a message is true and, hence, is referred to also as digital signature. The digital signature using a cryptosystem avoids any unjust transmission or forgery because the signature is put in terms of a secret key which is known only to the person who sends the message. This system is therefore broadly used as authenticated communication system in banking and financial businesses.

As a kind of common-key cryptosystem in which both the person who transmits the message and the person who receives the message commonly possess a key in confidence, known is barnum cryptosystem in which a random number is added to data. The random number used for such a purpose may be a random number known as square residue obtained on the basis of modular exponentiation and modular multiplication.

Such common-key cryptosystem and open-key cryptosystem are often used together with an art known as key distribution system or an art known as key-sharing system. Among various key distribution systems, most popular is DH type key distribution system proposed by Diffie and Hellman. This distribution system also employs modular exponentiation and modular multiplication. Meanwhile, ID-based key sharing system has been noticed among the key sharing systems. Modular exponentiation and modular multiplication are also employed in this key sharing system, as well as in most of other key sharing systems.

Cryptographic scheme also includes an art which is referred to as zero knowledge certificate. This art is to enable a person to make the opponent be convinced of the fact that the person actually possesses a knowledge, without disclosing at all the content of the knowledge, i.e., with zero knowledge. Various procedures based on modular exponentiation and modular multiplication are available in this art.

Under these circumstances, there has been an increasing demand for circuits which perform efficient modular exponentiation and modular multiplication, in order to make it possible to efficiently build up various cryptosystems. Such high-speed modular exponentiation and modular multiplication circuits also contribute to increase in the speed of various cryptosystems.

As a method of conducting modular multiplication computation using N as a modulus, a method is known which uses an integer R which is prime to N. For instance, Montgomery, P. L.: "Modular multiplication without trial division" Math. of Computation, Vol. 44, 1985, pp. 519–521 makes it possible to conduct modular multiplication without division, by computing $Q = A \cdot B \cdot R^{-1} \bmod N$ instead of computing $Q = A \cdot B \bmod N$.

Another technique for achieving higher processing speed is a method referred to as parallel processing, a typical example of architecture of which is systolic array as well known. Systolic array executes pipeline-based processing using a plurality of types of processing elements (PE), thus realizing a high-speed processing. Furthermore, the control can easily be conducted locally on PE basis. Thus, systolic array possesses both the regularity of the whole structure and locality on PE basis and is known as an architecture which facilitates construction of a large scale processing device such as a VLSI. The parallel processing is considered as being most suitable for speeding up of modular exponentiation and modular multiplication on a large integer which requires a very large scale of processing. Hitherto, however, almost no architecture has been proposed as to application of parallel processing technique such as systolic array for modular exponentiation and modular multiplication.

An array using Montgomery technique has been proposed by Even. (see Shimon Even: "Systolic modular multiplication, "Advances in Cryptology-CRYPTO'90, pp. 619–624, Springer-Verlag.)

In order to obtain sufficient security against cryptanalysis for a wrong purpose, the integer used in modular exponentiation and modular multiplication should have a large number of bits which is 512 or greater. Computational complexity for such a large integer is huge and cannot be dealt with at high speed by an ordinary computer.

Another problem is that, when modular exponentiation is executed by repetition of the Montgomery method, the maximum bit number of the output is progressively increased each time the modular multiplication is conducted, so that it is difficult to execute modular exponentiation by a single circuit. The array proposed by Even does not contain any suggestion concerning PE which would conduct processing when the bit number of the output of modular multiplication has exceeded the bit number of the input value and, hence, cannot fully perform modular exponentiation.

Furthermore, known Montgomery method requires, as will be detailed later, that separate computations are conducted on A, B and Q before computing $Q = A \cdot B \cdot R^{-1} \mod N$, thus necessitating a plurality of computing means.

In particular, the array proposed by Even is composed of an array which performs a multiplication $T = A \cdot B$ and an array which performs a modular multiplication $Q = T \cdot R^{-1} \mod N$ on R which is treated as a constant. Thus, the systolic array of Even was inefficient in that it essentially employ two types of arrays: one for computing T and other for computing Q. In addition, the systolic array proposed by Even has inferior adaptability because it performs only 1-bit based computation is performed in PE.

Thus, the known methods involve various drawbacks and cannot provide efficient modular multiplication circuit.

SUMMARY OF THE INVENTION

Accordingly, an object of the present invention is to provide a computing apparatus which can perform, with a circuit of a small scale, high-speed modular multiplication of an integer of a large figures, as well as a communication method which employs encryption/decryption by using the apparatus, thereby overcoming the above-described problems of the prior art.

Another object of the present invention is to provide a computing apparatus in which modular multiplication is performed by a plurality of processing elements of the same type so as to facilitate integration of the computing circuit.

Still another object of the present invention is to provide a method in which modular exponentiation and modular multiplication employed in cryptic communication is executed simply by repeating modular multiplication using R which is prime to N which is the residue.

A further object of the present invention is to provide a circuit which performs, in accordance with Montgomery method, high-speed modular exponentiation and high-speed modular multiplication with a reduced scale of the circuit.

According to one aspect of the present invention, there is provided a cryptic communication method using a communication apparatus which performs encryption or decryption of a communication content by executing a modular multiplication $A \cdot B \mod N$ of integers A and B by using N as the modulus, the communication apparatus having at least one computing unit which computes and outputs $Z = U \cdot V \cdot R^{-1} \mod N$ by using an integer R which is primer to N, the method comprising the steps of: inputting to one of the computing units A and a constant $R_R$ which is expressed by $R_R = R_2 \mod N$, thereby causing the computing unit to output $A_R = A \cdot R_R \cdot R^{-1} \mod N$; inputting to one of the computing units B and the constant $R_R$ thereby causing the computing unit to output $B_R = B \cdot R_R \cdot R^{-1} \mod N$; inputting to the computing unit the $A_R$ and $B_R$ thereby causing the computing unit to output $T_R = A_R \cdot B_R \cdot R^{-1} \mod N$; and inputting to the computing unit the $T_R$ and a constant 1 thereby causing the computing unit to output, as the Q, $T_R \cdot 1 \cdot R^{-1} \mod N$, whereby the modular multiplication $Q = A \cdot B \mod N$ is executed.

According to another aspect of the invention, there is provided a cryptic communication method using a communication apparatus which performs encryption or decryption of a communication content by using a modular exponentiation $C = M^e \mod N$ concerning integers M and e using N as the modulus, the communication apparatus having at least one communication unit which computes and outputs $Z = U \cdot V \cdot R^{-1} \mod N$ by using, with respect to input data U and V, an integer R which is primer to N, the method comprising the steps of: inputting to one of the computing units M and a constant $R_R$ which is expressed by $R_R = R^2 \mod N$, thereby causing the computing unit to output $M_R = M \cdot R_R \cdot R^{-1} \mod N$; representing the binary expression of e by $e = [e^t, e^{t-1}, \ldots, e^1]$, determining the values of $e^i$ starting from the lowest order bit; representing the initial value of $C_R$ by $R_R \cdot R^{-1} \mod N$, inputting $C_R$ and $M_R$ to one of the computing units when $e^i$ is determined to be equal to $e^i = 1$, thereby causing the computing unit to output $C_R \cdot M_R \cdot R^{-1} \mod N$ as a new $C_R$; determining whether i of the $e^i$ is greater than 1 or not; inputting, when i is greater than 1, $C_R$ as two input data to one of the computing unit, thereby causing the computing unit to output, as new value of $C_R$, $C_R \cdot C_R \cdot R^{-1} \mod N$; and after completion of processing on all $e^i$, inputting the $C_R$ and 1 as a constant to one of the computing units, thereby causing the computing unit to output, as the aimed C, $C = C_R \cdot 1 \cdot R^{-1} \mod N$, whereby the modular exponentiation $C = M^e \mod N$ is executed.

According to still another aspect of the present invention, there is provided a cryptic communication method using a communication apparatus which performs encryption or decryption of a communication content by using a modular exponentiation $C = M^e \mod N$ concerning integers M and e using N as the modulus, the communication apparatus having at least one communication unit which computes and outputs $Z = U \cdot V \cdot R^{-1} \mod N$ by using, with respect to input data U and V, an integer R which is primer to N, the method comprising the steps of: inputting to one of the computing units M and a constant $R_R$ which is expressed by $R_R = R^2 \mod N$, thereby causing the computing unit to output $M_R = M \cdot R_R \cdot R^{-1} \mod N$; representing the binary expression of e by $e = [e^t, e^{t-1}, \ldots, e^1]$, determining the values of $e^i$ starting from the highest order bit; representing the initial value of $C_R$ by $R_R \cdot R^{-1} \mod N$, inputting $C_R$ and $M_R$ to one of the computing units when $e^i$ is determined to be equal to $e^i = 1$, thereby causing the computing unit to output $C_R \cdot M_R \cdot R^{-1} \mod N$ as a new $C_R$; determining whether i of the $e^i$ is greater than 1 or not; inputting, when i is smaller than 1, $M_R$ as two input data to one of the computing unit, thereby causing the computing unit to output, as new value of $M_R$, $M_R \cdot M_R \cdot R^{-1} \mod N$; and after completion of processing on all $e^i$, inputting the $C_R$ and 1 as a constant to one of the computing units, thereby causing the computing unit to output, as the aimed C, $C = C_R \cdot 1 \cdot R^{-1} \mod N$, whereby the modular exponentiation $C = M^e \mod N$ is executed.

According to a further aspect of the present invention, there is provided a cryptic communication method which employs encryption or decryption of a communication content by employing a modular multiplication $Q = A \cdot B \mod N$ for input integers A and B using N as the modulus, the method comprising the steps of: computing $A \cdot R \mod N$ using the input A and an integer R which is primer to N, thus determining $A_R$ as the computation result; computing $B \cdot R \mod N$ using the input B and the R, thus determining $B_R$ as the computation result; computing $A_R \cdot B_R \cdot R^{-1} \mod N$ on the basis of the computing results $A_R$ and $B_R$ and the R, thus determining $T_R$ as the computation result; and computing $T_R \cdot R^{-1} \mod N$ on the basis of the $T_R$ and the R, thus determining the Q as the computation result; wherein the computation for determining the $T_R$ is executing by successively computing:

$$T_i = (T_{i-1} + A \cdot B_R \cdot Y + M_{i-1} \cdot N)/Y$$

$$M_{i-1} = (T_{i-1} \mod Y) \cdot (-N^{-1} \mod Y) \mod Y$$

wherein Y equals to $2^v$ and $A_i$ are sections of $A_R$ obtained by dividing $A_R$ for every v bits, where v is an optional integer.

According to a still further aspect of the present invention, there is provided a cryptic communication method which employs encryption or decryption of a communication content by employing a modular multiplication $Q = A \cdot B \mod N$ for input integers A and B using N as the modulus, the method comprising the steps of: computing $A \cdot R \mod N$ using the input A and an integer R which is primer to N, thus determining $A_R$ as the computation result; computing $B \cdot R \mod N$ using the input B and the R, thus determining $B_R$ as the computation result; computing $A_R \cdot B_R \cdot R^{-1} \mod N$ on the basis of the Computing results $A_R$ and $B_R$ and the R, thus determining $T_R$ as the computation result; and computing $T_R \cdot R^{-1} \mod N$ on the basis of the $T_R$ and the R, thus determining the Q as the computation result; wherein the computation for determining the $T_R$ is executing by successively computing:

$$T_i = (T_{i-1}/Y + A_i \cdot B_R \cdot) + M_i \cdot N$$

$$M_{i-1} = ((T_{i-1}/Y + A_i \cdot B_R) \mod Y) \cdot (-N^{-1} \mod Y) \mod Y$$

wherein Y equals to $2^v$ and $A_i$ are sections of $A_R$ obtained by dividing $A_R$ for every v bits, where v is an optional integer.

According to a still further aspect of the present invention, there is provided a communication apparatus which performs encryption or decryption of a communication content by executing a modular multiplication $A \cdot B \mod N$ of integers A and B by using N as the modulus, the communication apparatus comprising: first computing means for computing $A_R = A \cdot R_R \cdot R^{-1} \mod N$, upon receipt of A and a constant $R_R$ which is expressed by $R_R = R_2 \mod N$, where R is an integer primer to N; second computing means for computing $B_R = B \cdot R_R \cdot R^{-1} \mod N$ upon receipt of the constant $R_R$ and B; third computing means for computing $T_R = A_R \cdot B_R \cdot R^{-1} \mod N$ upon receipt of $A_R$ and $B_R$ output from the first and second computing means; and fourth computing means for computing $T_R \cdot 1 \cdot R^{-1} \mod N$ and outputting the computation result as the Q, upon receipt of $T_R$ output from the third computing means and a constant 1.

According to a still further object of the present invention, there is provided a communication apparatus which performs encryption or decryption of a communication content by using a modular exponentiation $C = M^e \mod N$ concerning integers M and e using N as the modulus, the communication apparatus comprising: first computing means for computing $M_R = M \cdot R_R \cdot R^{-1} \mod N$ upon receipt of M and a constant $R_R$ which is expressed by $R_R = R^2 \mod N$; first determining means for determining the values of $e^i$ starting from the highest order bit, wherein the binary expression of e is expressed by $e = [e^t, e^{t-1}, \ldots, e^1]$; storage means for updating and storing the value of $C_R$ by using $C_R = R_R \cdot R^{-1} \mod N$ as the initial value; second computing means which receives the $C_R$ stored in the storage means and $M_R$ computed by the first computing means when $e^i$ is determined to be equal to $e^i = 1$, thereby causing the computing unit to output $C_R \cdot M_R \cdot R^{-1} \mod N$ as a new $C_R$; second determining means for determining whether i of $e^i$ is greater than 1; third computing means for receiving $C_R$ when i is determined by the second determining means to be greater than 1, and outputting, as new value of $C_R$, $C_R \cdot C_R \cdot R^{-1} \mod N$; and fourth computing means which computes, upon receipt of Cr stored in the storage means and 1 as a constant, $C = C_R \cdot 1 \cdot R^{-1} \mod N$ after completion of computations performed by the second and third computing means on all the values of $e^i$, thereby outputting the computation result as the C.

According to a still further aspect of the present invention, there is provided a communication apparatus which performs encryption or decryption of a communication content by using a modular exponentiation $C = M^e \mod N$ concerning integers M and e using N as the modulus, the communication apparatus comprising: first computing means for computing $M_R = M \cdot R_R \cdot R^{-1} \mod N$ upon receipt of M and a Constant $R_R$ which is expressed by $R_R = R^2 \mod N$; first determining means for determining the values of $e^i$ starting from the lowest order bit, wherein the binary expression of e is expressed by $e = [e^t, e^{t-1}, \ldots, e^1]$; first storage means for updating and storing the value of $C_R$ by using $C_R = R_R \cdot R^{-1} \mod N$ as the initial value; second storage means for updating and storing the value of $M_R$ using the output of the first computing means as the initial value; second computing means which receives the $C_R$ stored in the first storage means and $M_R$ computed by the first computing means when $e^i$ is determined to be equal to $e^i = 1$, thereby causing the computing unit to output $C_R \cdot M_R \cdot R^{-1} \mod N$ as a new $C_R$; second determining means for determining whether i of $e^i$ is smaller than t; third computing means for receiving $M_R$ stored in the second storage means when i is determined by the second determining means to be smaller than t, and outputting, as new value of $M_R$, $M_R \cdot M_R \cdot R^{-1} \mod N$; and fourth computing means which computes, upon receipt of Cr stored in the first storage means and 1 as a constant, $C = C_R \cdot 1 \cdot R^{-1} \mod N$ after completion of computations performed by the second and third computing means on all the values of $e^i$, thereby outputting the computation result as the C.

Other objectives and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE INVENTION

FIGS. 15 to 17 and 19 are illustrations of examples of PE which performs modular multiplication for RSA cryptosystem;

DESCRIPTION OF THE PREFERRED EMBODIMENTS

Cryptic Communication System

Figure 1:
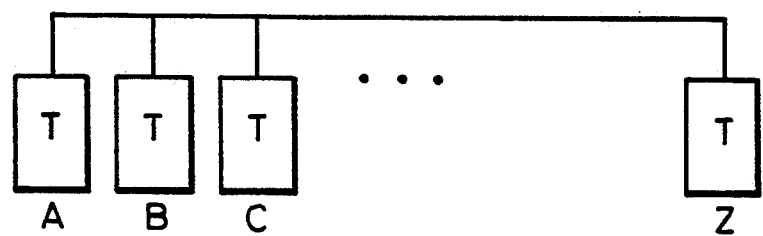
FIG. 1 is an illustration of an example of a communication network comprising a communication system which employs a cryptosystem.

A description will be given of a cryptic communication system in a communication network shown in FIG. 1. The connection diagram of FIG. 1 shows a local communication network such as a LAN (Local Area Network) or a large-area communication network such as telephone communication network. Symbols A to Z indicate users to each of whom is allocated a communication apparatus or terminal T for connection to the network. An encryption apparatus is adapted to encrypt received information and outputs the encrypted information. For instance, the arrangement may be such that each communication terminal T incorporates the encryption apparatus so that encrypted information is output from each terminal T or such that the encryption apparatus is connected between each terminal T and the network so that the output of the communication terminal T is delivered to the network after encryption. The encryption apparatus also may be incorporated in an apparatus which is connected to each communication terminal T and which delivers information to the associated communication terminal T. It is not essential that the encryption apparatus is always connected to the communication terminal. Namely, the arrangement may be such that the encryption apparatus is incorporated in a portable device such as an IC card so that it may be optionally connected when required to the communication terminal T or an apparatus connected to the terminal T. By using such an encryption apparatus, it is possible to conduct criptic communication such as a confidential communication, an authentication communication, key sharing or zero knowledge certificate communication.

This encryption apparatus necessitates a modular multiplication circuit or a modular exponentiation circuit. Such a circuit may be a later-mentioned modular exponentiation circuit of the type which, upon receipt of a plain text M, outputs a cryptogram $C = M^e \bmod N$, where e and N are values which are input separately from the message M or stored beforehand in a memory. In such a case, the modular exponentiation apparatus itself constitutes the encryption apparatus. In case of a confidential communication, decryption may be performed by a similar encryption apparatus which performs a computation $M = C^d \bmod N$ which is reverse to the above-mentioned encryption computation.

The arrangement also may be such that the modular multiplication circuit or the modular exponentiation circuit is constructed as a part of the encryption apparatus. In such a case, the circuit conducts the computation on information input to the encryption apparatus from the exterior or on the result of a processing performed by another processing unit incorporated in the same encryption apparatus.

An access to a recording medium such as a magnetic disk may be regarded as a kind of communication. In this case, the accessing device which makes access to the recording medium is considered as being a communication terminal. A storage system, therefore, also can utilize a cryptosystem by employing the circuit of the invention, as is the case of ordinary communication system.

A description will now be given of a communication method using RSA cryptosystem. Encryption and decryption are respectively represented by the following formulae:

Encryption: $C = M^e \bmod N$

Decryption: $M = C^d \bmod N$ wherein M represents a plain text to be transmitted, C indicates a cryptogram, e indicates an encryption key opened to public, d indicates a decryption key and N represents a modulus which is opened to public.

Thus, encryption and decryption of RSA cryptosystem can be executed modular exponentiation circuits which have constructions similar to each other. The following description, therefore, mainly refer to encryption.

The modular multiplication $C = M^e \bmod N$ may be conducted simply by repeating modular multiplication of two numbers. When M and e are large, however, the amount of computation becomes huge. According to the invention, therefore, computation is executed in accordance with the following algorithm. In the algorithm shown below, e is an integer having k bits and is expressed by:

$e = e_k, e_{k-1}, \ldots, e_2, e_1.$

Algorithm B
    INPUT M, e, M           (input)

-continued

```
C = 1                              (initial set)
For i = k to 1
    If e_i = 1 Then C = C · M mod N  (coputation 1)
    If i > 1 Then C = C · C mod N    (coputation 2)
Next
```

In this case, therefore, the modular exponentiation is conducted by repeating modular multiplication $C = C \cdot B$ mod N (B is M or C). An example of a circuit which efficiently performs this modular multiplication will be described hereinunder.

Example of Construction of Modular Multiplication Circuit

The following description is based upon an assumption that a condition of $n_a = n_b = n_n = n \cdot m$ exists, for the purpose of simplification of explanation. Computation of $A \cdot B \mod N = R$, where A, B and N are integers having $n \cdot m$ bits, is conducted as follows. A multiplicator which performs a multiplication $a \cdot b = c$ (a and b are integers of small figures of m bits) can be realized by a known device such as, for example, a ROM.

Each of A, B and N are divided by n into n sections each being of m bits. A, B and N are then expressed as follows:

$$A = A_{n-1} \cdot X^{n-1} + A_{n-2} \cdot X^{n-2} + \ldots + A_1 \cdot X + A_0$$

$$B = B_{n-1} \cdot X^{n-1} + B_{n-2} \cdot X^{n-2} + \ldots + B_1 \cdot X + B_0$$

$$N = A_{n-1} \cdot X^{n-1} + N_{n-2} \cdot X^{n-2} + \ldots + N_1 \cdot X + N_0$$

It is assumed that X equals to $2^m$, i.e., $X = 2^m$, and and the bit serieses formed by dividing A, B and N for every m bits from the upper figure are represented by $A_{n-i}$, $B_{n-i}$ and $N_{n-i}$ (i = 1 ... n), respectively. Under such conditions, A, B and N can be regarded as polynominals, so that $R = A \cdot B \mod N$ can be expressed as follows.

$$R = A \cdot B - Q \cdot N (Q = [A \cdot B / N])$$

where [Z] represents the greatest one of integers which do not exceed Z.

It is therefore possible to determine R in accordance with the following procedure.

```
Algorithm C
R_0 = 0
    For j = 1 to n
        R_j = R_{j-1} · X + A_{n-j} · B − Q_{j-1} · N
            = R_{j-1} · X + A_{n-j} · B + E_{j-1} − L_{j-1} · X
    Next,
    If R_n > N then R_n = R_n − Q_n · N
on conditions of:
    L_{j-1} = [R_{j-1} · X/X^n] = [R_{j-1}/X^{n-1}]
    Q_{j-1} = [L_{j-1} · X^n/N], Q_n = [R_n/N]
    L_{j-1} · X^n = Q_{j-1} · N + E_{j-1} (E_{j-1} < N)
```

The algorithm C executes mod N for the value $L_{j-1} \cdot X_n$ of the term $R_{j-1} \cdot X$ which exceeds the greatest figure $X^{n-1}$ of N, in order to eliminate necessity for determination of $R > N$. Namely, mod N computation is executed on the coefficient of R which has exceeded $X^{n-1}$ in terms of bit number, so that it is not necessary to determine whether the condition $R > N$ is met.

Furthermore, instead of execution of $-Q_{j-1} \cdot N$ which is $L_{j-1} \cdot X^n$ mod N, subtraction of $L_{j-1} \cdot X^n$ and addition of $E_{j-1}$ as the residue are conducted. That is, $L_{j-1}$ is converted into $E_{j-1}$ and the thus obtained $E_{j-1}$ is added. By this method, all the subtractions made by mod N can be carried out by adding computations. In this case, however, it is necessary to finally conduct computation of $R_n = R_n - Q_n \cdot N$ upon determining $R_n > N$. Such computation, however, is executed finally after completion of the repetition of the above-described computation. This final computation can be executed by, for example, as separate circuit since it need not be conducted in the course of repetition of the above-mentioned computation. Thus, the necessity for this final computation does not affect the processing speed of the whole system.

As the next step, in order to eliminate any delay due to computation of $R_j$, $R_j$ in the algorithm C is divided into $R_{j,n-1}$ and B also is divided into $B_{n-i}$, thus providing the next algorithm D.

```
Algorithm D
    For i = 0 to n
        R_{j,n-1} = D_{j-1,n-i-1} + C_{j-1,n-i-2} +
                   dw_m (A_{n-j} · B_{n-i}) + up_m (A_{n-j} · B_{n-i-1}) +
                   E_{j-1,n-i}

D_{j,n-1} = dw_m (T_{j,n-1})
        C_{j,n-i} = up_m (R_{j,n-i})
    Next
wherein
    R_{j-1,n} · X_n = Q_{j-1} · N + E_{j-1}, Q_{j-1} = [R_{j-1,n} · X^n/N]   (1)
    E_{j-1} = E_{j-1,n-1} · X^{n-1} + E_{j-1,n-2} · X^{n-2} + ... +        (2)
              E_{j-1}, 1 · X + E_{j-1}, 0
    D_{0,n-i-1} = C_{0,n-i-2} + E_{0,n-1} = B_n = B_{-1} = 0,
    and
```

$dw_m (Z)$ represents Z value of figures not greater than $2^m$, while $up_m$ represents a value obtained by dividing, by $2^{m+1}$, Z value not smaller than $2^{m+1}$.

The algorithms C and D are basically the same but the algorithm approximates the operation of the actual circuit more closely than the algorithm C.

Structural Example of Encryption/Decryption Apparatus

Then, an encryption/decryption apparatus which encrypts/decrypts data using the aforesaid algorithms will now be described. Assuming that a plain text to be communicated is M, a cryptogram is C, a public cryptogram key is e, a decryption key is d, and a public modulo is N, the encryption and the decryption of the RSA cryptograph are expressed by the following modular exponentiations:

Encryption: $C = M^e \mod N$

Decryption: $M = C^d \mod N$

Figure 2:
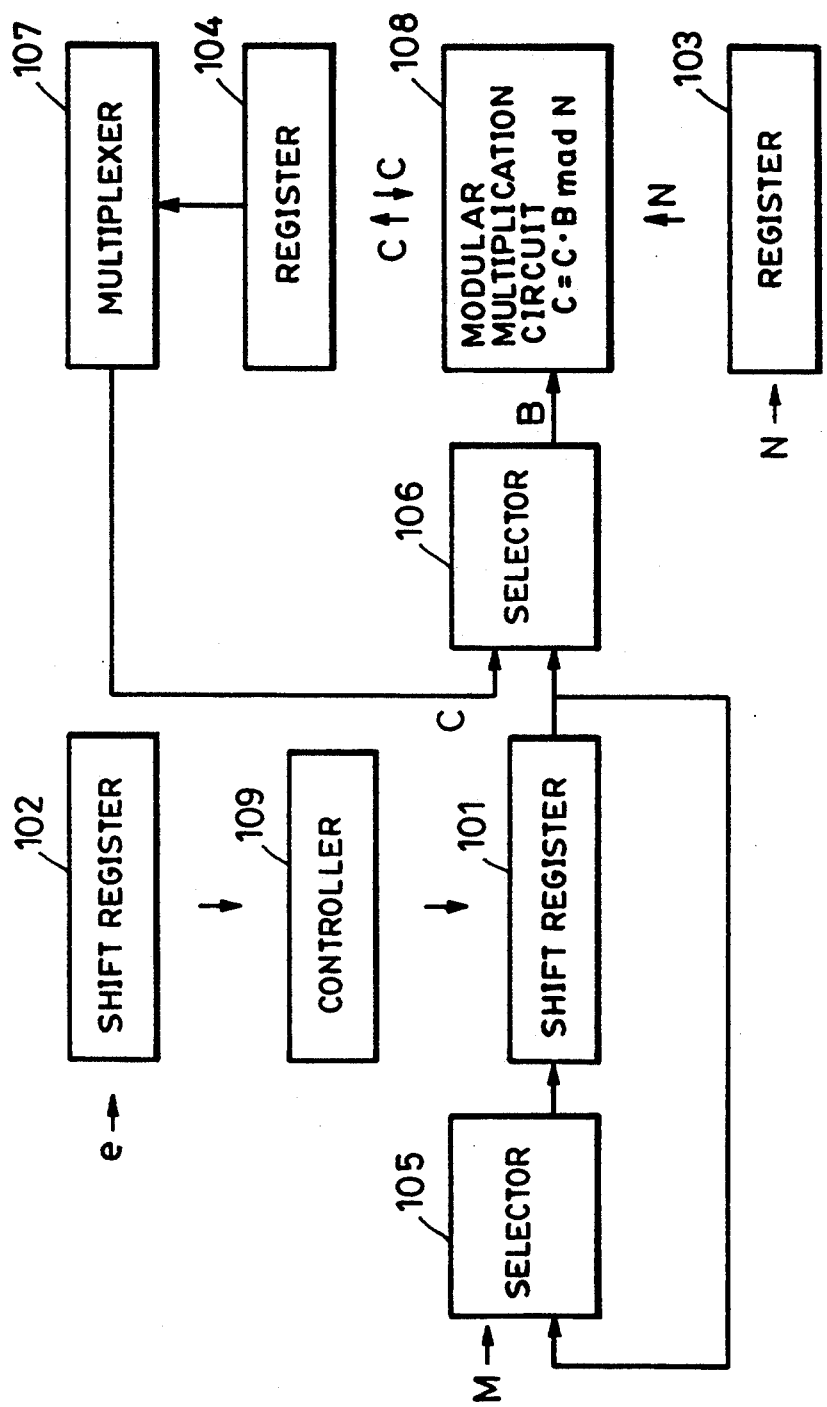
FIG. 2 is an illustration of an example of encryption/decryption apparatus.

The modular exponentation: $C = M^e \mod N$ is calculated in accordance with the aforesaid Algorithm B Therefore, the modular exponentation can be realized by repeating the modular multiplication $C = C \cdot B \mod N$ (B is M or C). A circuit capable of efficiently executing the algorithm is shown in FIG. 2. Referring to FIG. 2, reference numerals 101 and 102 represent shift registers for respectively storing the values of M and e. Reference numerals 103 and 104 represent registers for respectively storing the values of N and C. Reference numerals 105 and 106 represent select switches for selecting the inputs and 107 represents a multiplexer for selecting the value of C in the register 104 for each m bits (m is an arbitrary integer) from the upper digits to transmit it in serial. Reference numeral 108 represents a modular multiplication circuit for executing the calculation C=C·B mod N and arranged as shown in FIGS. 1 to 10. Reference numeral 109 represents a controller for discriminating whether or not $e^i=1$ or $i>1$ to control calculations 1 and 2 of the Algorithm B or controlling a clear signal or a preset signal for the selector and the register at the time of the receipt of the signal or the initialization. The controller 109 can easily be formed by a counter, a ROM and some logic circuits.

Then, the operation of the circuit shown in FIG. 2 will now be described.

The circuit receives plain text M, public key e and public modulo N. Therefore, M, e and N are in serial or parallel supplied to the register 103. At this time, the selector 105 selects M to supply M to the register 101. Simultaneously, initialization is performed in such a manner that C=1 by the clear signal or the preset signal for the register as an alternative to supplying the value of C to the register 104.

After the input and the initialization has been completed, the modular multiplications in accordance with the calculations 1 and 2 are commenced. The difference between the calculation 1 and the calculation 2 lies in a fact that B is M or C in the modular multiplication C=C·B mod N. Therefore, in a case where the calculation 1 is executed, the selector 106 selects serial output M for each m bits from the register 101. In a case where the calculation 2 is executed, the selector 106 selects serial output C for each m bits from the multiplexer 107. The serial output M for each m bits from the shift register 101 is again supplied to the shift register 101 via the selector 105. The modular multiplication circuit 108 are constituted and operated as described above. The output C from the modular multiplication circuit 108 is, in parallel, supplied to the register 104 so as to be used in the next residue multiplication, so that the calculations 1 and 2 are efficiently repeated. If the apparatus is arranged to receive C and d in place of M and e, a cryptogram can be decrypted.

Parallelizing the Calculating Circuit with Processing Element

```
Algorithm H
FOR j = 1 TO n
FOR i = 1 TO n
R_{j,n-i} = D_{j-1,n-i} + C_{j-2,n-i} + dW_m (A_{n-j} * B_{n-i}) +
            Up_m (A_{n-j-1} * B_{n-i}) + E_{j-1,n-i}
  D_{j,n-i} = dW_m (R_{j,n-i})
  S_{j,n-i} = up_m (R_{j,n-i})
  C_{j,n-i} = S_{j,n-i}
NEXT
NEXT
where R_{j-1,n}*X^n = Q_{j-1}*N + E_{j-1},Q_{j-1} =
```

-continued $[R_{j-1,n}*X^n/N]$
$E_{j-1} = E_{j-1,n-1}*X^{n-1} + E_{j-1,n-2}*X^{n-2} + \ldots + E_{j-1,1}*X + E_{j-1,0}$
$D_{0,n-i-1} = C_{0,n-i-2} = E_{0,n-1} = B_n = B_{-1} = 0$
$dW_m (Z)$: value smaller than $2^m$ digit of Z
$up_m (Z)$: value obtained by dividing a value larger than $2^{m+1}$ of Z by $2^{m+1}$ Although Algorithm H and Algorithm C are basically the same, Algorithm H is more suitable to parallelize the circuit. Algorithm H is executed by a circuit shown in FIGS. 3 and 4.

Figure 3:
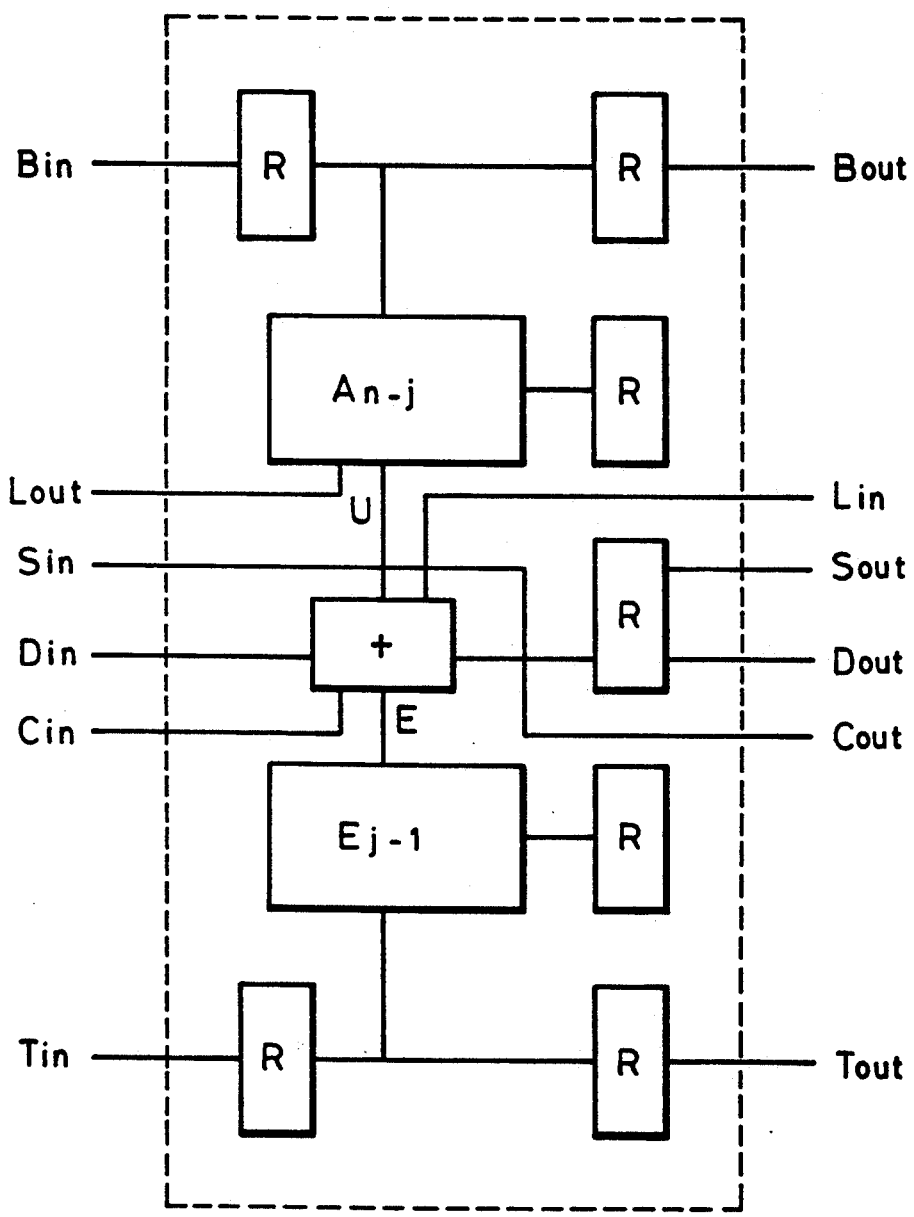
FIGS. 3, 12, 19, 24, 27, 29, 33 and 35 are illustrations of circuits of processing element (PE) which conducts modular multiplication.

FIG. 3 illustrates a circuit for executing basic calculation $R = R*X + A_{n-j}*B$ mod N of the residue multiplication and called a basic operator (processing element which is abbreviated to "PE" hereinafter).

Specifically, it performs calculation $R_{j,n-i} = D_{j-1,n-i} + C_{j-2,n-i} + dW_m (A_{n-j}*B_{n-i}) + up_m (A_{n-j-1,B-n-i}) + E_{j-1,n-i}$ as shown in Algorithm H.

Figure 4:
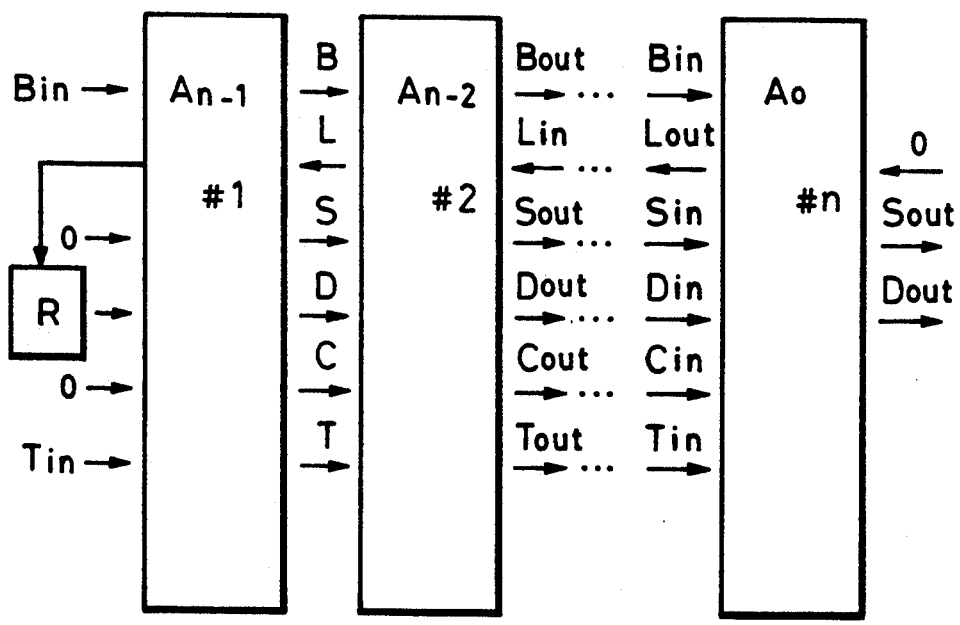
FIGS. 4 to 10, 13, 14, 18, 25, 28, 30, 31, 34, 36 and 37 are illustrations of examples of computing apparatus which employ PEs.

FIG. 4 illustrates a structure the overall body of which is formed into a so-called systolic array. The systolic array performs the calculation by a pipeline processing by PEs which are small and same functional blocks.

The PE is formed as shown in FIG. 3. The PE shown in FIG. 3 comprises a m*m-bit multiplier for calculating $A_{n-j}*B_{n-i}$, ROMs for respectively transmitting the value of $E_{j-1,n-1}$ from the value of $R_{j-1,n}$ in accordance with Equations (6) and (7), n+1 pieces of 4-input m-bit adders each having a 2-bit carry or 5-input adders, a m+2 bit register for storing $R_{j,n-i}$ (i=1, ..., n) registers for respectively storing $A_{n-i}$, $Q_{j-1}$ and a two-stage register for delaying $B_{n-i}$, $T_{n-i}$.

The lower m bits of this register means the lower m digits $(dW_m (R_{j,n-i}) = D_{j,n-i})$ of $R_{j,n-i}$, while the upper 2 bits means a value $(up_m (R_{j,n-i}) - S_{j,n-i})$ larger than m+1 digit of $R_{j,n-i}$. As a result, the carry for each adder can be absorbed at each clock by $S_{j,n-i}$. Furthermore, $S_{j,n-i}$ is made to be $C_{j,n-i}$ at the right PE before it is, as a carry, added together with the lower m bits of the right register in the second PE counted in the right direction. Therefore, the delay time generated due to the calculation of Rj performed in accordance with Algorithm C can be eliminated.

As described above, $D_{j,n-i}$, $R_{j,n-i}$ and $C_{j,n-i}$ respectively show the state of the register, where subscript i means the clock and j represent the sequential order in FIG. 4. Therefore, the position of the PE from j=1 (#1) to j=n (#n) from right to left is indicated.

Then, the operations of the structures shown in FIGS. 3 and 4 will now be described. Then, a description will be made about a timing chart of circuits shown in FIGS. 3 and 4 in a case where n=4.

```
#1:  L out   |AB6|AB5|AB4|AB3|  0  |  0  |AB6|AB5|AB4|AB3|
     B in    | B3 | B2 | B1 | B0 |  0  | B3 | B2 | B1 | B0 |  0  |
     U(A3)   |AB7|AB6|AB5|AB4|  0  |  0  |AB6|AB5|AB4|  0  |
     P       |  0                  |  0                    |
     E j-1   |  0                  |  0                    |
     D out           | D7 | D6 | D5 | D4 | D3 | D7 | D6 | D5 | D4 | D3 |
     S out           |  0 | S7 | S6 | S5 |  0 |  0 | S7 | S6 | S5 | S4 |

#2:  L out   |AB5|AB4|AB3|AB2|  0  |  0  |AB5|AB4|AB3|AB2|
     B in    | B3 | B2 | B1 | B0 |  0  | B3 | B2 | B1 | B0 |  0  |
     U(A3)   |AB6|AB5|AB4|AB3|  0  |AB6|AB5|AB4|AB3|  0  |
     P       |D7+S7                |D7+S7                  |
     E j-1   | E6 | E5 | E4 | E3 |  0 | E5 | E4 | E3 | E2 |  0 |
     D out           | D6 | D5 | D4 | D3 | D2 | D6 | D5 | D4 | D3 |
```

-continued

| | | | | | | | | | | |
|---|---|---|---|---|---|---|---|---|---|---|
| C out | | 0 | 0 | C6 | C5 | 0 | 0 | 0 | C6 | C5 | C4 |
| S out | | 0 | S7 | S6 | S5 | S4 | 0 | S7 | S6 | S5 | S4 |

3:
| | | | | | | | | | | |
|---|---|---|---|---|---|---|---|---|---|---|
| L out | | | 0 | AB4 | AB3 | AB2 | AB1 | 0 | AB4 | AB3 |
| B in | | | B3 | B2 | B1 | B0 | 0 | B3 | B2 | B1 |
| U(A3) | | | AB5 | AB4 | AB3 | AB2 | 0 | AB5 | AB4 | AB3 |
| P | | | S7;D6+S6 | | | | | S7;D6+C6 | | |
| E j−1 | | | E5 | E4 | E3 | E2 | 0 | E4 | E3 | E2 |
| D out | | | | D5 | D4 | D3 | D2 | D1 | D5 | D4 |
| C out | | 0 | 0 | C5 | C4 | 0 | 0 | 0 | C5 | C4 |
| S out | | | | S6 | S5 | S4 | S3 | 0 | S6 | S5 |

4:
| | | | | | | | | | | |
|---|---|---|---|---|---|---|---|---|---|---|
| L out | | | 0 | AB4 | AB3 | AB2 | AB1 | 0 | | |
| B in | | | B3 | B2 | B1 | B0 | 0 | B3 | | |
| U(A3) | | | AB5 | AB4 | AB3 | AB2 | 0 | AB4 | | |
| P | | | S6;D5+S5 | | | | | S6;D | | |
| E j−1 | | | E4 | E3 | E2 | E1 | 0 | E3 | | |
| D out | | | | D4 | D3 | D2 | D1 | D0 | | |
| C out | | 0 | 0 | C4 | C3 | 0 | 0 | 0 | | |
| S out | | | | S5 | S4 | S3 | S2 | 0 | | |

The initial state of each register shown in FIGS. 3 and 4 is 0.

When B is supplied from Bin at the first pE (j=1) for each m bits in an order $B_3, \ldots, B_0$, the multiplier, which receives their values, sequentially transmits $A_3 {}^* B_{n-i}$ (i=1, ..., 4). For example, $A_3 {}^* B_3$ is the coefficient of $X^6$ in terms of the multiplication of a polynomial and as well as it includes the coefficient of $X^7$ since the aforesaid output is 2 m bits. Therefore, the output from the multiplier divided into upper and lower m digits is expressed by $AB_i$ (i=7, ..., 4) in the aforesaid chart because outputs U of the upper m bits are the coefficients of $X^7$ to $X^4$. Since outputs Lout of the lower m bits are the coefficients of $X^6$ to $X^3$, it is expressed by $AB_i$ (i=6, ..., 3).

The upper m-bit outputs U are supplied to the adders of the same PE, while the lower m-bit outputs Lout are temporarily delayed by one clock by an external register to be $D_{0,n-i}$, and then it is added by the adder of the No. 1 PE. Furthermore, this adder adds feedback output Lout supplied from a No. 2 PE to be described later to supply the result of this to a register (R1,n−i). At this time, the lower m bits of $R_{1,n-i}$ (i=1, ..., 4) is, as $D_{1,n-i}$ transmitted to the next PE. On the other hand, m+1 bits or more, which are the carries, are transmitted as $S_{1,n-i}$ to pass through the next PE before it is transmitted to the second PE counted in the forward direction as $C_{1,n-i}$. Since $D_{1,n-i}$ and $C_{1,n-1}$ are the coefficients of $X^7$ to $X^4$ and $X^4$ to $X^5$ in terms of the coefficient of the polynomial, they are expressed by $D_k$ (k=7, ..., 4) and $C_k$ (k=7, ..., 5). In the aforesaid chart, other signals are as well as expressed by using the coefficient of the polynomial. Furthermore E0,n−i expressing the residue is 0 and each $T_{n-i}$ (i=1, ..., 4) which is the timing of the residue is delayed by 2 clocks by the register before it is transmitted to the next PE.

When B is similarly supplied to the next PE (j=2) at j=1, $A_2 {}^* B_{n-i}$ (i=1, ..., 4) is transmitted from the multiplier for each upper and lower m bits. At this time the lower m bits are, as Lout, fed back to the No. 1 PE.

When the result of an addition of D7 and S7 supplied from the No. 1 PE is, as R1,n, stored in a register P. Then, the value of $E_{j-1}$ obtained from Equation (1) is synchronized with $T_{n-i}$ so as to be sequentially transmitted from the ROM as $E_{1,n-1}$ to the adder. The result of this is, as $R_{2,n-1}$, supplied to the register so as to be transmitted to the next PE as $D_k$ and $S_k$.

When B is supplied at the next PE (j=3), $A_1 {}^* B_{n-i}$ (i=1, ..., 4) is transmitted from the multiplier for each uppe and lower m bits before U, Lout, Din and $E_{j-1}$ are added similarly to the former PE. Furthermore, $C_{1,n-1}$, which is the carry from the second former PE, is added, so that the calculations in the Algorithm H are performed. Since U, Lout, Din and $E_{j-1}$ respectively are m bits, the output from the adder is m+2 bits. Therefore, the register of $R_{j,n-i}$ must have m+2 bits. If the carry bit is 2 bits, the output from the adder is m+2 and is therefore not changed if it is added to the adder as a carry.

At the next PE (j=4), an operation similar to that when J=3 is performed. As a result, the value stored in each register is Rn.

Embodiment 2 of Modular Multiplying Circuit Having PE

Figure 5:
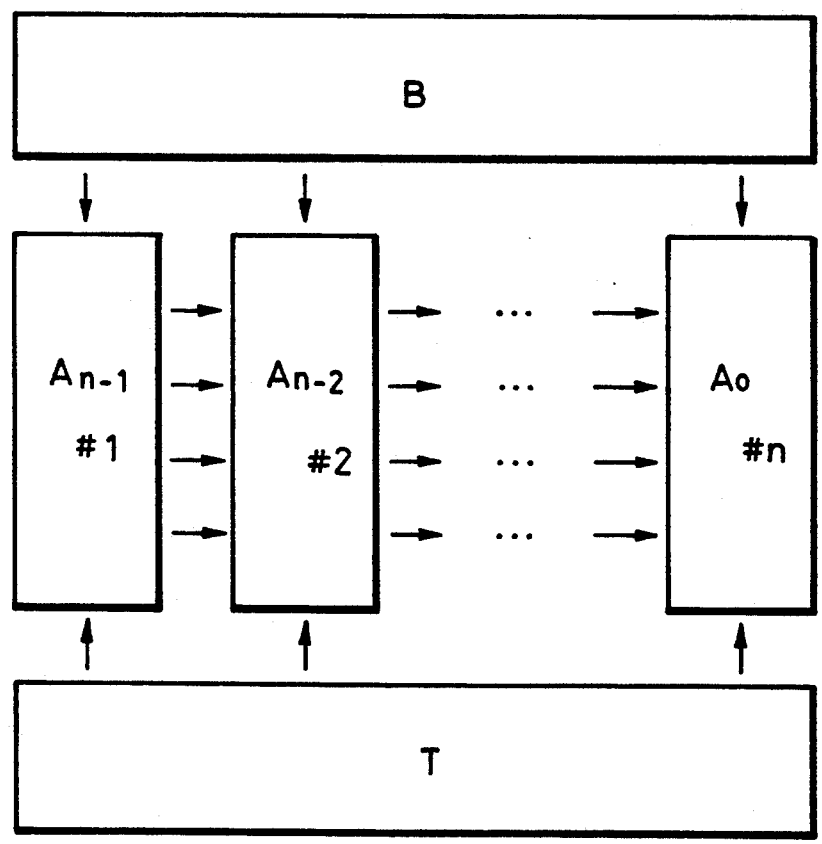
Figure 6:
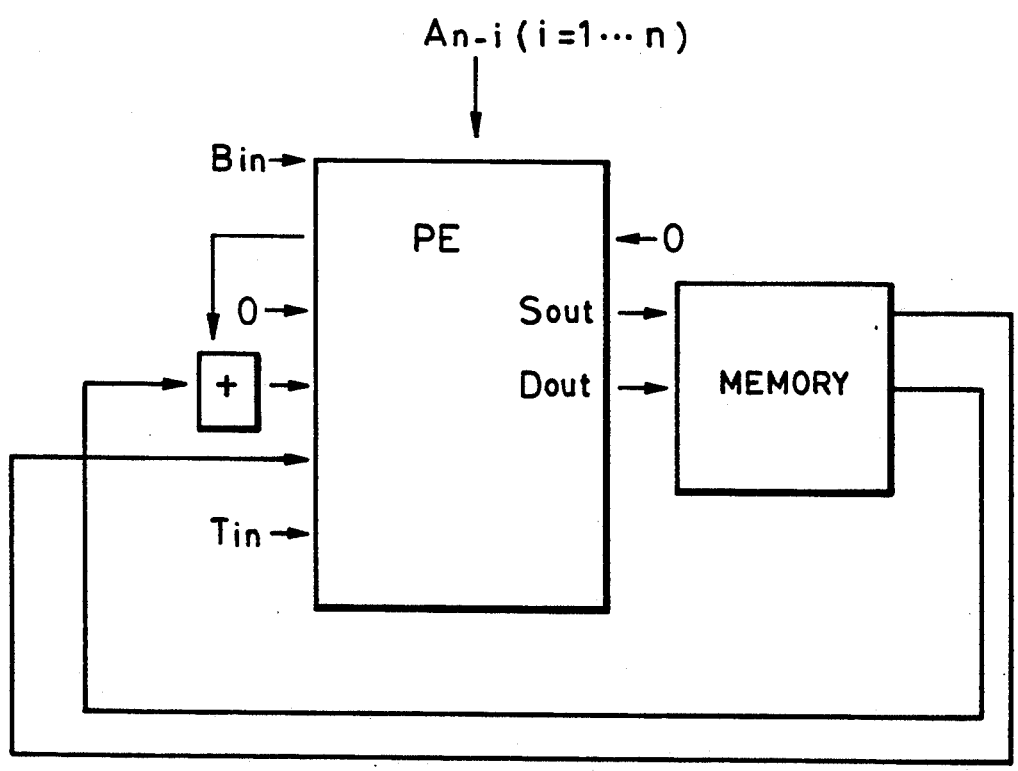

The four registers which receive Bin and Tin in the PE shown in FIG. 3 act only to delay the inputs Bin and Tin by 2 clocks. Therefore, the overall size of the circuit can be reduced by arranging the structure in such a manner that four output registers which concern B and T are omitted from the PE shown in FIG. 3 and the values of B and T are stored in different shift registers as shown in FIG. 5 to sequentially supply them to each PE at every three registers.

Embodiment 3 of Modular Multiplying Circuit Having PE

Since the calculations to be performed in all of the PEs are the same, a structure may be employed in which $A_{n-1}$ is set to PE, B is supplied to perform the calculation, the output from the PE is temporarily stored in a memory, $A_{n-2}$ is reset to the same PE immediately after the operation of the PE has been completed to feed back the outputs from the B and the memory to perform the calculations and the calculations about the $A_{n-i}$ (i=3, ..., n) are repeated, so that the residue multiplication can be performed by one PE. Since the number of the feedback operations can be decreased to 1/p, the processing speed can be multiplied by p times. Therefore, in the aforesaid method, the size of the circuit and the processing speed can arbitrarily and easily traded off depending upon the number of the PEs. Then, a method in which the feedback is used will now be described.

Figure 7:
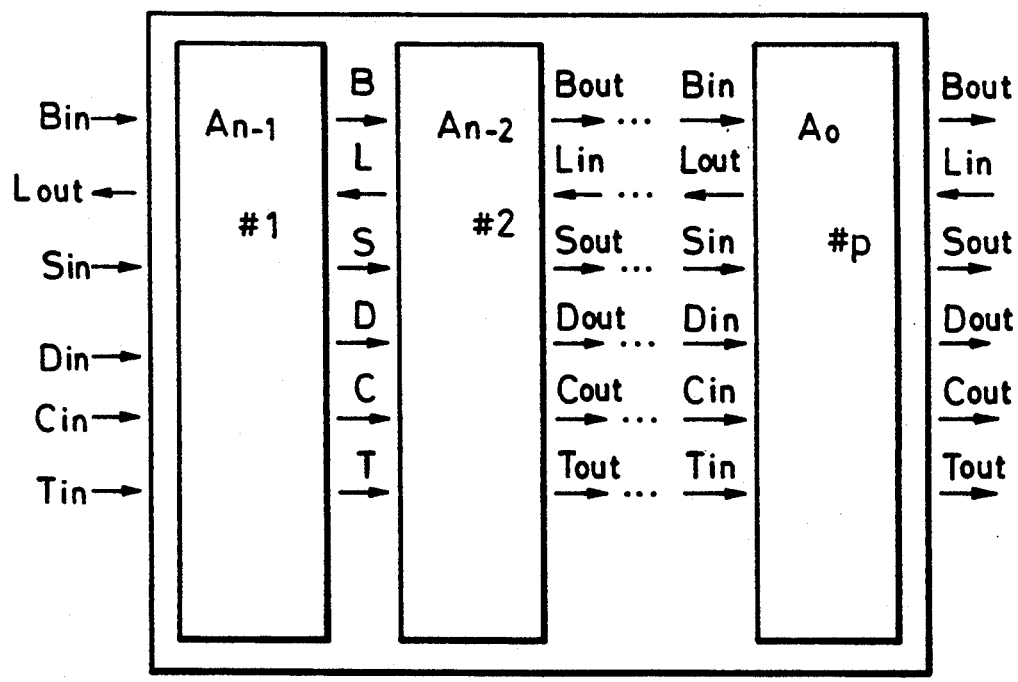

First, $R_j$ and B are respectively decomposed to $R_{j,n-i}$ and $B_{n-i}$ similarly to Algorithm H to express it as in Algorithm I:

Algorithm I
FOR h = 1 TO n/p
FOR k = 1 TO p
FOR i = 1 TO n
$\quad j = p * (h - 1) + k$
$\quad R_{j,n-i} = D_{j-1,n-i} + C_{j-2,n-i} + dW_m (A_{n-j} * B_{n-i}) +$
$\qquad up_m (A_{n-j-1} \cdot B_{n-i}) + E_{j-1,n-i}$
$\quad D_{j,n-i} = dW_m (R_{j,n-i})$
$\quad S_{j,n-i} = up_m (R_{j,n-i})$
$\quad C_{j-1,n-i} = S_{j-1,n-i}$
NEXT
NEXT
NEXT
where
$R_{j-1,n} * X^n = Q_{j-1} \cdot N + E_{j-1}, Q_{j-1} = [R_{j-1,n} * X^n / N]$ (8)
$E_{j-1} = E_{j-1,n-1} \cdot X^{n-1} + E_{j-1,n-2} \cdot X^{n-2} + \ldots + E_{j-1,1} \cdot x + E_{j-1,0}$
$D_{0,n-i-1} = C0, n - i - 2 = E0, n - i = B_n = B - 1 = 0$
$dW_m$ (Z): value smaller than $2^m$ digits of Z
$up_m$ (Z): value obtained by dividing a value larger than $2^{m+1}$ of Z by $2^{m+1}$ With the Algorithm I, the modular multiplication circuit can be realized by the circuit formed as shown in FIGS. 3 and 7.

The PE shown in FIG. 3 comprises a m*m bit multiplier for calculating $A_{n-j} * B_{n-i}$, ROMs for respectively transmitting the value of $E_{j-1,n-1}$ from the value of $R_{j-1,n}$ in accordance with Equations (8) and (9), a 4-input adder of m bits having a 2-bit carry or n+1 5-input adders, registers of m+2 bits for storing $R_{j,n-i}$ (i=1, ..., n), registers for respectively storing $A_{n-i}$, $Q_{j-1}$ and two-stage registers for delaying $B_{n-i}$, $T_{n-i}$. The lower m bits of this register means the lower m digits ($dW_m (R_{j,n-i}) = D_{j,n-i}$), while the upper 2 bits means a value ($up_m (R_{j,n-i}) = S_{j,n-i}$) which is larger than m+1 digits of $R_{j,n-i}$. As a result, the Carry of each adder is absorbed by $S_{j,n-i}$ at each clock. Furthermore $S_{j,n-i}$ is made to be $C_{j,n-i}$ at the right PE, and then is, as a carry, added together with the lower m bits of the right register at the right PE. Therefore, the delay time generated due to the calculation of $R_j$ as is carried out in the algorithm H can be eliminated. As described above $D_{j,n-i}$, $R_{j,n-i}$ and $C_{j,n-i}$ show the states of the registers and subscript j means a clock. Furthermore, k in the Algorithm I denotes the number of the PEs included in one calculating apparatus. FIG. 7 illustrates a calculating apparatus formed by p PEs. Symbol h denotes the number of inputs or feedback inputs to the calculating apparatus shown in FIG. 7

Figure 8:
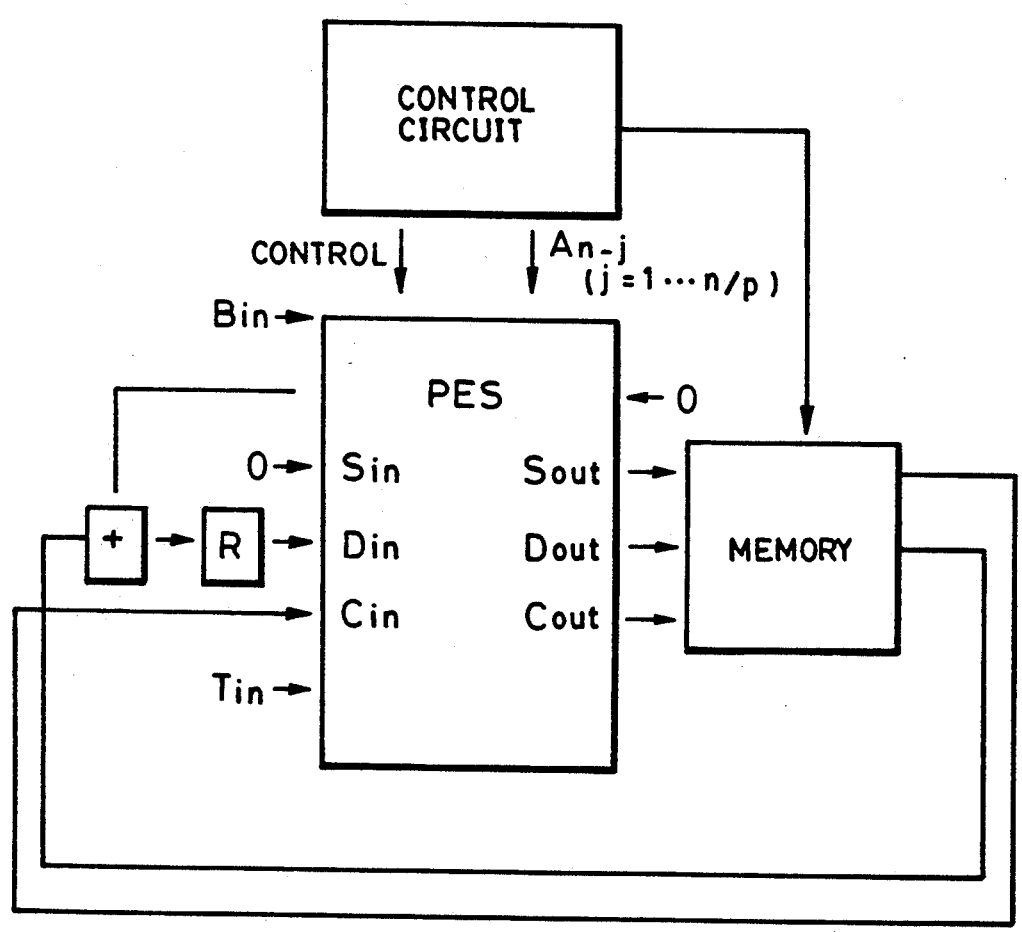

FIG. 8 illustrates the calculating apparatus shown in FIG. 7, a memory which receives the output from the calculating apparatus to feed back it to the calculating circuit shown in FIG. 7 and a modular multiplying device comprising a control circuit for controlling the aforesaid operations. The control circuit can easily be formed by a counter for counting the clocks and ROM or the like having the address which stores the outputs.

Then, the operations of the structures shown in FIGS. 3, 7 and 8 will now be described. Then, a timing chart adaptable in a case where n=4 and p=2 will now be described.

1:
| | | | | | | | | | | | |
|---|---|---|---|---|---|---|---|---|---|---|---|
| L out | AB6 | AB5 | AB4 | AB3 | 0 | 0 | AB4 | AB3 | AB2 | AB1 | |
| B in | B3 | B2 | B1 | B0 | 0 | B3 | B2 | B1 | B0 | 0 | |
| U(A3) | AB7 | AB6 | AB5 | AB4 | 0 | AB5 | AB4 | AB3 | AB2 | 0 | |
| P | 0 | | | | | S7;D6+S6 | | | | | |
| E j−1 | 0 | | | | | E5 | E4 | E3 | E2 | 0 | |
| D out | | D7 | D6 | D5 | D4 | D3 | D5 | D4 | D3 | D2 | D1 |
| C out | 0 | | | 0 | 0 | C5 | C4 | 0 | 0 | 0 | |
| S out | | 0 | S7 | S6 | S5 | 0 | S6 | S5 | S4 | S3 | 0 |

2:
| | | | | | | | | | | | |
|---|---|---|---|---|---|---|---|---|---|---|---|
| L out | | AB5 | AB4 | AB3 | AB2 | 0 | 0 | AB4 | AB3 | AB2 | A81 |
| B in | | B3 | B2 | B1 | B0 | 0 | B3 | B2 | B1 | B0 | 0 |
| U(A3) | | AB6 | AB5 | AB4 | AB3 | 0 | AB5 | AB4 | A83 | AB2 | 0 |
| P | | D7+S7 | | | | | S6; D5+S5 | | | | |
| E j−1 | | E6 | E5 | E4 | E3 | 0 | E4 | E3 | E2 | E1 | 0 |
| D out | | | D6 | D5 | D4 | D3 | D2 | D4 | D3 | D2 | D1 |
| C out | 0 | 0 | C6 | C5 | 0 | 0 | 0 | C4 | C3 | 0 | 0 |
| S out | | | S7 | S6 | S5 | S4 | 0 | S5 | S4 | S3 | S2 |

An assumption is made that the initial state of each register in the structures shown in FIGS. 3, 7 and 8 is 0. Furthermore, another assumption is made that $A_3$ is set to No. 1 PE and $A_2$ is set to No. 2 PE shown in FIG. 16.

When, B is supplied for each m bits in an order B0 at first PE (j=1) from Bin, $A_3 * B_{n-i}$ (i=1, ..., 4) are sequentially transmitted from the multiplier which receives the aforesaid value. For example, $A_3*B_3$ is the coefficient of X6 in terms of the multiplication of a polynomial and as well as it includes the coefficient of X7 since the aforesaid output is 2 m bits. Therefore, the output from the multiplier divided into upper and lower m digits is expressed by ABi (i=7,---, 4) in FIG. 5 because outputs U of the upper m bits are the coefficients of $X^7$ to $X^4$. Since outputs Lout of the lower m bits are the coefficients of $X^6$ to $X^3$, it is expressed by ABi (i=6.3). The upper m-bit outputs U are supplied to the adders of the same PE, while the lower m-bit outputs Lout are temporarily delayed by one clock by an external register to be $D_{0,n-1}$, and then it is added by the adder of the No. 1 PE. Furthermore, this adder adds feedback output Lout supplied from a No. 2 PE to be described later to supply the result of this to a register ($R_{1,n-i}$). At this time, the lower m bits of $R_{1,n-1}$ (i=1, ..., 4) is, as $D_{1,n-i}$, transmitted to the next PE. On the other hand, m+1 bits or more, which are the carries, are transmitted as $S_{1,n-1}$ to pass through the next PE before it is transmitted to the second PE counted in the forward direction as $C_{1,n-1}$. Since $D_{1,n-1}$ and $C_{1,n-1}$ are the coefficients of $X^7$ to $X^4$ and $X^7$ to $X^5$ in terms of the coefficient of the polynomial, they are expressed by $D_k$ (k=7, ..., 4) and Ck (k=7, ..., 5). In the aforesaid chart, other signals are as well as expressed by using the coefficient of the polynomial. Furthermore, $E_{0,n-1}$ expressing the residue is 0 and each $T_{n-i}$ (i=1, ..., 4) which is the timing of the residue is delayed by 2 clocks by the register before it is transmitted to the next PE.

When B is similarly supplied at the next PE (j=2) at j=1, $A_2*B_{n-i}$ (i=1, ..., 4) is transmitted from the multiplier for each upper and lower m bits. At this time, the lower m bits are, as Lout, fed back to the No. 1 PE.

When the result of an addition of D7 and S7 supplied from the No. 1 PE is, as R1,n, stored in a register P. Then, the value of $E_{j-1}$ obtained from Equation (1) is synchronized with $T_{n-i}$ so as to be sequentially transmitted from the ROM as $E_{1,n-i}$ to the adder. The result of this is, as $R_{2,n-1}$, supplied to the register so as to be transmitted to the next PE as $D_k$ and $S_k$.

Since p=2, Dk and Sk are sequentially transmitted from the calculating apparatus shown in FIG. 7. Since the No. 1 PE is performing the calculations at the time of the commencement of the outputs of $D_k$ and $S_k$, the outputs Dk and Sk are supplied to the memory,to delay them. In this state, the calculation of the No. 1 PE is completed while delaying the output by one clock. Therefore, the one-clock delay is made in the memory to feed back $D_k$, $S_k$, $B_{n-i}$ and $T_{n-i}$ to the calculating apparatus shown in FIG. 16. Simultaneously, $A_1$ is set to the No. 1 PE shown in FIG. 16 and $A_0$ is set to the No. 2 PE.

When B is supplied at the next PE (j=3), $A_1*B_{n-i}$ (i=1, ..., 4) is transmitted from the multiplier for each upper and lower m bits before U, Lout, Din and $E_{j-1}$ are added similarly to the former PE. Furthermore, $C_{1,n-i}$, which is the carry from the second former PE, is added, so that the calculations in the Algorithm I are performed. Since U, Lout, Din and $E_{j-1}$ respectively are m bits, the output from the adder is m+2 bits. Therefore, the register of $R_{j,n-i}$ must have m+2 bits. If the carry bit is 2 bits, the output from the adder is m+2 and is therefore not changed if it is added to the adder as a carry.

At the next PE (j=4), an operation similar to that when j=3 is performed. As a result, the value transmitted from the calculation apparatus shown in FIG. 7 is Rn.

Embodiment 4 of Modular Multiplying Circuit Having PE

Figure 9:
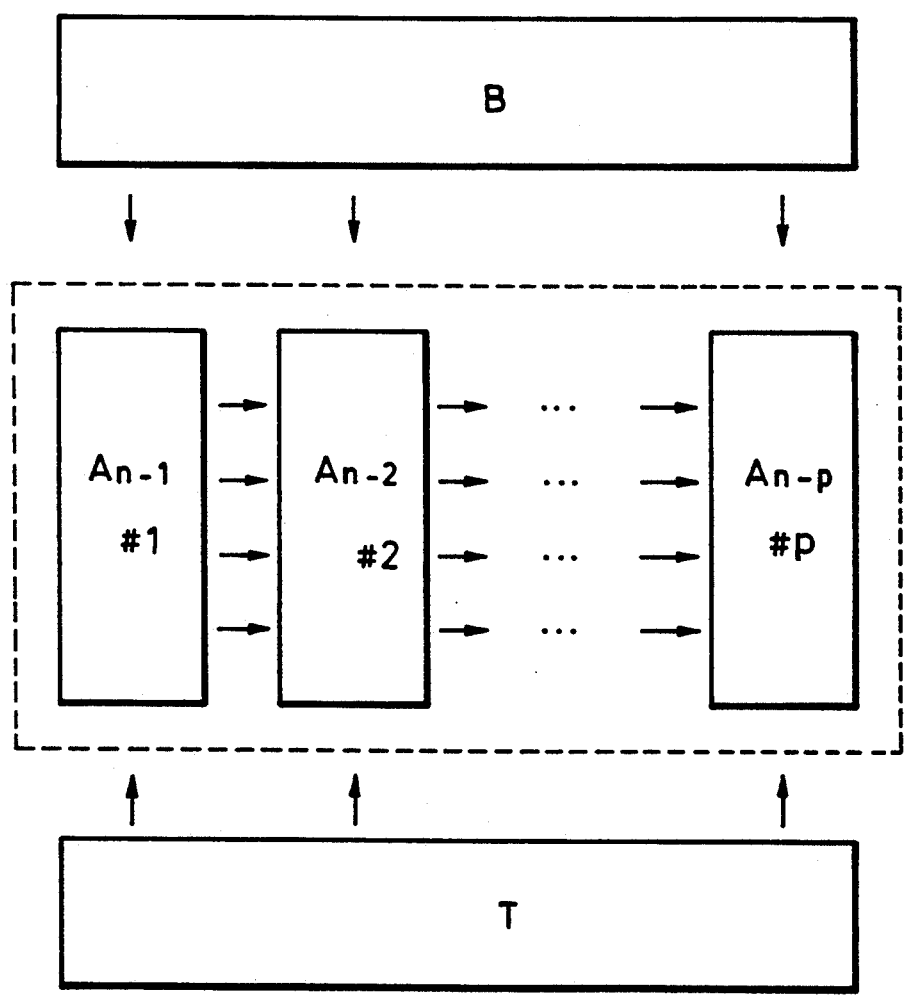

The four registers which receive Bin and Tin in the PE shown in FIG. 3 act only to delay the inputs Bin and Tin by 2 clocks. Therefore, the overall size of the circuit Scan be reduced by arranging the structure in such a manner that four output registers which concern B and T are omitted from the PE shown in FIG. 3 and the values of B and T are stored in different shift registers as shown in FIG. 9 to sequentially supply them to each PE at every three registers.

Embodiment 5 of Modular Multiplying Circuit Having PE

Figure 10:
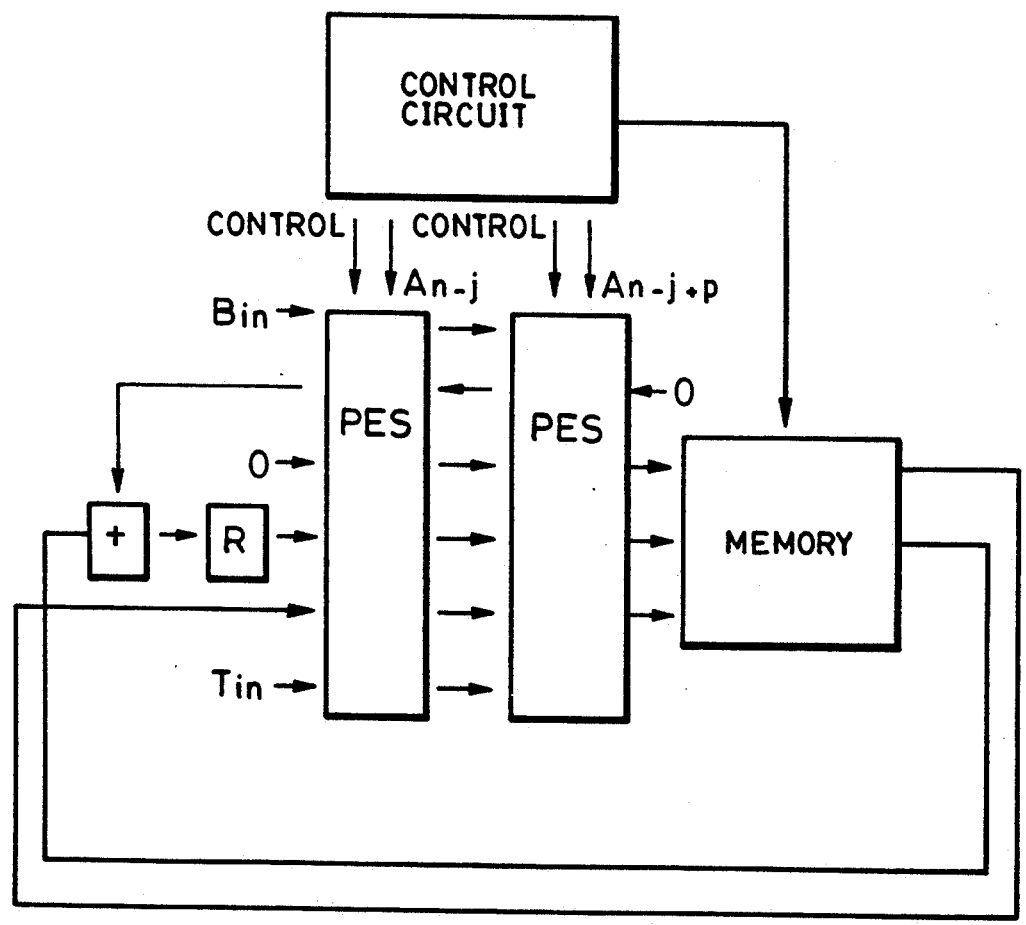

It is apparent that operations can be performed at high speed by longitudinally connecting a plurality of LSIs in the calculating apparatus shown in FIG. 7 and formed by the LSIs. In a case where the high speed operation is realized by using q LISs, it corresponds to multiply the value of p by q times in the Algorithm I. A modular multiplication is performed by using two LSIs is shown in FIG. 10.

Embodiment 6 of Modular Multiplying Circuit Having PE

Figure 11:
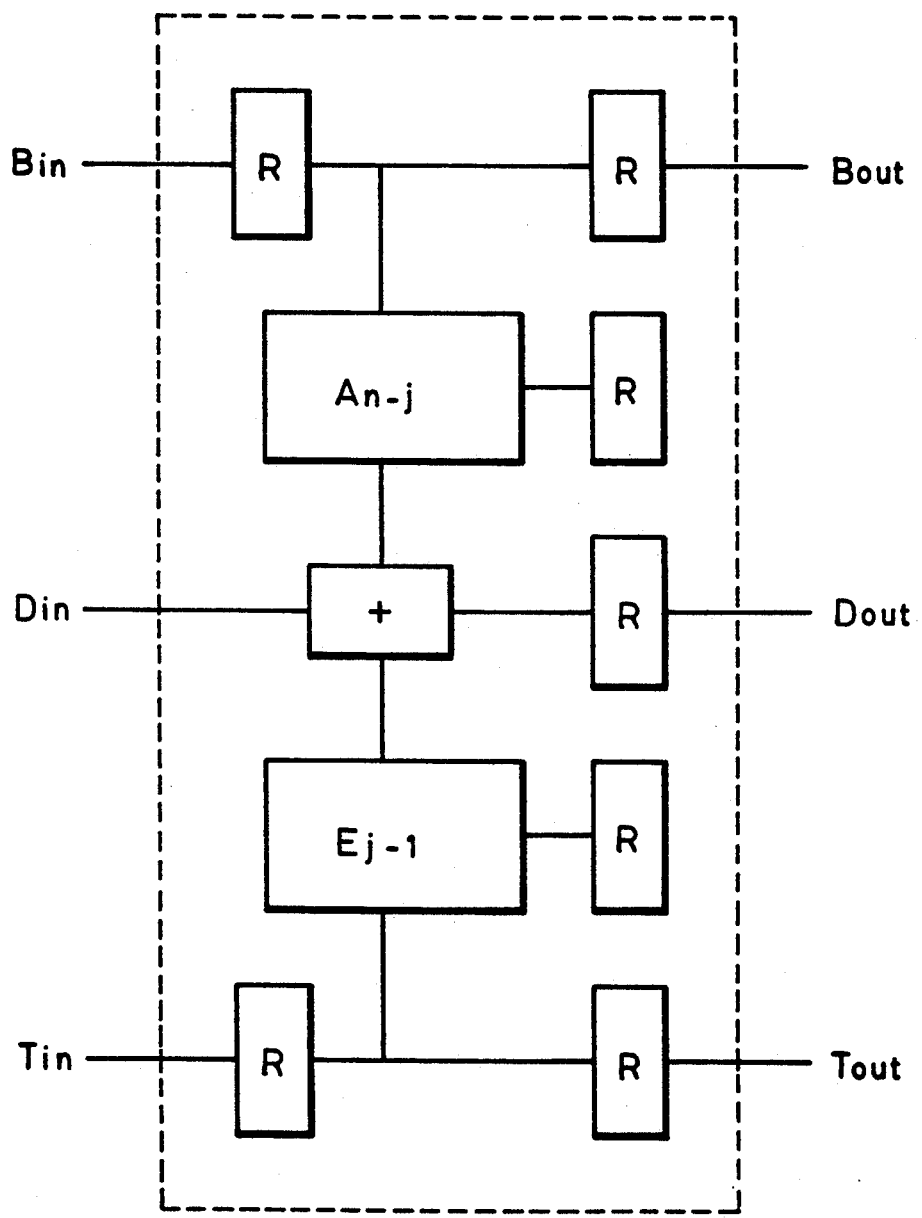
FIG. 11 is an illustration of a PE which performs modular multiplication on a finite field.

The present invention can be used in a modular multiplication on a Galois field as well as a modular multiplication on the integer field. In this case, the structure of the PE shown in FIG. 3 must be changed to that shown in FIG. 11.

Since there is no carry on the Galois field, signals denoting Cin, Cout, Sin and Sout and signals denoting Lout and Lin can be omitted and thereby the structure can significantly be simplified.

Figure 20:
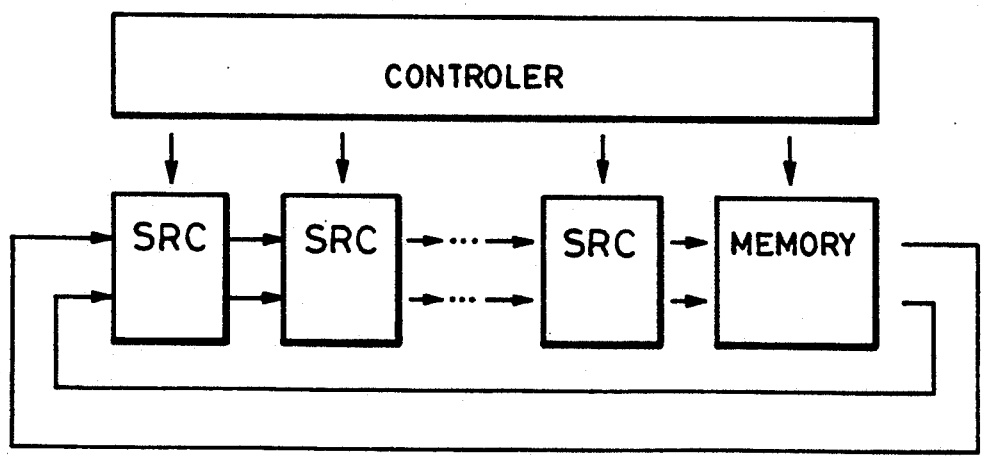
FIG. 20 is a circuit diagram showing the construction of a multi-processing circuit using SRC (systolic RSA chip)

Therefore, Bin and Bout, Tin and Tout, and Din and Dout of the PE shown in FIG. 20 are longitudinally connected, so that the residue multiplication on a Galois field can be performed similarly to the aforesaid residue multiplication of integers.

Although E is added as an alternative to $-Q \cdot N$ in the residue calculation according to this embodiment, the modular multiplication circuit of this system may be constituted by a conventional system in which a calculation $-Q \cdot N$ is performed.

Structure of RSA Cryptographic Apparatus Having PE

The following methods of raising the processing speed in the RSA cryptographic apparatus are known:

Encryption: the value of the cryptographic key e is made smallest (the minimum is three)

Decryption: the speed is raised by employing Chinese Reminder Theorem

In a case where the RSA cryptographic apparatus is constituted on the basis of this method, the conventional" modular multiplication circuit encounters a problem in that the cryptography and the decryptogrpahy cannot easily be executed by the same modular multiplication circuit because the number of digits of the multiplier and the divisor are different between the encryption and the decryption. Therefore, the modular multiplication is performed by a full software means or different circuits.

Figure 13:
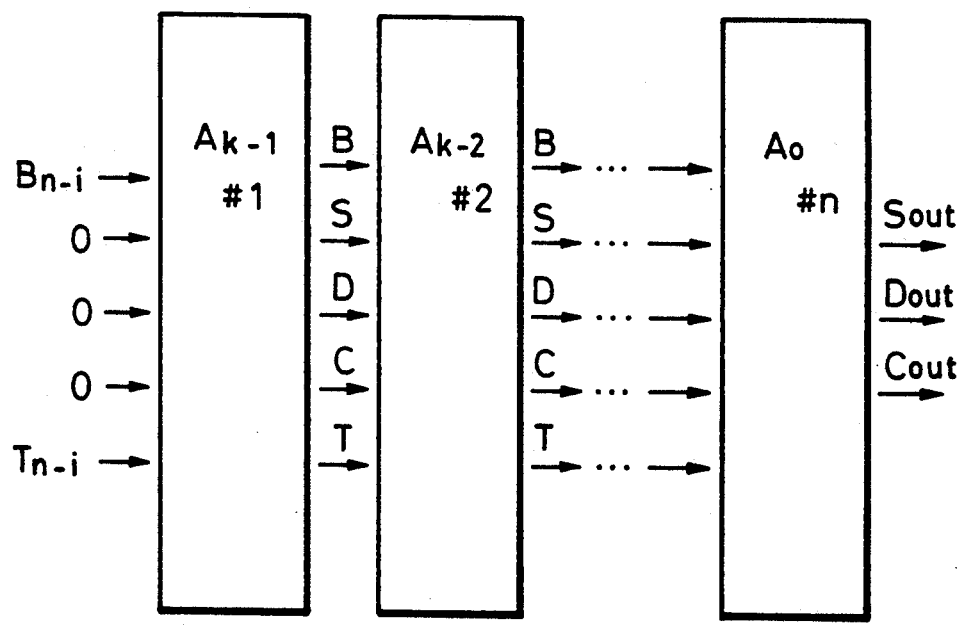

However, an advantage can be obtained from the modular multiplication circuit according to the present invention in that the encryption and the decryption can easily be realized by the same circuit because the number of the digits of the multiplier and that of the divisor are determined on the basis of the number of the operations as an alternative to the size of the circuit. The aforesaid number of the operations can easily be realized by changing the control performed in the control circuit because the number of the feedbacks to the calculating apparatus shown in FIG. 13 is different in the case of the encryption and the decryption.

Furthermore, the calculation of the RSA cryptography to be performed on the basis of the Chinese Reminder Theorem can basically be executed in parallel. Therefore, it is most suitable for use in the method according to the present invention in which the residue multiplication is executed by a plurality of calculating apparatus.

Embodiment 7 of Modular Multiplying Circuit Having PE

Then, a residue multiplication of R=R−B mod N (where A is a k-bit integer and B is an m-n-bit integer) will be considered. A divided for each bit and B divided for each S m bits can be expressed as follows:

$$A = A_{k-1}*2^{k-1} + A_{k-2}*2^{k-2} + \ldots A_1*2 + A_0 \quad (10)$$

$$B = B_{n-1}*X^{n-1} + B_{n-2}*X^{n-2} + \ldots B_1*X + B_0 \quad (10)$$

Assumptions are made that X=2 m and the bit series of A and B obtained by dividing from the upper digit respectively are $A_{k-i}$ (i=k, ..., k), $B_{n-i}$ (i=1, ..., n).

In this case, it has been known that the residue multiplication can be performed by repeatedly subjecting $j=1, \ldots, k$ to the following calculation:

$$R = R*2 + A_{k-j}*B - Q*N \qquad (12)$$

where $Q=[R/N]$ and the initial value of R is 0

In order to realize this calculation by a systolic array, the aforesaid calculation is expressed by the following algorithm:

```
Algorithm J
D_{0,n-i-1} = C_{0,n-i-1} = 0
FOR j = 1 TO k
  FOR i = 1 TO n
    R_{j,n-i} = 2 * D_{j-1,n-i} + C_{j-2,n-i} + A_{k-j} * B_{n-i} + E_{j,n-i}
    D_{j,n-i} = dW_{m-1} (R_{j,n-i})
    S_{j,n-i} = up_{m-1} (R_{j,n-i})
    C_{j-1,n-i} = S_{j-1,n-i}
  NEXT
NEXT
where
```

$$S_{j-1,n-1}* X^n = Q_{j-1}* N + E_{j-1}, \qquad (13)$$
$$E_{j-1} = E_{j-1,n-1} \cdot X^{n-1} + , \ldots, + E_{j-1,1}*X + E_{j-1,0} \qquad (14)$$

Figure 12:
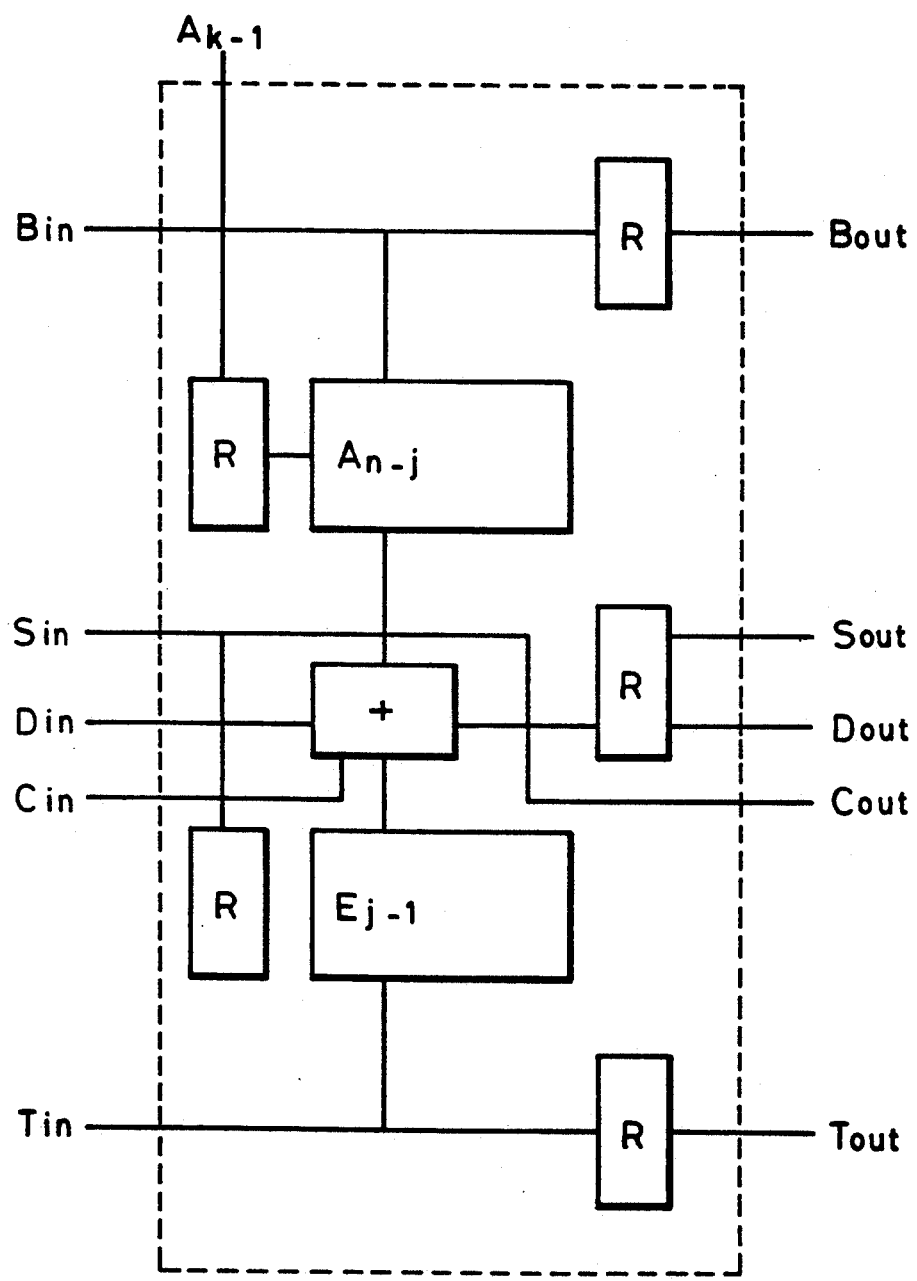

$dW_{m-1}(Z)$: value smaller than $2^{m-1}$ digit of Z
$up_{m-1}(Z)$: value obtained by dividing a value larger than $2^m$ of Z by $2^m$ The aforesaid algorithm can be formed by circuits shown in FIGS. 12 and 13. The circuit shown in FIG. 13 is formed into a systolic array. The systolic array performs the calculation by a pipeline processing by so-called PEs which are small and same functional blocks. The PE is formed as shown in FIG. 12.

Figure 22:
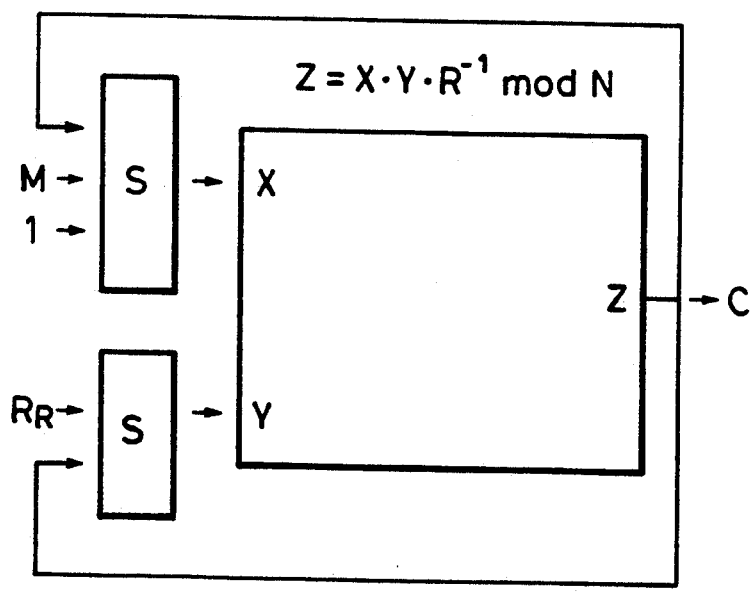
FIG. 22 is a circuit diagram showing an example of a modular exponentiation circuit.

In Algorithm J, symbol i denotes a clock, j denotes the number in FIG. 22 which indicates the position of the PE disposed at j=1 (No. 1) to j=n (No. n) from right to left. It is assumed that each PE shown in Pig. 22 has a value of $A_{k-j}$ (j=1, ..., k) in the internal register thereof. The No. 1 PE receives $B_{n-i}$ (i=1, ..., n) at the Bin thereof sequentially starting from the upper digit. Furthermore, it receives timing signal $T_{n-i}$ (i= ..., n) for the residue output from Tin in response to the aforesaid receipt of $B_{n-i}$ (i=1, ..., n). They are respectively transmitted to the next PE through the corresponding Bout and Tout after are delayed by the registers. The structure is arranged in such a manner that 0 is set of Din, Sin and Cin of the No. 1 PE. The elements and the operation of the PE will be described.

(1) Multiplying Portion

The multiplying portion of $A_{k-j}*B_{n-i}$ of each BE can easily be realized by m ANDs each transmitting $B_{n-i}$ only when $A_{k-j}=1$ because $A_{k-j}$ is 1 bit.

(2) Arithmetic portion

The adder transmits a carry of 2 bits because it is formed by a 4-input adder which receives output $A_{k-j}*B_{n-i}$ from the multiplier, residue output $E_{j-1,n-i}$, $2*D_{j-1,n-i}$ and $C_{j-2,n-1}$. Therefore, each register which receives the output from the adder may be formed by a m+2 bit register. Furthermore, the values smaller than m−1 bits of the register $R_{j,n-i}$ of the j−th PE are, as $D_{j,n-i}$, transmitted to the next PE, while the values larger than m bits are, as $C_{j,n-i}$, transmitted to the same. However, $2*D_{j-1,n-1}$ can be realized by supplying $D_{j-1,n-1}$ to the adder by shifting it by one bit.

(3) Residue Portion

In order to simplify the description, $Q_{j-1}$ of values $S_{j-1,n-1}$, which are larger than N in terms of digits in place of the value, are Obtained. Furthermore, $-S_{j-1,n-1} \cdot X^n + E_{j-1}$ is executed in place of executing $-Q_{j-1}*N$, so that the residue calculation is performed. The reason for this lies in that $S_{j-1,n-1}*X^n = Q_{j-1}*N + E_{j-1}$ ($E_{j-1} < N$). Since $-S_{j-1,n-1}*X^n$ is automatically performed due to the overflow of $S_{j-1,n-1}$, the residue calculation can be completed only by adding $E_{j-1}$. The addition of $E_{j-1}$ is performed by the following method: since the digit of $B_{n-i}$ and that of $E_{j-1,n-1}$ are the same in an equation which expresses $E_{j-1}$ at the j−th PE, $E_{j-1,n-1}$ (i=1, ..., n) are sequentially transmitted at timing signal $T_{m-1}$ synchronized with $B_{n-i}$. Since $S_{j-1,n-i}$ is a three bit number and $T_{n-i}$ is a value denoting n−i, the $E_{j,n-i}$ output circuit can be realized by a ROM having an input of 3+log (n−i) bits. Furthermore, a m+3 bit register and a selector for receiving and holding $S_{j-1,n-1}$ must be provided.

(4) Delaying Portion

It is formed by a register for transmitting the value of $B_{n-i}$ and $T_{n-i}$ in a pipe line manner. A register of m bits and log (n−i) bits must be provided for $B_{n-i}$ and $T_{n-i}$.

Then, a timing chart which illustrates the operation of the circuit shown in FIG. 13 in a case where an assumption is made that k=n=m=4.

| #1: | AB1 | a3B3 | a3B2 | a3B1 | a3B0 | |
|---|---|---|---|---|---|---|
| | E1 | 0 | | | | |
| | S1 | | 0 | 0 | 0 | 0 |
| | D1=AB1 | | D15 | D11 | D7 | D3 |

| #2: | Q2 | d18 | | | | |
|---|---|---|---|---|---|---|
| | AB2 | a2B3 | a2B2 | a2B1 | a2B0 | |
| | E2 | E14 | E10 | E6 | E2 | |
| | S2 | | S18 | S14 | S10 | S6 |
| | D2=2* D1+AB2+E2 | | D 14 | D 10 | D6 | D2 |

| #3: | Q3:S2, D2 | | S18, D17 | | | |
|---|---|---|---|---|---|---|
| | AB3 | | a1B3 | a182 | a1B1 | a1B0 |
| | E3 | | E13. | E9 | E5 | E1 |
| | S3 | | | S17 | S13 | S9 | S5 |
| | D3=2*D2+AB3+E3 | | | D 13 | D9 | D5 | D1 |

```
#4 : Q4 : S3, D3              | S17, D16  |
    AB4                       | a0B3 | a0B2 | a0B1 | a0B0 |
    E4                        | E12  | E8   | E4   | E0   |
    S4                        |      | S16  | S12  | S8   | S4 |
    D4=2−D3+AB4+E4+C2         |      | D12  | D8   | D4   | D0 |
```

The initial state of each register shown in FIGS. 12 and 13 is made to be 0.

When B is sequentially supplied for each m bits in an order B3, ..., B0 through Bin at the first PE (j=1), a $3*B_{n-i}$ (i=1, ..., 4) are sequentially transmitted from the multiplier which receives the aforesaid input. Expressing the values of these outputs by Dx, D15, D11, D7 and D3 are transmitted from the No. 1 PE. Then, the meaning of Dx will now be considered. Since A can be decomposed for each bit, aj denotes the j+1 th bit of A. Furthermore, B can be decomposed for each 4 bits from m=4, Bi denotes bits b4(i+1)−1 to b41 from the 4−(i+1) th digit of B to 4i+1 th digit. Therefore, aj*Bi denotes the bit from the 4−(i+1)+j th digit to 4i+j+1 th digit, so that Dx is expressed by D4i+j in terms of the digit. The D4i+j is composed of 4 bits $d_{4(i+1)+j-1}$ to $d_{4i+j}$.

At the next PE (j=2), when B is supplied through Bin after one clock delay has been made, a2*Bn−i (i=4, ..., 1) is transmitted from the multiplier. Since first input D15 has been supplied from Din, residues E14 to E2 are transmitted in accordance with Equation (11) in response to timing signal Tn−i starting from the uppermost digit d18. Also Ei is an output for each 4 bits. By adding the output denoting the multiplication, the output denoting the residue and input Din, the outputs of D14 to D2 and S18 to S6 are transmitted from the register. In this state, S18 to S6 are carries generated by the additions and are 2-bit values.

At the next PE (j=3), a calculation similar to that in the j=2 PE is performed in such a manner that the residue is generated from S18, which is the uppermost digit, and d17, which is the digit one bit lower, in accordance with Equation (10).

At the final PE (j=4), a calculation similar to tha in the j=3 PE is performed in such a manner that the carry from the No. 2 PE is further added. The addition at No. 4 PE is, as shown in the first E12, from the 16-th digit to the 13-digit. Since the first carry from the No. 2 PE is a 2-bit carry S14, the addition is the 16-th digit and the 15-th digit. Therefore, the additions can be performed by the same adder. The output from this PE is the result of the residue multiplication. Furthermore, one PE shown in FIG. 12 is able to calculate Ax−j in Equation (12).

Embodiment 8 of Modular Multiplying Circuit Having PE

In the systolic array, the operations to be performed in all of the PEs are the same and the input/output relationships between PEs are the same. Therefore, the systolic array is formed into an architecture in which the time sharing system in the same circuit can easily be performed.

Figure 14:
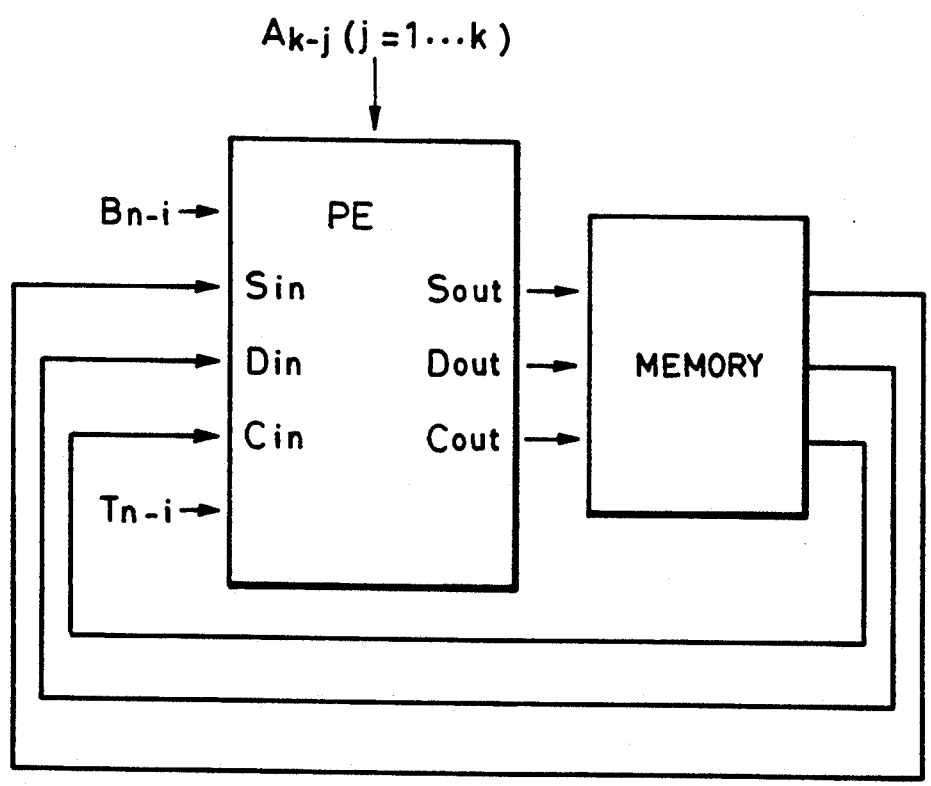

A most simple structure can be realized by one PE shown in FIG. 12 and a memory. FIG. 14 shows it which is operated as follows:

(1) First, $A_{k-1}$ is set to the PE, and $B_{n-i}$, $T_{n-i}$ i=1, ..., n) are sequentially supplied to the PE. Since one PE performs the calculation of Equation (12) as described above, its output $R=A_{k-1} \cdot B$ is supplied to the memory. Furthermore, setting to PE is changed to $A_{k-2}$ immediately after the input of Bn−i, Tn−i (i=1,..., n) has been completed.

(2) R, which is the result of the previous calculation, fed back to the PE, and as well as $B_{n-i}$, $T_{n-i}$ are repeatedly supplied. As a result, $R=R \cdot X + A_{k-2} \cdot B - Q \cdot N$ is transmitted form the PE, this output is again stored in the memory.

(3) The setting to the PE is changed to $A_{k-j}$ (j=3, ..., k) and the operation of (2) is repeated.

Therefore, it can be said that the modular multiplication can be executed by the circuit shown in FIG. 14 in such a manner that the calculation to be performed by K PEs by one calculation is performed by using one PE by k times. If the structure is arranged in such a manner that p-pieces of PEs are connected in a pipeline manner and $A_{k-j}$ to $A_{k-j+P-1}$ are continuously set, the modular multiplication can be executed by repeating the calculation by p-pieces of PEs by k/p times. It can be considered that the size of the circuit (p-pieces of PEs) is traded off by the processing speed (k/p times of calculations). As described above, in the circuit formed by the systolic array, the size of the circuit and the processing speed can be easily traded off and thereby the size of the circuit can be reduced.

As described above, the modular multiplication circuit can be formed by the systolic array according to the aforesaid embodiment if only the residue multiplication is required. Then, the structure of the RSA cryptographic apparatus will now be described. The modular multiplication circuit according to the aforesaid embodiment, one time, performs the modular multiplication. The result of the residue multiplication obtainable from this circuit includes a 2-bit carry bit for each m bits. In a case where the residue multiplication is repeated by using the result of the residue multiplication, the residue multiplication cannot be executed by the same circuit if the carry bit is not corrected. Therefore, in a case where the modular multiplication is repeated by using the previous result of the residue multiplication in the case of the RSA cryptography, it is a critical factor that the previous result of the modular multiplication must be easily and efficiently corrected.

The series Ac and Bc each having a carry bit and divided into A and B shown in Equations (10) and (11) and carry bit series a and b can be expressed as follows:

$$Ac = A + a*X$$

$$a = a_{k-m}*X^{n-2} + \ldots + a_2*_m*X + a_m$$

$$Bc = B + b*X$$

$$b = b_{n-1}*X^{n-2} + \ldots + b_2*X + b_1$$

Therefore, the residue multiplication Rc=Ac−Bc mod N for Ac and Bc is expressed as follows:

Embodiment 1 of Modular Multiplying Circuit for RSA cryptographic apparatus $$D_{0,n-i-1} = 0; C_{0,n-i-1} = 0$$

-continued
```
        FOR s = 1 TO k/m
         FOR c = 1 TO m
          FOR i = 1 TO n
           j = (s − 1) − m + c
```

Figure 15:
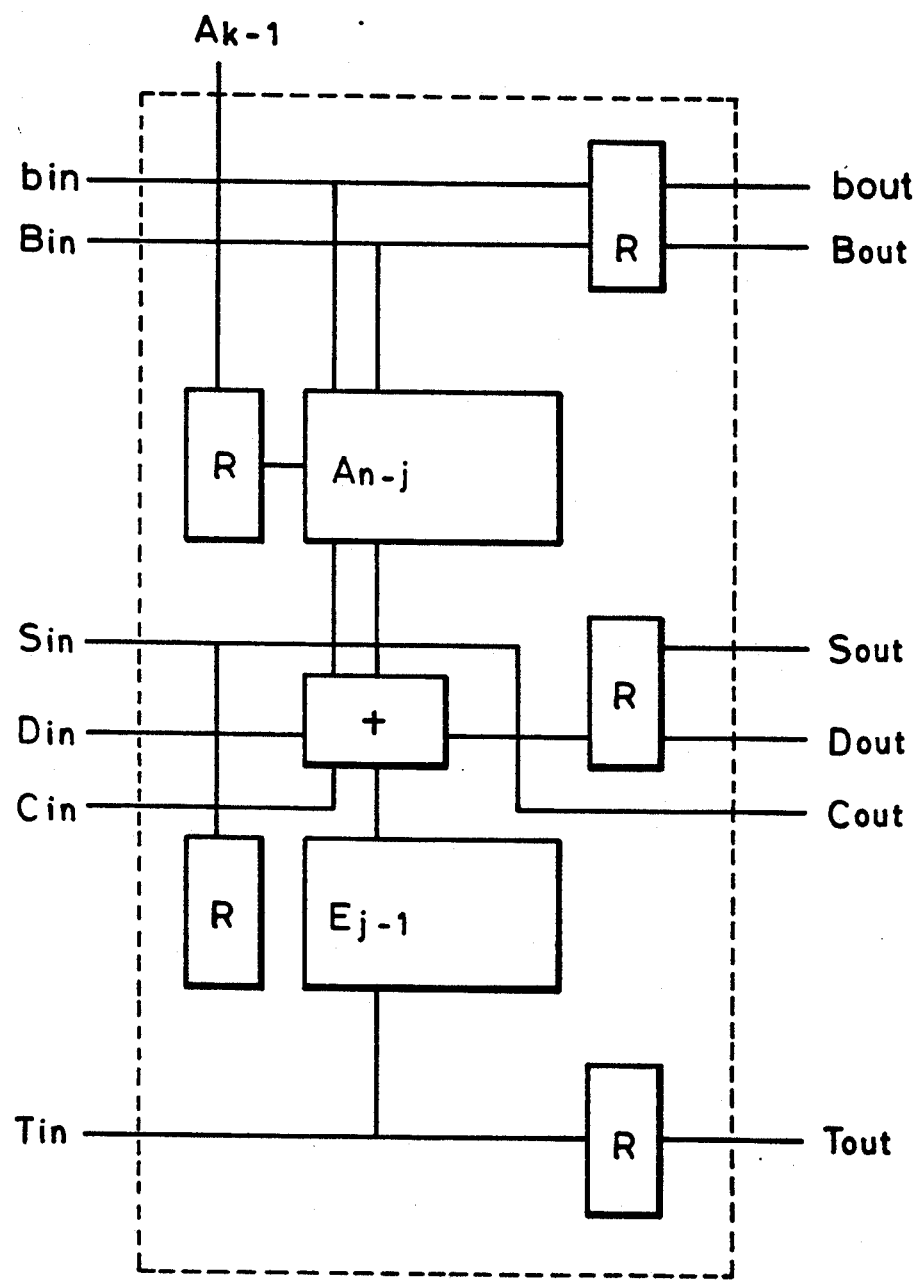
Figure 16:
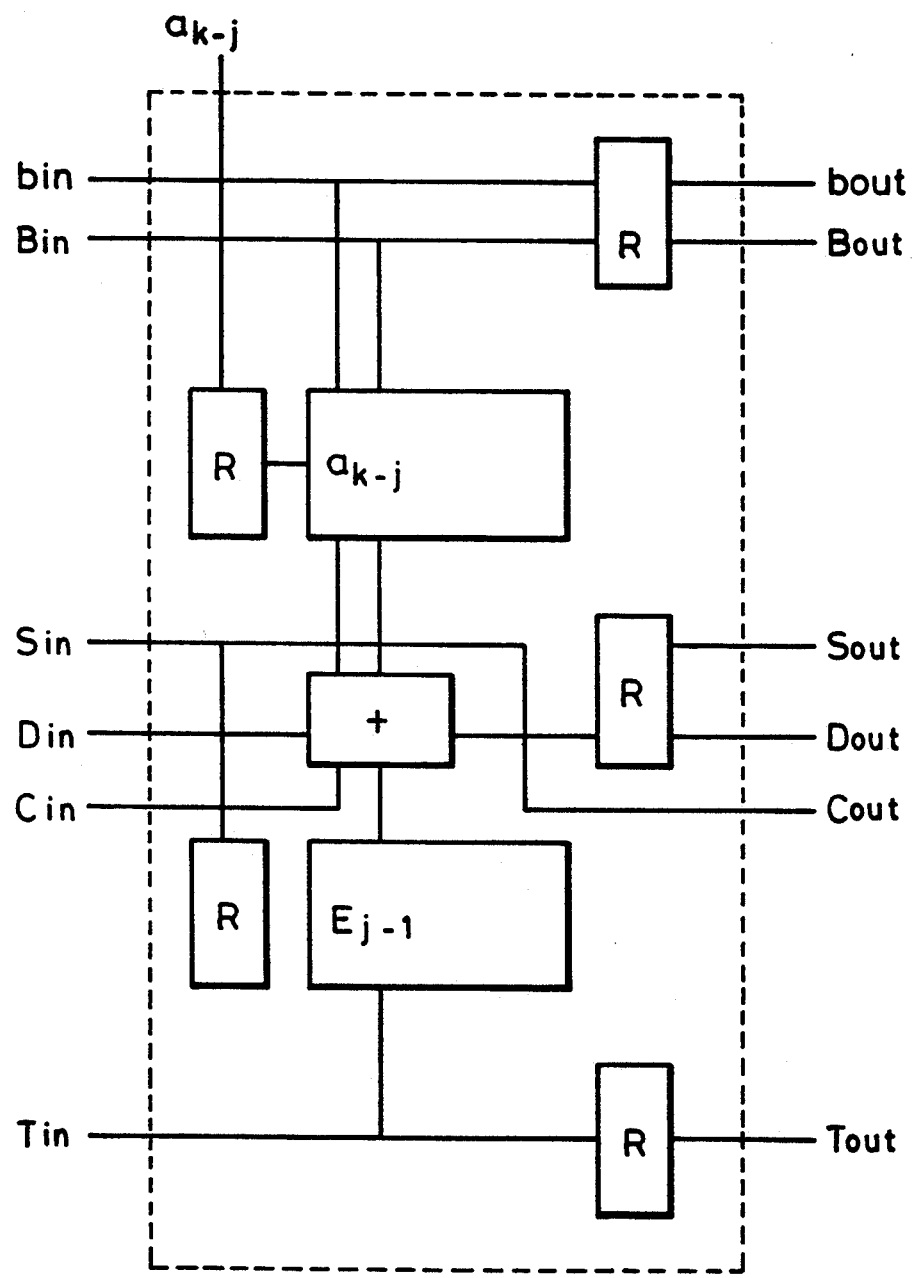
Figure 17:
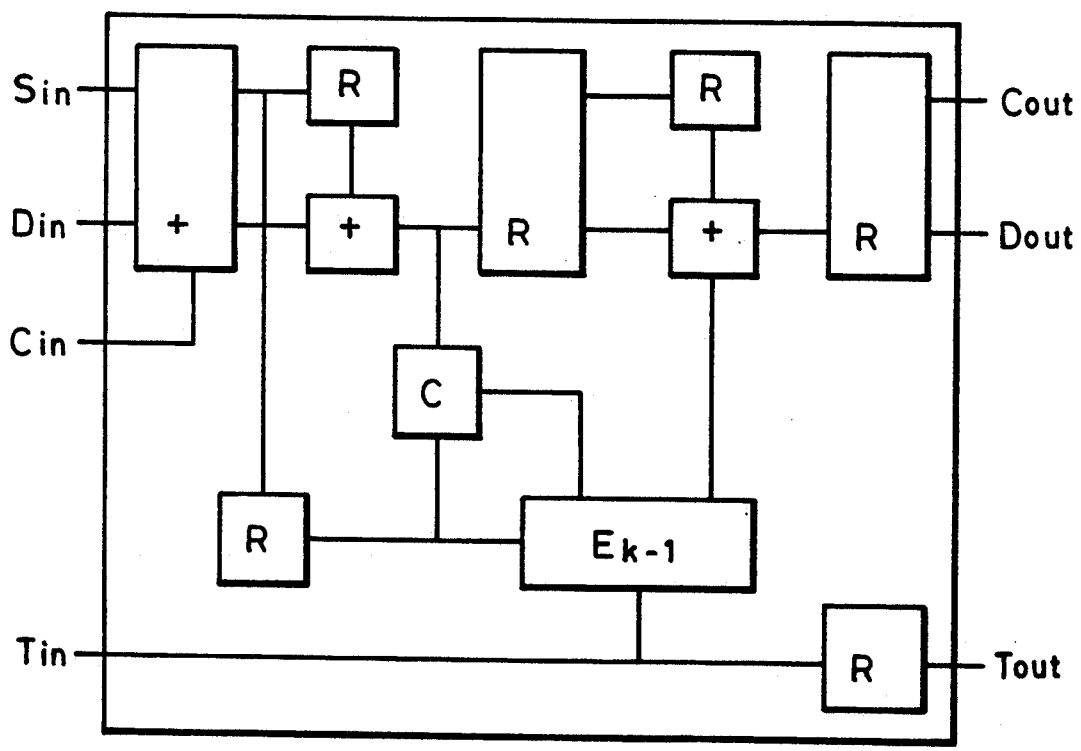

P   $R_{j,n-i} = 2*dw_{m-1} (R_{j-1,n-i}) + C_{j-2,n-i}$
E         $+ A_{k-j} \cdot (B_{n-i} + b_{n-i}) + E_{j,n-i}$
A   $C_{j-1,n-i} = up_{m-1} (R_{j-1,n-i})$
         NEXT NEXT
        FOR i = 1 TO n
P        $R_{j,n-i} = dw_n (R_{j-1,n-i}) + C_{j-2,n-i}$
E           $= a_{k-j}*(B_{n-i} + b_{n-i}) + E_{j,n-i}$
B        $C_{j-1,n-i} = up_m (R_{j-1,n-i})$
         NEXT
        NEXT
        FOR i = 1 TO n
         P   $R_{k,n-i} = R_{k,n-i} + C_{k-1,n-i}$
         E   $R_{k+1,n-i} = dW_m (R_{k,n-i}) + up_m (R_{k,n-i-1})$
         C   $R_{k+2,n-i} = dW_m (R_{k+1,n-i}) +$
                 $Up_m (R_{k+1,n-i-1}) + E_{k+1,n-i}$
        NEXT The process of each of PEA, PEB and PEC shown in the aforesaid algorithm can be realized by the PEs shown in FIGS. 15 to 17. Each PE is operated as follows:

PEC: A PE as shown in FIG. 16 is inserted into the final portion of the modular multiplication and the carry output from this PE is made 1 bit. The PE shown in FIG. 16 first adds outputs Dout, Sout and Cout from the former PE to obtain a value $R_{k,n-1}$. Then, value $C_{k,n-i}$ of $R_{k,n-1}$ which is larger than m+1 bits is delayed by the register to be added to a value $D_{k,n-i}$ which is smaller than m bits. As a result, carry $C_{k+1,n-1}$, which is the result of the aforesaid addition, is made to be 1 bit. However, the carry $C_{k,n-1}$ of the uppermost digit is stored in a different register. Then, residue $E_{k+1,n-1}$ of the uppermost digit is calculated from $C_{k,n-1}+C_{k+1,n-1}$, and then $D_{k+1,n-1}+C_{k+1,n-2}+E_{k+1,n-1}$ which is the uppermost digit of the modular multiplication, is previously calculated. In the case where the carry is generated in this uppermost digit, a residue of $1+C_{k,n-1}+C_{k+1,n-1}$ is transmitted to the calculation of $R_{k+2,n-i}$ which is the final result to discriminate/control in such a manner that there is not carry bit for the uppermost digit. A discrimination circuit for use in this operation is realized by a 3 bit ROM and an adder.

PEA: The input thorough Bin is converted from B $_{n-i}$ into $B_{n-i}+b_{n-i}$ in order to correct the carry for B. Therefore, $B_{n-i}$ and $b_{n-i}$ are simultaneously supplied to Bin as shown in FIG. 14 to calculate AND with $A_{n-j}$. Therefore, the number of AND circuits for the multiplying portion of the PE is m+1. The digit of the output denoting the AND $A_{n-j}*b_{n-i}$ is the same as the digit of the lowermost bit of the output denoting AND $A_{n-j}*B_{n-i}$.

PEB: In order to correct the carry for A, one PEB is inserted for each m pieces of PEA. Carry bit $a_{k-j}$ for A is set to PEB. Since the digit of ak−j is the same as that of $A_{k-j}$, which has been set to the former PE, the PEB performs the calculation $R = R + a_{k-j}*B − Q*N$ in which there is no carry in place of performing the operation shown in the equation. Therefore, output $R_{j-1,n-i}$ from the former PE must be processed in such a manner that outputs smaller than m bits are, as $D_{j-1,n-i}$, received through D'in and outputs larger than m+1 bits are, as $S_{j-1,n-i}$, received through S'in. Since carry $a_{k-1}=0$ from PEC to the upper most digit, the PEB for the carry for the uppermost digit can be omitted.

Figure 18:
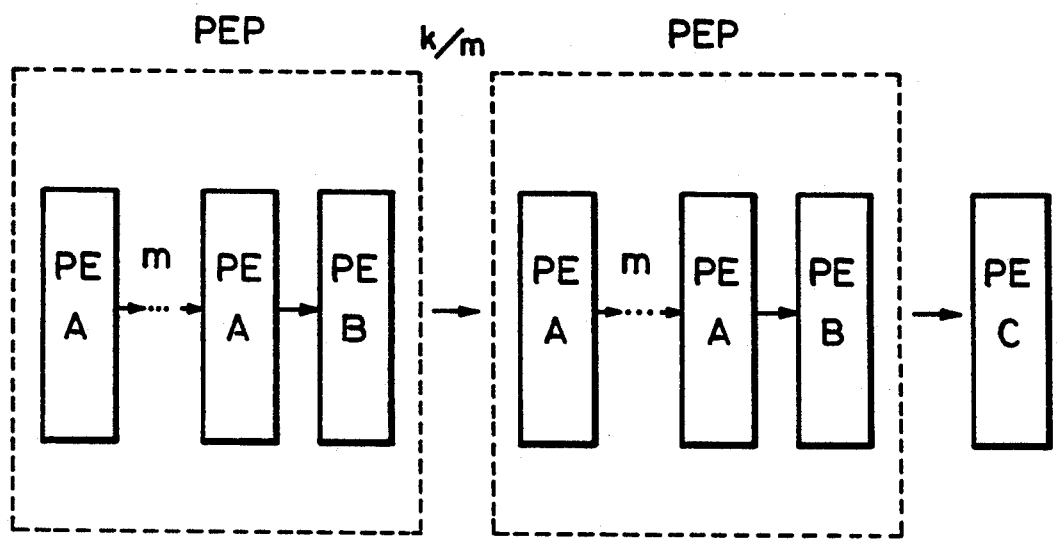

Therefore, the RSA cryptography apparatus can be realized by a systolic modular multiplication circuit structured as shown in FIG. 18. FIG. 18 illustrates a structure having one PEB for each m pieces of PEA and one PEC is used in place of PEB in the final portion of the residue multiplication. As a result, if an output from the structure shown in FIG. 17 is supplied to a circuit structured similarly to the systolic array shown in FIG. 18 a similar residue multiplication can be executed.

Figure 19:
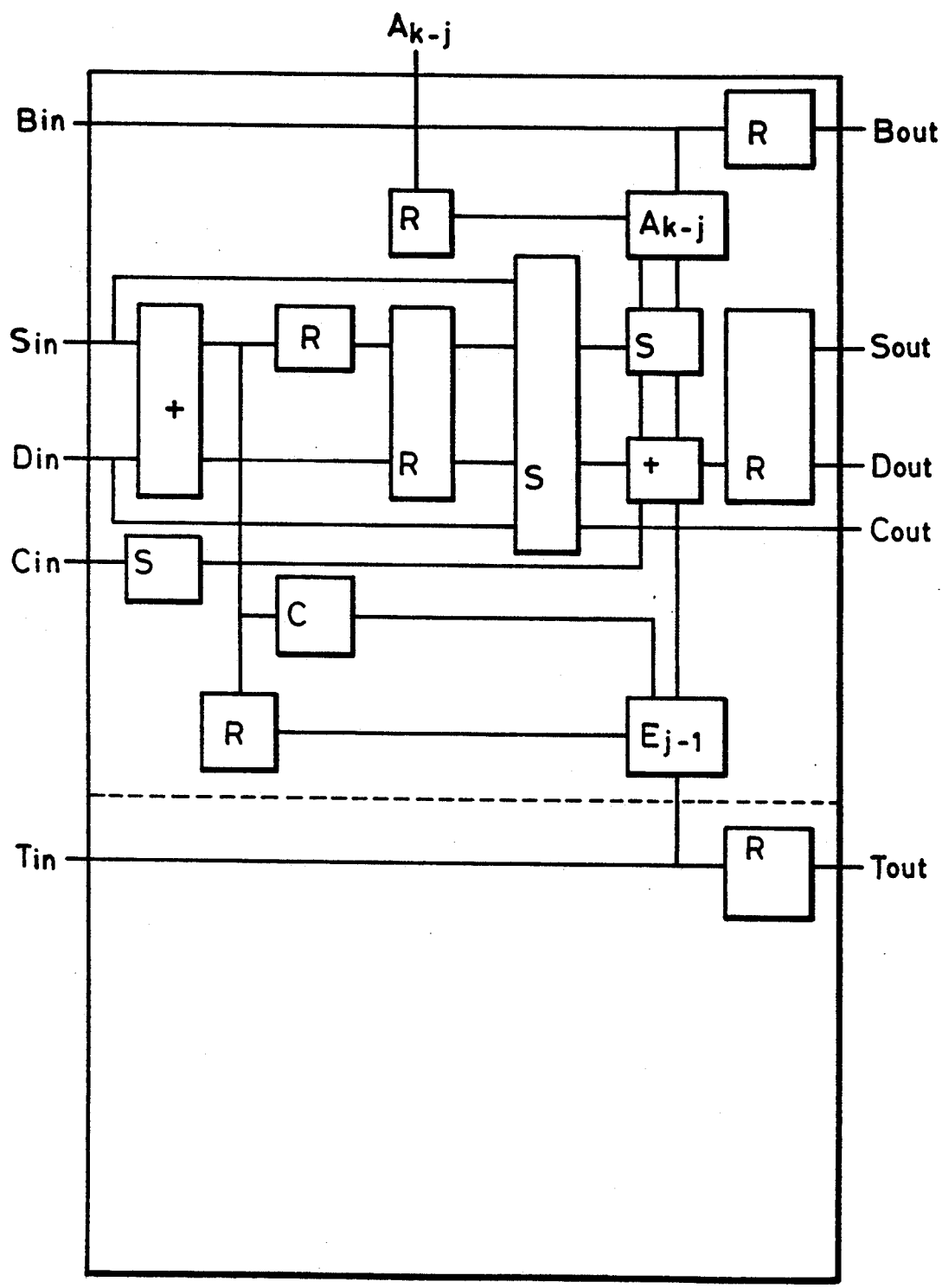

When the size of the systolic array is desired to be reduced, a circuit having one PE shown in FIG. 19 in which the functions of PEA to PEC including PE shown in FIG. 14 is switched by a selector can be employed, resulting a similarly-small modular multiplication circuit. Since the functions of PEA to PEC are similar to one another, a major portion of the circuits can be commonly used. Therefore the size of the circuit for the PE shown in FIG. 28 can be reduced.

Embodiment 2 of Modular Multiplying Circuit for RSA Cryptography Apparatus

Encryption: the value of the encryption key e is made smallest

Decryption: the speed is raised by employing Chinese Reminder Theorem

In a case where the RSA cryptographic apparatus is constituted on the basis of this method, the conventional modular multiplication circuit encounters a problem in that the encryption and the decryption cannot easily be executed by the same modular multiplication circuit because the multiplier and the number of digits of the divisor are different between the cryptography and the decryptography. Therefore, the modular multiplication is performed by a full software means or different circuits. However, the modular multiplying method according to the present invention enables trading off to easily be performed by the size of the circuit and the number of operations. Therefore, the difference in the digit of the multipliers and that of the divisor can be overcome by changing the number of the operations, and thereby the cryptography and the decryptography can easily be realized by the same circuit.

Furthermore, the calculation of the RSA cryptograph to be performed on the basis of the Chinese Reminder Theorem can basically be executed in parallel. Therefore, it is most suitable for use in the method according to the present invention in which the modular multiplication is executed by a plurality of calculating apparatus.

As described above, the modular multiplication circuit and the RSA cryptographic apparatus can be efficiently formed.

As is shown in the case where the size of the systolic array is reduced by means of the modular multiplying method according to the present invention, the modular multiplication circuit can be formed by p (an arbitrary number) pieces of PEs. Therefore, the method according to the present invention exhibits a characteristics that the structure can easily be formed into a circuit or a gate array. As a result, by collecting one to plural PEs into a chip (hereinafter called an "SRC (Systolic RSA)" before the chip is combined with an RAM such that it can be controlled with a program, an RSA cryptographic apparatus can be easily realized. The external program control can be flexibly provided by means of an ROM.

In a case where a high speed operation is required, a plurality of SRCs longitudinally connected are used as shown in FIG. 20 so that the number of the PEs can be increased. Then, the programming is switched over, so that the high speed operation can be easily realized. Therefore, the modular multiplying method according to the present invention can be adapted in a multiprocessing method.

Consequently, the RSA cryptography apparatus according to the present invention will cause the following effects to be obtained:

Since the calculation to be performed in one PE are simple integer calculations, the modular multiplying algorithm according to the present invention can be formed into an apparatus by CPU or DSP. Therefore, in a case of a cryptographic system is used in low transmission speed systems such as IC cards or telephone lines, a simple RSA cryptography apparatus can be realized by using the CPU or DSP.

The modular multiplication circuit according to the present invention can be formed by an arbitrary number of PEs. Hence, a high speed RSA cryptography process can be realized by one chip by using a C-MOS gate array of about 20 K-gate or smaller which can be inexpensively produced by the present semiconductor technology.

Since the multiprocessing process for the RSA cryptography by means of a plurality of chips can easily be realized, the processing speed can easily be raised in proportion to the number of chips.

Even if the number of digits on the input value in the modular multiplication is excessively large, the necessity lies in only increasing the number of the PEs, that is, the number of chips. Therefore, a satisfactory expansion performance can be realized.

When the RSA cryptography process is performed in a case where the number of digits is different between the cryptography and the decryptography, the size of the circuit and the number of the operations can easily be trade off in the modular multiplying method according to the present invention. Therefore, the decryptography and the cryptography can be easily be realized by the same circuit by changing the number of operations even if there is a difference in the number of the digits of the multiplier or the divisor. Therefore, a satisfactory RSA cryptography apparatus can be constituted.

Since the residue is performed in such a manner that E is obtained by means of the ROM in accordance with Equation (14) in order to simplify the structure, it is apparent that a high speed modular multiplication can be executed by a small circuit.

As described above, the calculating apparatus according to the present invention exhibits an effect to be obtained in that the modular multiplication circuit can be efficiently constituted by the systolic array.

The systolic array performs the modular multiplication in such a manner that a multiplication of large digit is decomposed into small digits (m bits) for each PE while dispensing with a discrimination whether or not $R < N$. Therefore, only the time taken for the signal to pass through a multiplying or a dividing ROM is required to process one clock. Therefore, a high speed pipe line process can be performed.

Furthermore, since the systolic array can be realized by a regular structure composed of the same simple PEs, a large scale circuit such as the VLSI can easily be constituted. In addition, the same control can be adapted to each PE and data is operated while being synchronized by the same clock, so that the systolic array can be easily realized.

Since the calculating apparatus comprising a plurality of PEs is free from a limitation present on the number of the PEs, the size of the circuit can be freely determined and thereby it can easily be formed into an LSI apparatus. Furthermore, the calculating apparatus according to the present invention can be realized by a regular structure composed of the same simple PEs. Hence, the VLSI can easily be employed. In addition, the same control can be adapted to each PE and data is operated while being synchronized by the same clock, so that the structure can easily constituted. In addition, even if the number of the digits of A and B are large or the processing speed is desired to be further raised, the necessity lies in only adding the PEs or the calculating apparatus. Therefore, a satisfactory expansion performance can be realized.

Since the calculation to be performed in the PE is a simple integer calculation, it can easily be realized by a microprocessor or a digital signal processor.

If m is increased, the size of the circuit is enlarged and the processing speed is raised. Therefore, the size of the circuit and the processing speed can be selected on the basis of the value of m. Furthermore, trading off with the processing speed can be easily performed. Therefore, an efficient modular multiplication circuit can be provided.

According to the present invention, an effect can be obtained in that the encryption/decryption apparatus for performing communication by means of the cryptography can be realized by a small circuit size.

Modular Multiplication Using Montgomery Method

A description will now be given of a method of conducting modular multiplication which employs N as the modulus. As an example of such modular multiplication, the description refers to a method proposed by Montgomery (Montgomery method) which conducts modular multiplication in an integer R which is prime to N. The description will begin with an explanation of a cryptosystem which employs modular exponentiation and modular multiplication. Then, a description will follow of processes performed before and after the modular exponentiation and modular multiplication which employ the Montgomery method, as well as of matching of input and output in the modular multiplication employing Montgomery method. Further, a description will be made as to PE which executes the Montgomery method and also as to a circuit which efficiently executes modular exponentiation and modular multiplication by using a plurality of such PEs in parallel.

The following theorem was introduced by Montgomery:

Theorem 1

The condition of the following formula (21) is met on condition of $M = T \cdot N' \mod R$, where N and R are integers which are mutually prime, T is an optional integer and N' is given by $N' = -N^{-1} \mod R$:

$$(T + M \cdot N)/R = T \cdot R^{-1} \mod N \quad (21)$$

Method of proof: Neglected

Therefore, the modular multiplication $Q = A \cdot B \mod N$ can be executed as follows by using an integer R which is prime to N:

$$A_R = A \cdot R \mod N \quad (22)$$

$$B_R = B \cdot R \mod N \quad (23)$$

$$T = A_R \cdot B_R \quad (24)$$

$$T_R = T \cdot R^{-1} \mod N = (T + M \cdot N)/R \quad (25)$$

$$Q = T_R \cdot R^{-1} \mod N \quad (26)$$

The computations of the formulae (24) and (25) inclusive will be referred to as Montgomery modular multiplication. The Montgomery modular multiplication can be expressed as follows:

$$T_R = A_R \cdot B_R \cdot R^{-1} \mod N = (A_R \cdot B_R + M \cdot N)/R \quad (27)$$

$$\text{where } M = A_R \cdot B_R \cdot N' \mod R \quad (28)$$

In executing Montgomery modular multiplication, R is an integer prime to N on condition that R is determined to be 2n (n being an optional integer). In this case, the division by R can simply be performed by a bit-shift operation, so that the Montgomery modular multiplication of the formula (25) or (27) is executed simply by multiplication alone.

Figure 21:
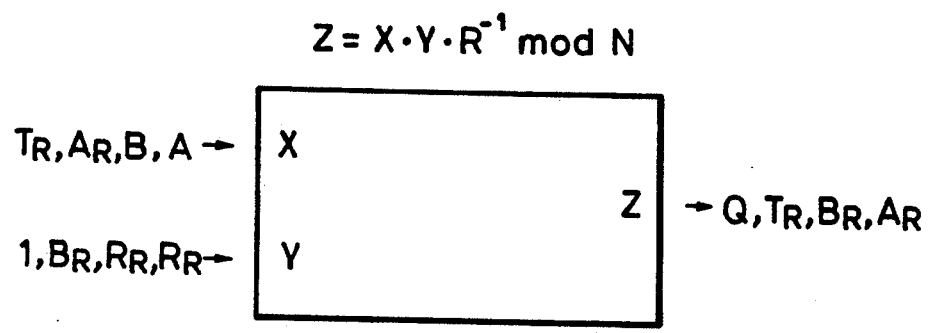
FIG. 21 is a circuit diagram showing an example of a modular multiplication circuit.

Processings before and after the computation of each of the formulae (22), (23) and (26) also can be executed as follows by Montgomery modular multiplication as follows.

$$A_R = A \cdot R \mod N = A \cdot R_R \cdot R^{-1} \mod N$$

$$B_R = B \cdot R \mod N = B \cdot R_R \cdot R^{-1} \mod N$$

$$Q = T_R \cdot R_{-1} \mod N = T_R \cdot 1 \cdot R^{-1} \mod N$$

wherein $R_R = R^2 \mod N$ $R_R$ is a value which is definitely determined by N. When N is given, $R_R$ is determined and can be treated as a constant. Therefore, computations of the formulae (22) to (26) are commonly executed by using a computing circuit which performs $Z = X \cdot Y \cdot R^{-1} \mod N$, thus enabling computation of the modular multiplication $Q = A \cdot B \mod N$ to be determined, as shown in FIG. 21. FIG. 21 shows that the outputs $A_R$, $B_R$, $T_R$ and Q are respectively obtained in response to a set of inputs (A, $R_R$), (B, $B_R$), ($A_R$, $B_R$) and ($T_R$, 1).

Montgomery Modular Exponentiation 1

Modular exponentiation $C = M^e \mod N$ also can be conducted as follows by using Montgomery method.

Input M, e, N, $R_R$ $$M_R = M \cdot R_R \cdot R^{-1} \mod N \quad (29)$$

$$C_R = 1 \cdot R_R \cdot R^{-1} \mod N \quad (30)$$

For i = t to 1

$$\text{If } e^i = 1 \text{ then } C_R = C_R \cdot M_R \cdot R^{-1} \mod N \quad (31)$$

$$\text{If } i > 1 \text{ then } C_R = C_R \cdot C_R \cdot R^{-1} \mod N \quad (32)$$

Next $$C = C_R \cdot 1 \cdot R^{-1} \mod N \quad (33)$$

It is thus possible to carry out modular exponentiation only by Montgomery modular multiplication. The initial value of $C_R$ in formula (30) can be treated as a constant which is determined by $R_R$ and N. The described modular exponentiation conducted through Montgomery modular multiplication alone will be referred to a Montgomery modular exponentiation.

In the execution of Montgomery modular exponentiation, one computation result is used as the input for the subsequent cycle of computation, thus repeating multiplication. Execution of the repeated multiplication by a single circuit is difficult to conduct when the greatest bit number of the output exceeds the greatest bit number allowed for the input.

The inventors therefore sought for any condition for equalizing the greatest bit numbers of the input and output in Montgomery modular multiplication of the formula (27).

Theorem 2

In formulae (27) and (28), when conditions $A_R < 2^{n+u}$, $B_R < 2^{n+u}$, $N < 2^n$ and $R = 2^{n+r}$ are met, the sufficient condition for meeting the requirement of $T_R < 2^{n+u}$ is either $U = 1$ with $r > 1$ or $u > 1$ with $r = u + 1$.

Means of proof

When $R = 2^{n+r}$, $M < 2^{n+r}$ is derived from formula (28).

When conditions are $A_R < 2^{n+u}$, $B_R < 2^{n+u}$ and $N < 2^n$, conditions $A_R \cdot B_R < 2^{2(n+u)}$ and $M \cdot N < 2^{2n+r}$ are met.

The following condition is obtained when carry up is taken into consideration.

$$A_R \cdot B_R + M \cdot N < \max(2^{2(n+u)+1}, 2^{2n+r+1})$$

Therefore, $T_R < \max(2^{2(n+u)+1}, 2^{2n+r+1})$

Consequently, when condition $2^{n+2u+1-r} < 2^{n+1}$ is met, a condition $TR < 2^{n+1}$ is established.

$$\text{Therefore, } u = 1, r > 1 \quad (34)$$

Conversely, when $2^{n+2u+1-r} > 2^{n+1}$ is met, a condition $T_R < 2^{n+2u+1-4}$ is met.

$$\text{Therefore, } u > 1, r = u + 1 \quad (35)$$

In the foregoing explanation, max (A, B) indicates a function which selects the bigger one of A and B.

When either the condition of the formula (34) or the condition of the formula (35) is met, the Montgomery modular exponentiation can be realized by a simple repetition of Montgomery modular multiplication. It is therefore possible to execute the modular exponentiation, simply by selecting inputs to formulae (29) to (33) by selectors S as shown in FIG. 22.

In the circuit shown in FIG. 22, each of the selectors S has, as selectable feedback inputs, $C_R$ in one hand and on the other hand a memory for temporarily storing $C_R$ and $M_R$. Obviously, the arrangement may be such that a single memory which temporarily stores $C_R$ and $M_R$ is provided on the input Side of two selectors S so as to be use commonly by these selectors S.

The switching of the input to such a selector S may employ a shift register adapted for storing e and for successively outputting $e_i$ from the significant bit. and a control unit which, upon receipt of the output from the shift register, determination as to whether $e_i1$ and $i>1$ and delivers a switching signal in accordance with the result of the determination.

In this case, if the requirements of the formulae (34) and (35) are met, Montgomery modular exponentiation can wholly be accomplished by a simple repetition of Montgomery modular multiplication. However, since $u>0$ is derived from the formulae (34) and (35), it is necessary that at least C as the computation result is corrected to satisfy the condition of $C<N$.

The known method proposed by Even requires that such a correction be done each time the Montgomery modular multiplication is executed. In contrast, the method of the invention requires only one correction which is conducted after completion of the modular exponentiation. This correction is a very simple processing and, therefore, does not significantly affect the scale and the processing speed of the circuit which is employed in the following Montgomery modular exponentiation which will be described hereinunder.

Montgomery Modular Exponentiation 2

The modular exponentiation $C=M^e \mod n$ also can be conducted by the following procedure.

Input M, e, N, RR $$MR = M \cdot R_R \cdot R^{-1} \mod N$$

$$CR = 1 \cdot R_R \cdot R^{-1} \mod N$$

For $i=1$ to $t$

If $e_i=1$ then $C_R = C_R \cdot M_R \cdot R^{-1} \mod N$

If $i<t$ then $M_R = M_R \cdot M_R \cdot R^{-1} \mod N$

Next $$C = C_R \cdot 1 \cdot R^{-1} \mod N$$

It is clear also in this case that C can be computed by a simple repetition of the Montgomery modular multiplication by using formulae (34) and (35). It is also clear that modular exponentiation can be executed similarly by arranging such that, in the circuit shown in FIG. 3, two selectors S can independently select $C_R$ and $M_R$ and that both selectors Can commonly select $M_R$.

It is thus understood that both modular exponentiation and modular multiplication can be executed by using only one circuit which conducts computation of the following formula (36).

$$Z = X \cdot Y \cdot R^{-1} \mod N \quad (36)$$

It has also been proved that the formula (36) can be computed by a simple repetition of the Montgomery modular multiplication shown in the formula (27), on condition that the input values satisfy the requirements of the formulae (34) and (35).

Furthermore, computation the formula (36) or the formula (37) can be realized by various practical means, since such computation handles only integers. For instance, a CPU or the like device may conveniently be employed in such computation.

It is therefore possible to construct various cryptosystems employing modular multiplication and modular exponentiation, by using a common computing circuit and computing process which execute computation of the formula (36) or (37).

Embodiment 1 of Montgomery Modular Multiplication/Modular Exponentiation Circuit A description will be given of modular multiplication of $T_R = A_R \cdot B_R \cdot R^{-1} \mod N$ ($A_R$, $B_R < 2^{n+u}$, $R = 2^{n+r}$, $N < 2^n$ integer, u and r meet the requirements of formulae (34) and (35)). AR can be expressed as follows when divided for every v bits. $B_R$, N and $T_R$ also can be expressed as follows when they are respectively divided for every d bits. It is to be noted, however, that the following conditions must be satisfied.

$$n + r \leq m \cdot d,\ n + r \leq k \cdot v,\ X = 2^d \text{ and } Y = 2^v\ (v \leq d)$$

$$\begin{aligned}
A_R &= A_{k-1} \cdot Y^{k-1} + A_{k-2} \cdot Y^{k-2} + \ldots + A_1 \cdot Y + A_0 \\
B_R &= B_{m-1} \cdot X^{m-1} + B_{m-2} \cdot X^{m-2} + \ldots + B_1 \cdot X + B_0 \\
N &= N_{m-1} \cdot X^{m-1} + N_{m-2} \cdot X^{m-2} + \ldots + N_1 \cdot X + N_0 \\
T_R &= T_{m-1} \cdot X^{m-1} + T_{m-2} \cdot X^{m-2} + \ldots + T_1 \cdot X + T_0
\end{aligned} \quad (37)$$

In the formula (37) shown above, $A_i$ ($i=0,\ldots,k-1$, $A_i=0$ when $n+u<i$) represents a bit series which is obtained by dividing $A_R$ at every v bits starting from the least significant bit. Similarly, $B_j$, $N_j$ and $T_j$ ($j=0,\ldots,m-1$) represent bit serieses which are formed by dividing $B_R$, N and $T_R$ at every d bits, respectively, from the least significant bits. In this case, the Montgomery modular multiplication is determined by executing the following computation from $i=0$ to $i=k$. In the following formula, $T\_i$ indicates the value of $T_R$ in the i-th cycle of computation, unlike Ti appearing in the formula (36).

$$T\_i = (T\_{i-1} + A_i B_R \cdot Y + M_{i-1} \cdot N)/Y \quad (38)$$

wherein $M_{i-1} = (T\_{i-1} \mod Y) \cdot N_o' \mod Y$ and $T\_{-1} = 0$, $N_o' = N' \mod Y$.

In order to execute this computation by parallel processing, $B_R$ and N are represented as follows by using $B_j$ and $N_j$.

Algorithm L:
For $i = 0$ to $k$
  $M_{i-1} = dw_v\,(dw_v\,(T_{i-1,0}) \cdot N_0')$
  For $j = 0$ to $m - 1$
    $R_{i,j} = T_{i-1,j} + L_{i-2,j+1} \cdot X/Y^2 +$
       $Y \cdot A_i \cdot B_j + M_{i-1} \cdot N_j$
    $L_{i,j} = dw_v\,(R_{i,j})$
    $T_{i,j} = (R_{i,j} - L_{i,j})/Y$
  Next
Next
  wherein $dw_d\,(Z) = Z \mod 2^d$
    $up_d(Z) = (Z - dw_d(Z))/2^d$ All the initial values of $T_{i,j}$ and $L_{i,j}$ are zero.

In the Algorithm L, multiplication and division by the constants $X=2^d$ and $Y=2^v$, in the terms such as $Y \cdot A_i \cdot B_j$, $L_{i-2,j+1} \cdot X/Y^2$ and $T_{i,j}=(dw_d\,(R_{i,j})-L_{i,j})/Y$ are realized by shifting bits with respect to other values. Thus, the computation with respect to $T_{i,j}$ means that $T_{i,j}$ is the value of v-th bit to $(d+v-1)$-th bit of $T_{i,j}$ as counted from LSB. It is to be noted, however, $L_{i,j}$ is the value down to $(v-1)$-th bit from LSB of $R_{i,j}$. Thus, division by Y, i.e., computation of $1/Y$, is realized by a bit shift for every $R_{i,j}$ towards the LSB. Therefore, $L_{i-2,j+1}$ is used when computing $R_{i,j}$, with multiplication by $X/Y^2$ for obtaining figure matching.

Figure 23:
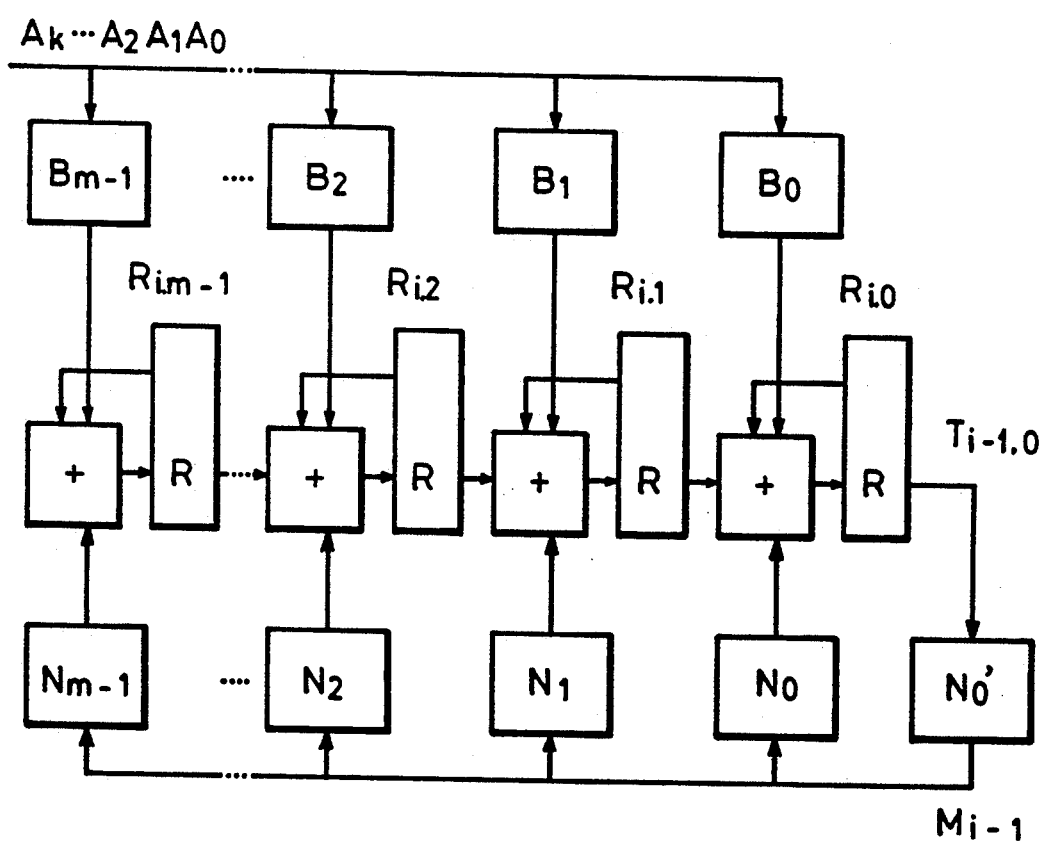
FIG. 23 is a block diagram showing an example of the construction of the modular multiplication circuit.

FIG. 23 shows a circuit which executes the algorithm L. In this algorithm, i represents clocks, while j corresponds to the positions of the registers R in FIG. 23.

Thus, the register on the right end as viewed in FIG. 23 is expressed as $R_{i,0}$, while the register on the left end is $R_{i,m-1}$.

A description will be given of the construction and operation of the circuit shown in FIG. 2. The following description assumes the case of $v=1$ for the purpose of simplification of explanation. Referring to FIG. 2, $B_j$, $N_j(j=0, \ldots, m-1)$ and $N_0'$ are respectively d-bit multipliers each having a multiplicator stored therein. Each multiplier is therefore realized by d pieces of AMD. When N is an odd number, the multiplier for computing $M_{i-1}$ can be dispensed with, because in such a case the condition is $N_0'=1$. In this case, LSB of $T_{i-1,0}$ is outputted. Input to and output from the adder, indicated by +, are as follows. The output $M_{i-1} \cdot N_j$ from the lower-place multiplier has d bits and so does the output $A_i \cdot B_j$ of the multiplier of the upper place. In order to double the value of the output $A_i \cdot B_j$, this output is input with a one-bit shift to upper place with respect to the output $M_{i-1} \cdot N_j$. The input $T_{i-1,j}$ from the register is inputted after the bits of $R_{i-1,j}$ starting from the second bit as counted from LSB are shifted by one bit toward lower place, so as to obtain figure matching with $M_{i-1} \cdot N_j$. $L_{i-2,j+1} \cdot 2^{d-2}$ means that the one-bit output $L_{i-2,j+1}$ from PE which ahead of the PE which is immediately ahead of the instant PE is inputted to the $(d-1)$-th bit of $M_{i-1} \cdot N_j$ as counted from LSB. In this case, $(d+3)$-bit output is derived from the adder, on condition of $T_{i-1,j} < 2^{d+2}$. Thus, the registers which receive outputs from the adders are $(d+3)$-bit registers.

It is thus possible to execute the computation of formula (38) by the circuit shown in FIG. 23. Namely, Montgomery modular multiplication can be executed by inputting numbers $A_0$ to $A_k$.

The foregoing description taken in conjunction with FIG. 23 is based on an assumption of $v=1$. However, it will be clear that Montgomery modular multiplication can be executed by the same procedure for any value of v which meets the condition of $v \leq d$.

The described Embodiment 1 of Montgomery modular multiplication circuit performs a high-speed processing with a circuit of a very small scale.

Embodiment 2 of Montgomery Modular Multiplication/Modular Exponentiation Circuit In order to realize these computations by means of a systolic array, $B_R$ and N ar expressed by using $B_j$ and $N_j$ as follows.

Algorithm M:
For i = 0 to k
  $M_{i-1} = dw_v (dw_v (T_{i-1,0}) \cdot N_0')$
  For j = 0 to m - 1
    $R_{i,j} = T_{i-1,j} + C_{i,j-1} + L_{i-2,j+1} \cdot X/Y^2 + Y \cdot A_i \cdot B_j + M_{i-1} \cdot N_j$
    $L_{i,j} = dw_v (R_{i,j})$
    $T_{i,j} = (dw_{d+v} (R_{i,j}) - L_{i,j})/Y$
    $C_{i,j} = up_{d+v} (R_{i,j})$
  Next
Next
  wherein $dw_d(Z) = Z \mod 2^d$
  $up_d(Z) = (Z - dw_d(Z))/2^d$
  initial values of $T_{i,j}$, $C_{i,j}$ and $L_{i,j}$ are all zero.

In the algorithm M shown above, $C_{i,j-1}$ is used when $R_{i,j}$ is computed as a carry. Computations containing X and Y as constants, such as $Y \cdot A_i \cdot B_j$, $L_{i-2,j+1} \cdot X/Y^2$ and $T_{i,j} = (dw_{d+v}(R_{i,j}) - L_{i,j})/Y$ are realized by shifting bits with respect to other values. Thus, computation in regard to $T_{i,j}$ means that the value of v-th to $(d+v-1)$-th bit of $R_{i,j}$ as counted from LSB is used as $T_{i,j}$.

It is to be noted that $L_{i,j}$ is the value of $R_{i,j}$ up to $(v-1)$th bit as counted from LSB. Thus, division by Y, i.e., computation of $1/Y$, for obtaining $T_{i,j}$ is realized by a bit-shift toward lower order place for every $R_{i,j}$. Therefore, $L_{i-2,j+1}$ is used in computing $R_{i,j}$, with computation of $X/Y^2$ for obtaining figure matching.

Figure 24:
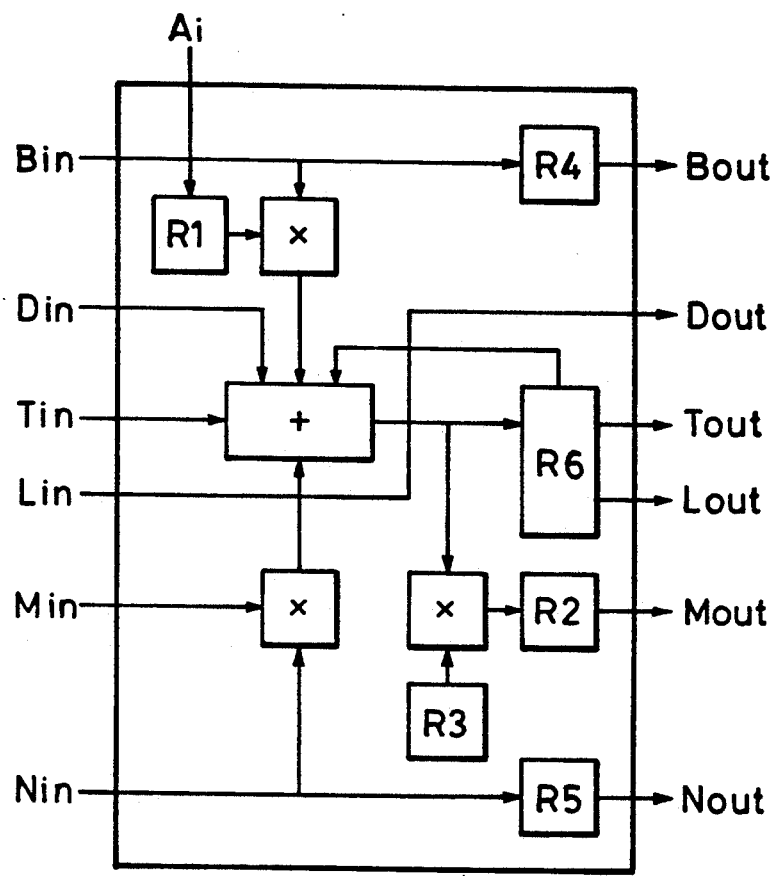
Figure 25:
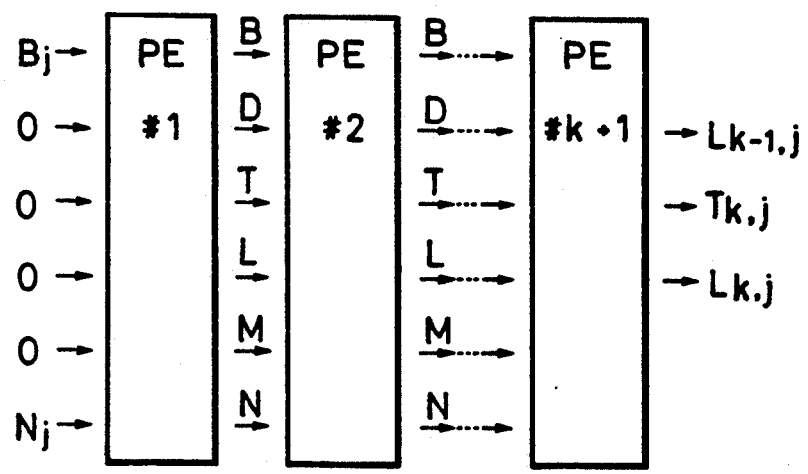

FIG. 24 shows a circuit which computes $R_{i,j}$, $L_{i,j}$, $T_{i,j}$ and $C_{i,j}$ in the algorithm M. FIG. 25 shows a systolic array composed of a cascade connection of PEs (Processing Elements) each forming the circuit shown in FIG. 24. In this algorithm, j represents clocks, while i represents the positions of PEs as viewed in FIG. 25. The PE on the right-hand end is expressed as $i=0$ (#1), while the left-hand end PE is represented by $i=k$ (#k+1).

Referring to FIG. 25, the $(\#i+1)$-th PE contains a value $A_i (i=0, \ldots, k)$ stored in an internal register of this PE. Connections are made between the successive PEs through $B_{in}$ and $B_{out}$, $D_{in}$ and $D_{out}$, $T_{in}$ and $T_{out}$, $L_{in}$ and $L_{out}$, $M_{in}$ and $M_{out}$ and $N_{in}$ and $N_{out}$. The $B_{in}$ and $N_{in}$ of the #1 PE successively receive $B_j$ and $N_j (j=0, \ldots, m-1)$, respectively, starting from lower order figures of $B_j$ and $N_j$, while 0 is set in the inputs of $D_{in}$, $T_{in}$, $L_{in}$ and $M_{in}$.

The construction and operation of the circuit shown in FIG. 24 will be described on an assumption of $v=1$, for the purpose of simplification of explanation. Referring to FIG. 24, a mark X indicates a multiplier which is realized by d pieces of AND. $R_1$ to $R_3$ are 1-bit registers which hold the values of $A_i$, $N_{1-i}$ and $N_0'$. When N is an odd number, the multiplier for computing $M_{i-1}$ and the register $R_3$ for holding $N_0'$ can be dispensed with since in this case $N_0'$ is 1. The register $R_2$ holds the LSB of $T_{i-1,0}$. Registers $R_4$ and $R_5$ are d-bit registers which are adapted to delay the inputs from Bin and Nin by one clock and to deliver the delayed inputs to the next PEs. Input to and output from the adder, indicated by +, are as follows. The output $M_{3-1} \cdot N_j$ from the lower-place multiplier has d bits and so does the output $A_i \cdot B_j$ of the multiplier of the upper place. In order to double the value of the output $A_i \cdot B_j$, this output is input with a one-bit shift to upper place with respect to the output $M_{i-1} \cdot N_j$. The input $T_{i-1,j}$ from the preceding PE is inputted after the bits of $R_{i-1,j}$ starting from the second bit as counted from LSB are shifted by one bit toward lower place, so as to obtain figure matching with $M_{i-1} \cdot N_j$. $L_{i-2,j+1} \cdot 2^{d-2}$ means that the one-bit output $L_{i-2,j+1}$ from PE which ahead of the PE which is immediately ahead of the instant PE is inputted to the $(d-1)$-th bit of $M_{i-1} \cdot N_j$ as counted from LSB. In this case, if $C_{i,j-1}$ as carry bits meets the condition of $C_{i,j-1} < 2^{d+2}$, the output from the adder is of $(d+3)$ bits, so that $C_{i,j-1}$ has two bits. Therefore, the register $R_6$ which receives the output from the adder has $(d+3)$ bits.

It is thus understood that the formula (38) can be executed by a single PE shown in FIG. 24.

By connecting $(k+1)$ PEs in the form of a pipeline as shown in FIG. 25 and operating such connection of PEs in synchronization with clocks, it is possible to execute a high-speed computation of Montgomery modular multiplication.

It is to be noted, however, the following computation in accordance with an algorithm N be conducted after completion of the Algorithm 2, in view of the fact that the final output from the array shown in FIG. 25 is divided into the output $T_{k,j}L_{k,j}$ from the (k+1)-th PE and the output $L_{k-1,j+1}$ of the k-th PE.

Algorithm N:
```
For j = 0 to m - 1
  R_{k+1,j} = T_{k,j} + C_{k+1,j-1} + L_{k-1,j+1} · X/Y2
  T_{k+1,j} + dw_d (R_{k+1,j})
  C_{k+1,j} = up_d (R_{k+1,j})
  T_{k+2,j} = T_{k+1,j} + C_{k+2,j-1} + L_{k,j+1} · X/Y
  C_{k+2,j} = up_d (T_{k+2,j})
Next
```

In this algorithm, $T_{k+2,j}$ is the bit series $T_j(j=0, \ldots, m-1)$ formed by dividing $T_R$. The computation of $R_{k+1,j}$ is the same as the computation which is conducted in the algorithm 2 under the conditions of $A_i = M_{i-1} = 0$, so that it can be executed by the PE shown in FIG. 24. The computation of $T_{k+2,j}$ is substantially the same as the computation of $R_{k+1,j}$. The division by 2, i.e., computation of ½, is not conducted in regard to $T_{k+1,j}$ and $C_{k+1,j}$. Therefore, $L_{k,j+1}$ also is added to $L_{k-1,j+1}$ with upward one-bit shift to with respect to the latter. Therefore, in this Embodiment, a one-bit half adder (HA) and a register $R_7$ are provided in the adder of the PE shown in FIG. 24 and below the LSB of the register R6. The half adder HA receives LSB of the output $R_{i-1,j}$ of the preceding PE and $C_{k+2,j-1}$ ($C_{k+2,j-1}$ is at the greatest one bit in this state) and delivers the result of the addition to the newly prepared register using the carry bit as the carry to the adder. With this arrangement, $L_{k,j+1}$ is automatically shifted by one bit to higher order place when it is added. Thus, the PE for computing $T_{k+2,j}$ has a construction different from that of other PEs. This PE, however, can easily be formed by adding, to the construction of other PEs, a one-bit selector which selects, as the carry to the adder, the carry from the half adder only on condition of i=k+2. Thus, all the PEs can have the same construction.

Figure 26:
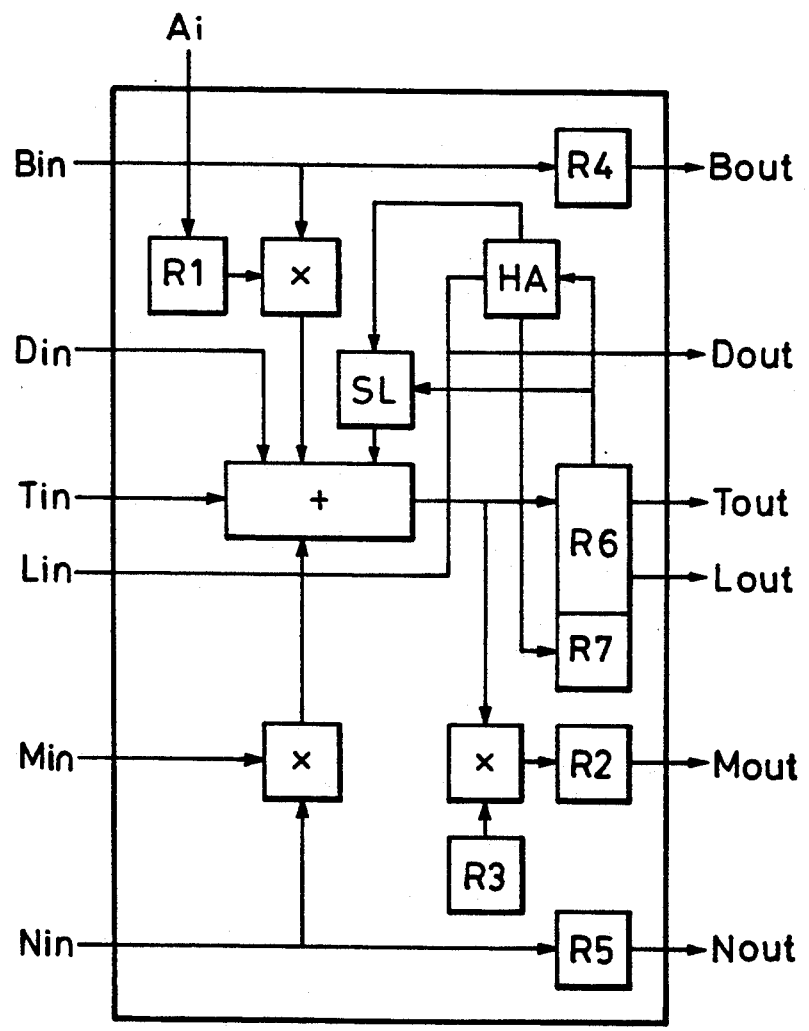
FIG. 26 is an illustration of a common PE.

Thus, high-speed Montgomery modular multiplication is performed by (k+3) pieces of PEs in total, i.e., by using the PE of FIG. 26 as the PE of FIG. 25 for obtaining $T_R$ and two PEs added to the array of FIG. 25.

The description taken in conjunction with FIGS. 24 and 26 are based upon an assumption that the condition v=1 is met. It is, however, clear that Montgomery modular multiplication can be executed by a similar technique also for the values of v which meet the condition of v≦d.

Embodiment 3 of Montgomery Modular Multiplication/Modular Exponentiation Circuit The following systolic array can be constructed in order to execute the computation of the formula (37) in accordance with the following algorithm.

Algorithm O:
```
For i = 0 to k
  M_{i-1} = dw_v (dw_v (T_{i-1,1}) · N_0')
  For j = 0 to m
    R_{i,j} = T_{i-1,j+1} + C_{i,j-1} + A_i · B_{j-1} + N_{i-1} · N_j
    T_{i,j} = dw_v (R_{i,j})
    C_{i,j} = up_v (R_{i,j})
  Next
Next
```

The computation of $R_{i,j}$ performed in the algorithm 0 is different from that performed by the algorithm 2 in that the difference in the figures of $A_i \cdot B$ and $T_{i-1,j}$ from $M_{i-1} \cdot N_j$ is realized by shifting or deviating coefficients concerning j of $B_j$ and $T_{i,j}$ employed, rather than by a bit shift. Therefore, the value $L_{i,j}$, which is generated due to bit offset in the algorithm M, is not produced in the algorithm O.

Figure 27:
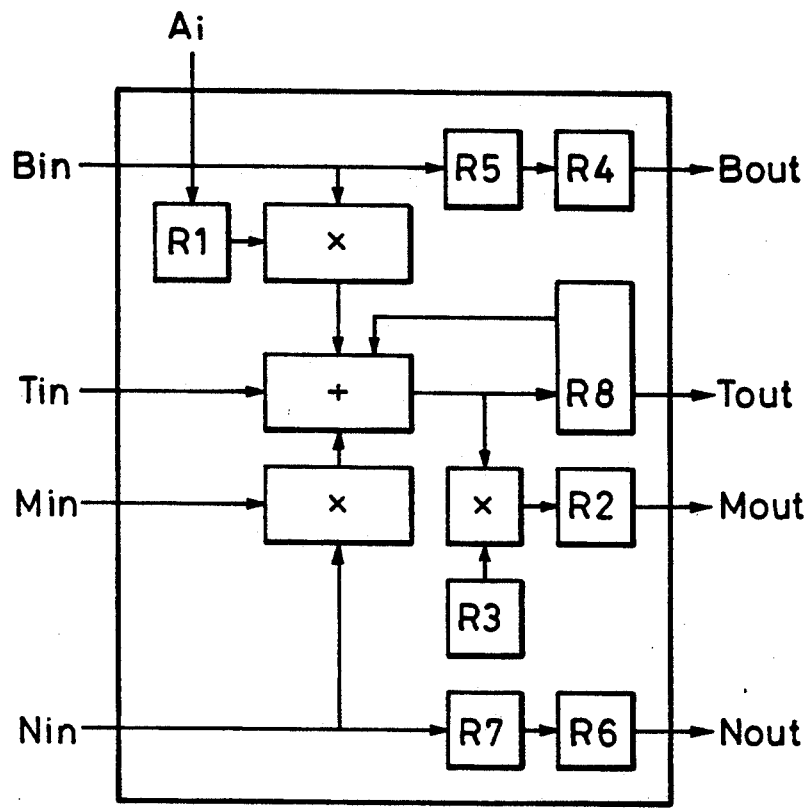
Figure 28:
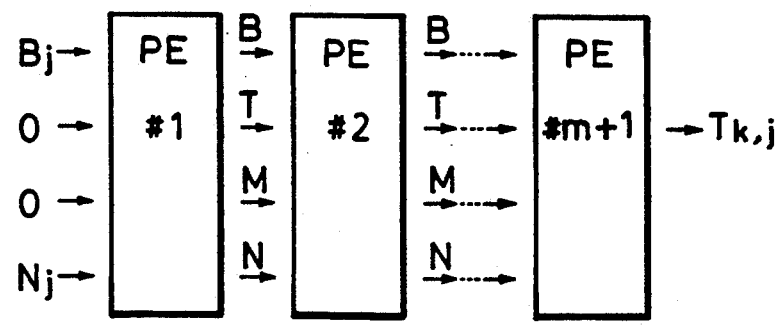

FIGS. 27 and 28 show a PE and a systolic array which execute computation of $R_{i,j}$, $T_{i,j}$ and $C_{i,j}$ in the algorithm O. Symbols j and i correspond to clocks and positions of PEs also in the algorithm O. Referring to FIG. 28, the (#i+1)-th PE has an internal register in which is stored the value of $A_i$ (i=0, ..., k). PEs are successively connected through $B_{in}$, $B_{out}$; $T_{in}$, $T_{out}$; $M_{in}$, $M_{out}$ and $N_{in}$, $N_{out}$. Inputs to $T_{in}$ and $M_{in}$ of the #1 PE are set to 0, respectively. Furthermore, Bin and Nin respectively receive $B_j$ and $N_j$ (j=0, ..., m-1) starting from the lower order place. Unlike the operation employing the algorithm M, $B_j$ is delayed by one clock behind $N_j$.

The following description is based upon an assumption of v=d, for the purpose of simplification of explanation. Referring to FIG. 27, a symbol X indicates a multiplier for multiplying numbers each having d bits, while + indicates an adder. The input to and output from the adder are as follows. The output $A_i \cdot B_{j-1}$ from the multiplier of upper place and the output $M_{i-1} \cdot N_j$ from the multiplier of the lower place are of d bits, respectively. Therefore, if $C_{i,j-1}$ meets the condition of $C_{i,j-1} < 2$, the output from the adder is of 2.d+2 bits. Symbols $R_1$ to $R_7$ indicate d-bit registers. A register R8 which receives the output from the adder is a (d+2)-bit register. The register R8 delivers to the next PE the value of bits up to d-th bit from LSB thereof to the next PE as the value $T_{i-1,j+1}$. The (d+2) bits of the higher order are fed back to the adder as the value $C_{i,j-1}$.

In the circuit shown in FIG. 27, $N_j$ is inputted with one-clock delay after $B_j$, so that $A_i \cdot B_{j-1}$ and $M_{i-1} \cdot N_j$ are simultaneously computed. At the same time, in order that $T_{i-1,j+1}$ is computed simultaneously with $A_i \cdot B_{j-1}$ and $M_{i-1} \cdot N_j$, $B_j$ and $N_j$ input from $B_{in}$ and $N_{in}$ are delivered to the next PE after a delay by two clocks.

It is therefore possible to execute the computation of the formula (37) also by the PE of the type shown in FIG. 27. This proves that Montgomery modular multiplication can be achieved at a high speed by the systolic array shown in FIG. 28. In such a case, no processing which would correspond to an algorithm is employed, and the computation can be conducted by an array composed of (m+1) PEs as shown in FIG. 28.

Although the description taken in conjunction with FIG. 27 is based on an assumption of v=d, it will be clear that Montgomery modular multiplication can be executed by a similar method for any value of v which meets the condition of V<d.

Figure 29:
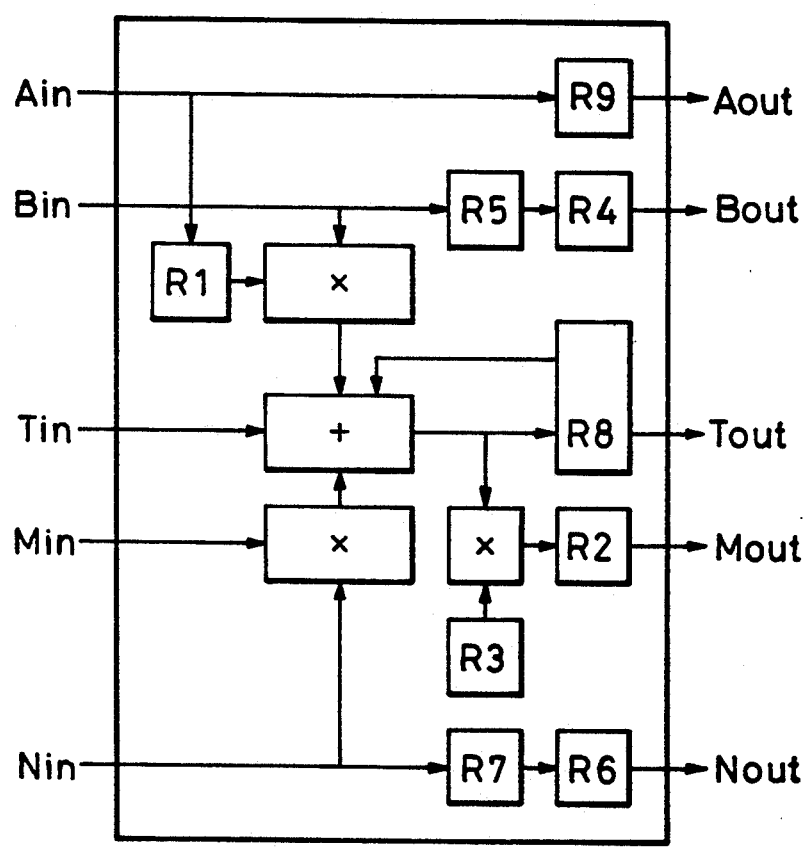
Figure 30:
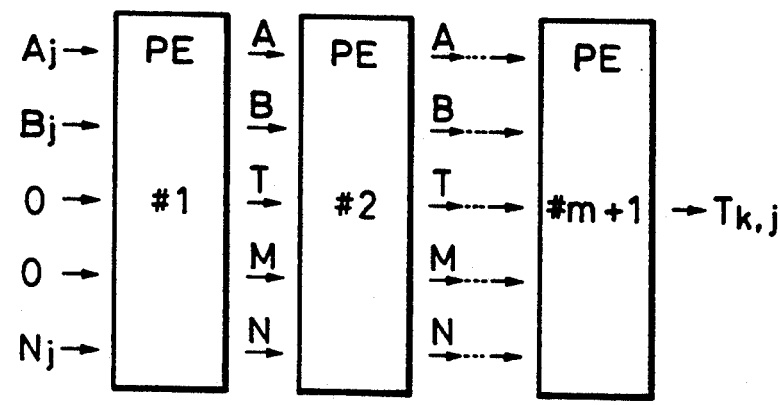

Embodiment 4 of Montgomery Modular Multiplication/Modular Exponentiation Circuit In the execution of the algorithm O shown in Embodiment 3, it is not necessary that Ai is beforehand set in PE. Namely, the arrangement may be such that Ai (i=0, ..., k−1) are successively inputted starting from the lower order place in synchronization with $N_j$ through $A_{in}$ as shown in FIG. 28 and that $A_{in}$ and $A_{out}$ are connected as shown in FIG. 30 so as to deliver the inputted $A_i$. In such an arrangement, $A_i$(i=0, ..., k−1) are inputted one-clock advance of $B_j$ (j=0, ..., m−1). It is therefore possible to conduct the computation $A_0 \cdot B_j$ (j=0, ..., m−1) for all values of j, provided that $A_0$ is held in the register R1 simultaneously with the input of $A_0$ in the #1 PE. On the other hand, Bj are input to the next PE with 2-clock delay, whereas $A_i$ is delayed only by one clock. Therefore, if $A_i$ is inputted and held in advance of $B_j$ (j=0, ..., m−1) in #(i−1)-th PE, $A_{i+1}$ is inputted and held in advance of $B_j$ (j=0, ..., m−1) in #1 PE. It is therefore possible to execute the computation of $A_{i+1} \cdot B_j$ (j=0, ..., m−1) in #1 PE. Thus, the algorithm 4 can be realized by the PE and systolic array of FIGS. 29 and 30, without requiring change in the circuit scale and processing speed.

Figure 31:
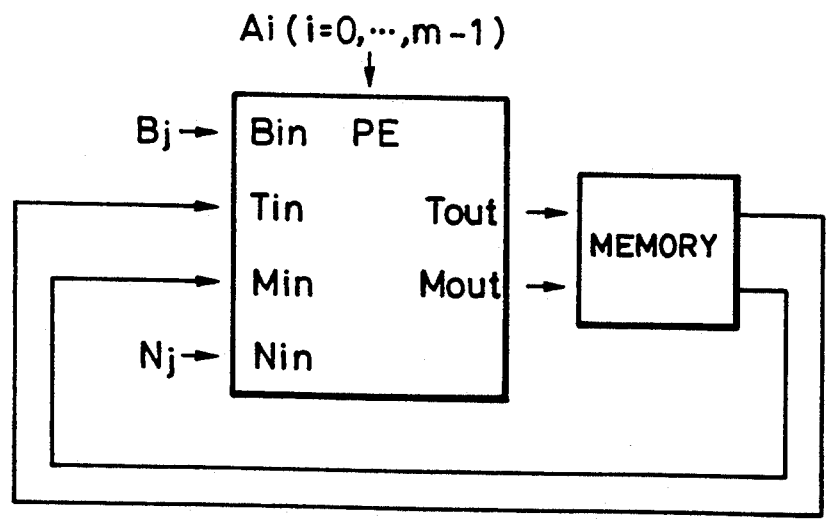

Embodiment 5 of Montgomery Modular Multiplication/Modular Exponentiation Circuit Montgomery modular exponentiation can be executed by repeating computation of the formula (37). The computation of the formula (37) can be performed by PE shown in FIGS. 27 and 29. By combining the PE with a memory as shown in FIG. 31, Montgomery modular exponentiation can be executed by using a single PA a plurality of times which is expressed by (3·t/2+2)·q, where q is the number of PEs necessary for forming a Montgomery modular multiplication array. The number q is therefore (K+3) in the arrangement of FIG. 26 and (k−2) in the arrangement shown in FIGS. 27 and 29. Therefore, when p pieces of PE are employed, the number of repetition is given by (3·t/2+2)·q/p. Since the processing speed is in inverse proportion to the number o repetition, the method of Embodiment 5 can provide a processing speed proportional to the number of PEs employed. Furthermore, the efficiency of modular exponentiation circuit is never changed when the processing speed is increased or when the scale of the circuit is decreased by varying the number of the PEs.

Figure 32:
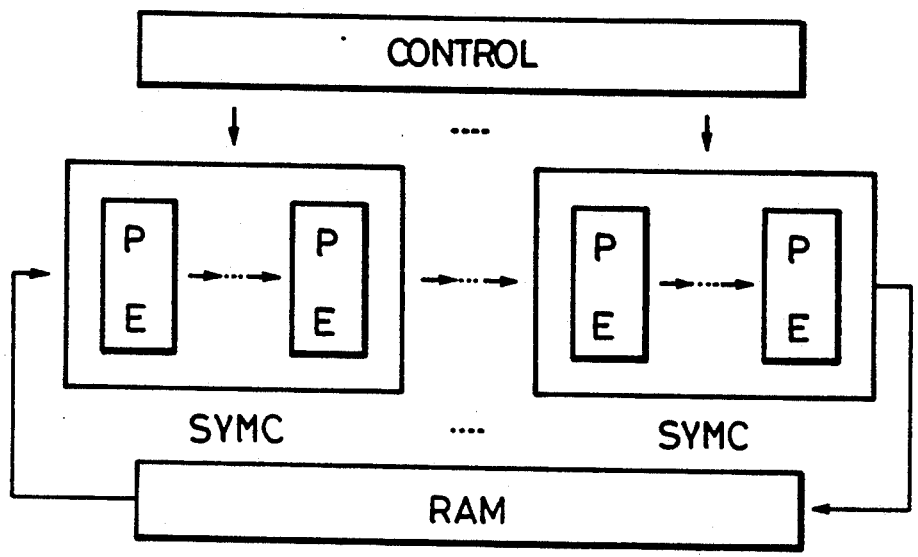
FIG. 32 is a circuit diagram showing the construction of a circuit which executes modular exponentiation and modular multiplication using SYMC.

It is therefore possible to construct an apparatus as shown in FIG. 32. In FIG. 32, SYMC (Systolic Modular Exponentiation Chip) is a chip containing p pieces of cascade-connected PEs. The number p of the PEs can be freely selected within the range of $1 \leq p \leq (3 \cdot t/2+2) \cdot q$. It is therefore possible to construct a chip of a desired circuit scale. SYMC has a regularity in its circuit construction so that it can easily be formed into an apparatus or in the form of a chip. The processing speed can be increased in proportion to the number of SYMCs, by cascade-connecting a desired number of SYMCs as shown in FIG. 32. The change in the number of SYMCs essentially requires a change in the number of the processing circuits for SYMC. This, however, can easily be achieved by constructing a control circuit with an externally programmable ROM or the like device.

Other Embodiments of Montgomery Modular Multiplication/Modular Exponentiation Circuit In the algorithm of each of Embodiments described hereinbefore, the processing performed by each PE is a simple integer computation. Therefore, it is not essential that PEs are constructed in the form of a chip. Namely, Montgomery modular exponentiation apparatus can be realized without difficulty by an ordinary DSP or a CPU.

The embodiments described hereinabove have regular circuit constructions and controls and delays are only local. These embodiments, therefore, are optimum for production in the form of VLSIs.

The cascade connection of the PEs in the described Embodiments is not exclusive. Namely, PEs may be used as independent processing elements and may be controlled by a well-known microprogramming method so as to realize modular multiplication and modular exponentiation.

In the Embodiments shown in FIGS. 24, 26 and FIGS. 27, 29, PE executes all the processings for the computation of the formula (38). It is to be understood that the present invention does not exclude a case in which different portions of the formula (38) are computed by different processing elements so as to be finally executed by these processing elements.

When the present invention is carried out by using a systolic array, it is possible to input control signals together with the data. Therefore, PE may be constructed in such a manner as to include a register for transmitting control signals.

Circuits and methods have been described which perform modular exponentiation modular multiplication by employing systolic arrays. These methods and circuits eliminate all the drawbacks of the process proposed by Even. Thus, the present invention provides an efficient cryptosystem which offers the following advantages.

The modular exponentiation/modular multiplication circuit of the present invention can be built up in the form of, for example, a VLSI when a specifically high speed of cryptosystem is required. The modular exponentiation/modular multiplication circuit of the present invention has a regular structure realize by simple PEs. In addition, the control of PEs and delay time in each PE are only local. The modular exponentiation/modular multiplication circuit, therefore, is most suitable for construction and use in the form of a VLSI. Thus, the present invention provides a high-speed cryptosystem.

When preference is given to reduction in size than to increase in the processing speed, such a demand is met by constructing the modular exponentiation/modular multiplication circuit of the invention by a fewer number of PEs. Such an arrangement also is easy to form a circuit without impairing the features provided by the use of PEs, i.e., regularity of the structure and locality of control and delay time. Furthermore, since the computation performed din each PE is a simple integer computation, a simple cryptosystem can be realized by software-type approach employing a CPU or a DSP which performs the computing process in accordance with the present invention.

A demand may arise for increase in the processing speed of a built-up cryptosystem of the invention employing a small-scale circuit such as SYMC composed of several pieces of PE. Such a demand can easily be met by cascade-connecting such small-scale circuits. Thus, according to the invention, it is possible to obtain a cryptosystem in which a desired increase in the processing speed can be attained simply by adding a module cryptic apparatus, without requiring modification or alteration of the construction of such cryptic apparatus.

A demand also may arise to increase, after building up of a cryptosystem, the number of bits of the integers employed in the computation for the purpose of enhancing the effectiveness of the cryptosystem. This demand also can be met without difficulty when the same circuit as that already used in the system or a similar circuit containing an increased number of PEs is added to the existing cryptosystem. This owes to the fact that the modular exponentiation/modular multiplication circuit of the present invention enables an easy trade-off between the circuit scale and the number of the processing cycles, i.e., to the fact that any change in the bit numbers of integers employed in the computation can be dealt with by a change in the number of the processing cycles. It is therefore not necessary to rebuild the cryptic apparatus when there is a demand for increase in the cryptographic strength of the system. The same applies to the case where the numbers of bits of the integers are to be reduced. Namely, reduction in the bit numbers of the integers can easily be achieved without requiring rebuilding of the cryptic apparatus.

The described advantages brought about by the present invention cannot be achieved by known modular exponentiation/modular multiplication cryptographic scheme. It is to be understood that a flexible and expandable cryptosystem can be realized by the circuit and method carrying out the modular exponentiation/modular multiplication scheme in accordance with the present invention.

A comparison will now be made between a systolic array which does not rely upon Montgomery method (such a systolic array will be referred to as "array 0") and systolic arrays of Embodiments described hereinabove which employ Montgomery method, in particular the systolic array (array 1) of Embodiment 1 and the systolic array of Embodiments 2 and 3 (array 2).

The array 0 essentially requires dividing operation so that residue computation is conducted by using a residue table such as a ROM, whereas the arrays 1, 2 can perform modular multiplication purely by multiplying operations. In arrays 1 and 2, therefore, the processing time required for one clock is much shorter than in the array 0, so that the arrays 1 and 2 provide much higher processing speeds than the array 0. It is also to be noted that the number of PEs required in arrays 1 and 2 is smaller than that in the array 0 because the latter essentially requires a PE for processing carry bits. This means that the arrays 1 and 2 provide a processing speed which is several times as high that of the array 0 of the same circuit scale.

The array 1 requires fewer types of PEs than the array 0, which facilitates standardization of the PEs as shown in FIG. 26. Furthermore, the array 2 can be composed of only one type of PE. The arrays 1 and 2, therefore, are easier to be constructed into circuits, with reduced waste as compared with the system 0.

When the array 0 employs a residue table, the arrays 1 and 2 have greater flexibility or adaptability to increase in the number of bits of the integers employed in the computation than the array 0. This is because the number of bits of the integers are undesirably limited in the array 0 by the maximum capacity of the residue table. In the arrays 1 and 2, there is no necessity for such a residue table because the residue is computed by multiplication. However, the arrays 0 to 2 exhibit the same level of adaptability, more specifically no practical limit in adaptation, to the reduction in the number of bits of the integers employed in the computation, i.e., when a Chinese remainder theorem is employed. Thus, the arrays 1 and 2 suffer from no limitation in the change in the numbers of bits of the integers. Therefore, the arrays 1 and 2 do not require any modification or rebuilding of the circuit such as SYMC for computations employing different number of bits.

As will be understood from the foregoing description, the cryptic apparatus of the invention employing the modular multiplication/modular exponentiation circuit of any of the described Embodiments.

Embodiment 6 of Montgomery Modular Multiplication/Modular Exponentiation Circuit In Embodiment 6, the value $T_{-i}$ of TR in the i-th computing cycle is determined as follows, unlike the foregoing Embodiment in which $T_{-i}$ is determined by the formula (38).

$$T_{-i} = (T_{-i-1}/Y + A_i B_R) + M_i \cdot N \tag{39}$$

wherein $M_i = ((T_{-i-1}/Y + A_i B_R) \bmod Y) \cdot N_0' \bmod Y$,
$T_{-1} = 0$ and $N_0' = N' \bmod Y$ In order to realize this computation function by parallel processing performed by a plurality of PEs, BR and N are decomposed into Bj and Nj as follows.

Algorithm P:
    For i = 0 to k − 1
        For j = 0 to m − 1
            $S_{i,j} = T_{i-1,j}/Y + A_i \cdot B_j + C_{i,j-1}$
            $M_i = dw_v(dw_v(S_{i,0}) \cdot N_0')$
            $R_{i,j} = S_{i,j} + M_i \cdot N_j + L_{i-1,j+1} \cdot X$
            $L_{i,j} = sw_v(R_{i,j})$
            $T_{i,j} = dw_{d+v}(R_{i,j}) - L_{i,j}$
            $C_{i,j} = up_{d+v}(R_{i,j})$
        Next
    Next
        wherein $dw_d(Z) = Z \bmod 2^d$
                $up_d(Z) = (Z - dwd(Z))/2^d$
                initial values of $T_{i,j}$, $C_{i,j}$ and L are all zero In the algorithm P, $C_{i,j-1}$ is used as a carry in the computation of $S_{i,j}$. At the same time, computations involving X and Y as constants, e.g., $L_{i-1,j+1} \cdot X$ and $T_{i-1,j}/Y$ can be realized by shifting bits with respect to other values. Thus, the computation concerning $T_{i,j}$ means that the value of the v-th to (d+v−1)-th bit of $R_{i,j}$ as counted from LSB is used as $T_{i,j}$. It is to be understood, however, that $L_{i,j}$ is the value of bits from LSB to (V−1)-th bit of $R_{i,j}$. Thus, computation of 1/Y for determining $T_{i,j}$ is realized by a bit shift towards the lower order place for every $R_{i,j}$. $L_{i-1,j+1}$, therefore, is used in the computation of $R_{i,j}$ and is computed by being multiplied by X for the purpose of figure matching.

Assuming that i and j are number of the processing cycles and clocks, respectively, only $S_{i,j}$ and $R_{i,j}$ need to be computed for each value of j in the algorithm P, since $L_{i,j}$, $T_{i,j}$ and $C_{i,j}$ can be realized only by bit shifts. $S_{i,j}$ and $R_{i,j}$ can be realized by the same computation shown below:

$$f = d/y + a \cdot b + c \cdot x \tag{40}$$

wherein y is $2^v$ or 1 and x is $2^d$ or 1.

The values x and y represents whether there is a bit shift or not. The formula (40), therefore, can be computed by the PE shown in FIG. 14.

Figure 33:
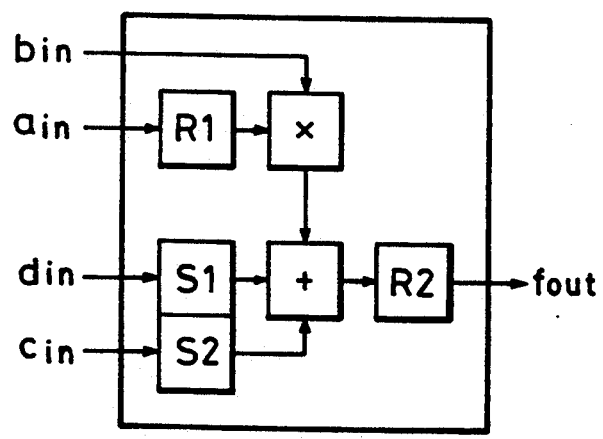

The construction and operation of the circuit shown in FIG. 33 will be described. In the following description, v is assumed to be v=1 for the purpose of simplification of explanation. In FIG. 33, X represents a multiplier which can be realized by d pieces of AMD. R1 is a one-bit register which holds a. S1 and S2 are selectors which select between two modes: namely, a mode in which d or c are bit-shifted and a mode in which they are not bit-shifted, in accordance with the values y or x. An adder represented by + performs addition of the output a·b from the multiplier and the outputs d/y and c·x from the selectors, thereby determining the value of f. R2 is a register which holds the output from the adder. It is thus understood that the formula (40) can be computed by the PE of FIG. 33.

Figure 34:
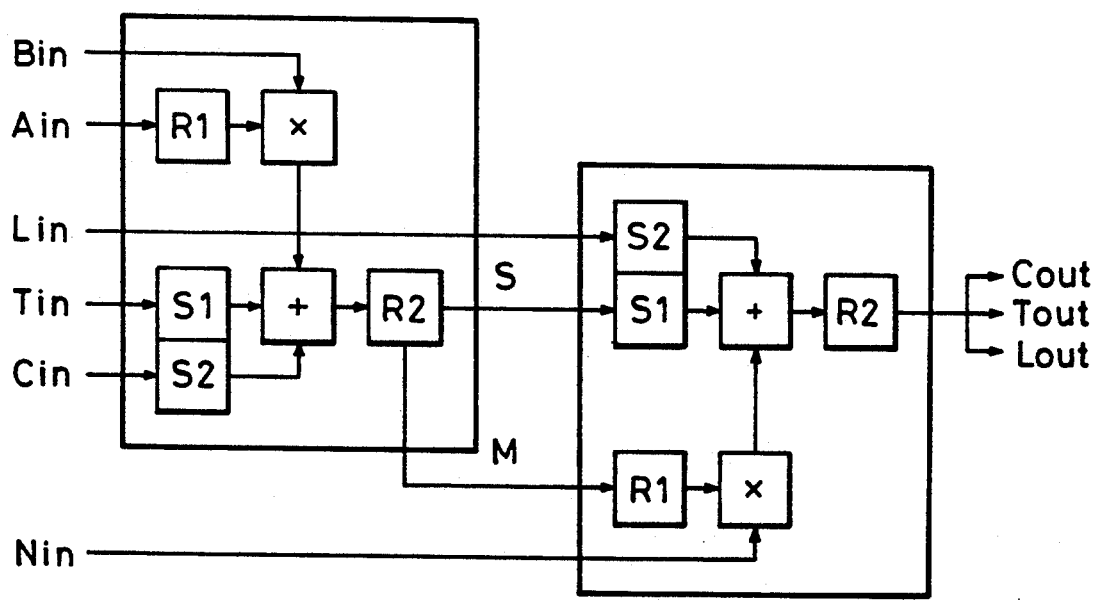

Therefore, all the computations in the algorithm P can be determined by combining, as shown in FIG. 34, a pair of PEs of the type shown in FIG. 33. It is to be noted that $B_{in}$ and $N_{in}$ in FIG. 34 successively receive $B_j$ and $N_j$ ($j=0,\ldots,m-1$), respectively, starting from the lower order places. In the illustrateed case, the left PE computes $S_{i,j}$, while the right PE computes $R_{i,j}$. Since v is 1 (v=1), $N_0'$ is also 1 provided that N is an odd number, so that the LSB of $S_{i,0}$ forms $M_i$ and is held in the register R1 of the right PE. $R_{i,j}$ is shown by being decomposed into $C_{i,j}$, $T_{i,j}$ and $L_{i,j}$. It is therefore clear that the algorithm P can be executed by employing k pieces of the circuit of FIG. 34 or 2·k pieces of PE of FIG. 33. It is thus understood that the computation of the formula (39) be efficiently done by parallel processing employing PEs of FIG. 33.

Although the foregoing description in regard to FIGS. 33 and 34 is based on an assumption of v=1, it will be clear that Montgomery modular multiplication can be executed by a method similar to that described hereinbefore, for any value of v which satisfies the condition of v<d.

Embodiment 7 of Montgomery Modular Multiplication/Modular Exponentiation Circuit The following systolic array can be constructed in order to execute the computation of the formula (14) in accordance with the following algorithm.

Algorithm Q:
   For i = 0 to k
      For j = 0 to m
         $S_{i,j} = T_{i-1,j+1} + up_v(S_{i,j-1}) + A_i \cdot B_j$
         $M_i = dw_v(dw_v(S_{i,0}) \cdot N_0')$
         $R_{i,j} = dw_v(S_{i,j}) + up_v(R_{i,j-1}) + M_i \cdot N_j$
         $T_{i,j} = dw_v(R_{i,j})$
         $C_{i,j} = up_v(R_{i,j})$
      Next
   Next The algorithm Q is different from the algorithm P in that $T_{i-1}$ of the formula (39) is realized by a clock deviation rather than by a bit deviation. The value $L_{i,j}$, which is generated due to bit deviation in the algorithm P, is not generated in the algorithm Q.

Figure 35:
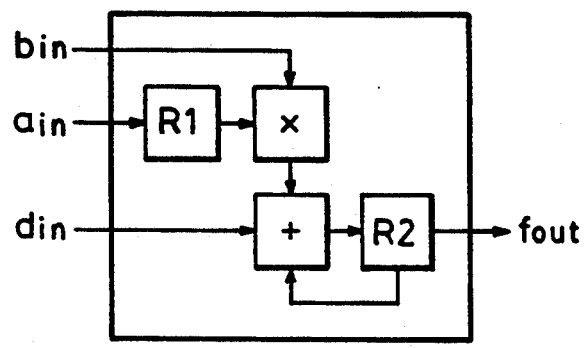
Figure 36:
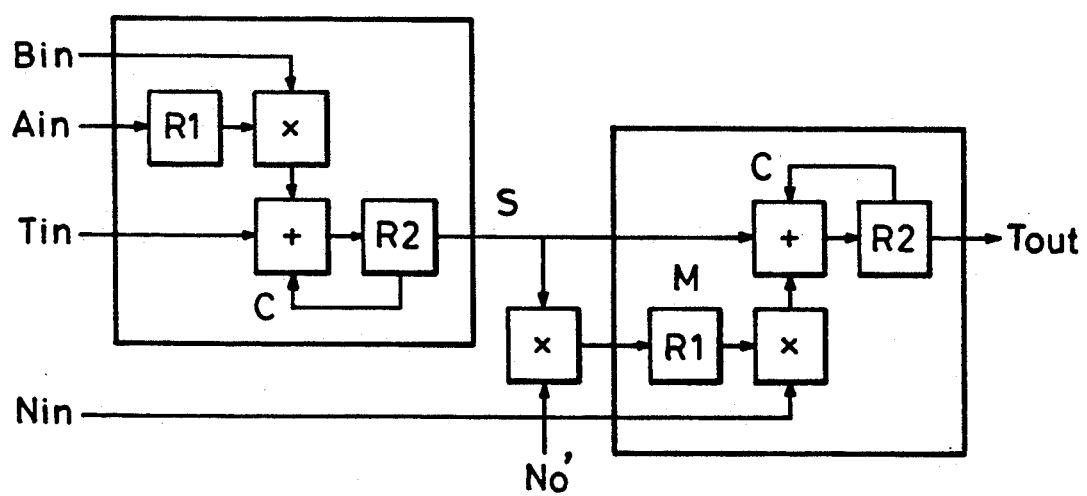

FIGS. 35 and 36 show a PE and a systolic array which execute computation of $R_{i,j}$, $T_{i,j}$ and $C_{i,j}$ in the algorithm O. Symbols j and i correspond to clocks and positions of PEs also in the algorithm Q. In the algorithm Q also, j and i respectively correspond to the clocks and the number of processing cycles. In FIG. 36, $B_{in}$ and $N_{in}$ respectively receive $B_j$ and $N_j$ ($j=0,\ldots,m-1$) starting from the lower order place.

The following description is based upon an assumption of v=d, for the purpose of simplification of explanation. Referring to FIG. 35, a symbol X indicates a multiplier for multiplying numbers each having d bits, while + indicates an adder. Symbol $R_1$ represents a register for holding Ai or Mi. A register R2 is a register which holds the output of the adder. Values in the v-th and higher bits of this register are fed back as a carry to the adder after a delay by one clock. It is therefore understood that the left and right PEs in FIG. 36 compute Si,j and Ri,j, respectively. In the meantime, Mi is multiplied by N0' by an external multiplier and the product is delivered to the right PE. It is thus understood that the PE of FIG. 26 is an efficient basis processing element for realizing the algorithm Q by a parallel processing.

Although the description taken in conjunction with FIGS. 35 and 36 are based on an assumption of v=d, it will be clear that Montgomery modular multiplication can be executed by a similar method for any value of v which meets the condition of V<d.

Figure 37:
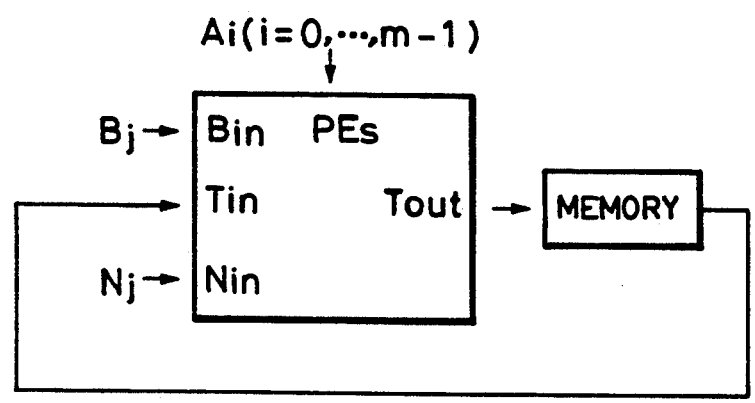

Embodiment 8 of Montgomery Modular Multiplication/Modular Exponentiation Circuit Montgomery modular exponentiation can be executed by repeating computation of the formula (39). The computation of the formula (39) can be performed by PE shown in FIGS. 33 and 35. By combining the PE with a memory as shown in FIG. 37, Montgomery modular exponentiation can be executed by using a single PA a plurality of times which is expressed by $(3 \cdot t/2+2) \cdot q$, where q is the number of PEs necessary for forming a Montgomery modular multiplication array. The number q is therefore 2·k in the arrangement of FIG. 33 and 2·(k+1) in the arrangement shown in FIG. 35. Therefore, when p pieces of PE are employed, the number of repetition is given by $(3 \cdot t/2+2) \cdot q/p$. Since the processing speed is in inverse proportion to the number of repetition, the method of Embodiment 5 can provide a processing speed proportional to the number of PEs employed. Furthermore, the efficiency of modular exponentiation circuit is never changed when the processing speed is increased or when the scale of the circuit is decreased by varying the number of the PEs.

Figure 38:
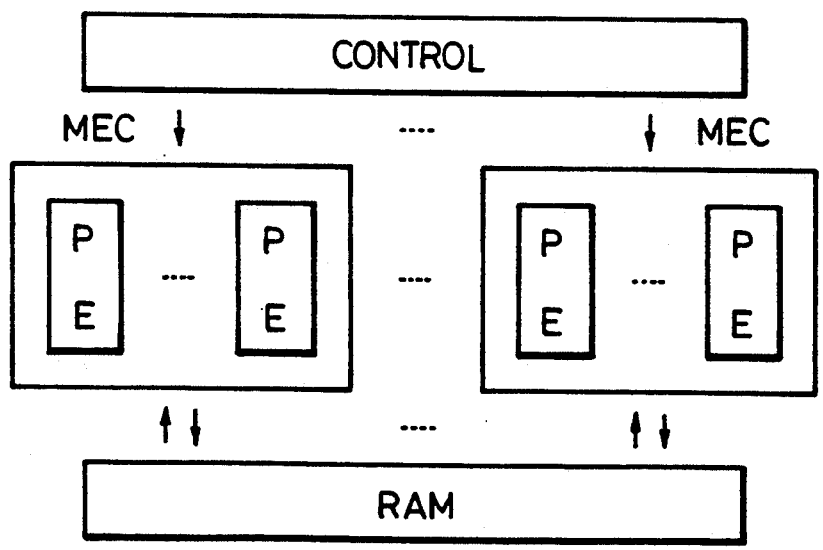
FIG. 38 is a circuit diagram showing the construction of a circuit which executes modular exponentiation and modular multiplication by using MEC.

It is therefore possible to construct an apparatus as shown in FIG. 38. In FIG. 32, MEC (Modular Exponentiation Chip) is a chip containing p pieces of PEs. The number p of the PEs can be freely selected within the range of $1 \leq p \leq (3 \cdot t/2+2) \cdot q$. It is therefore possible to construct chip of a desired Circuit scale. MEC has a regularity in its circuit construction so that it can easily be formed into an apparatus or in the form of a chip. The processing speed can be increased in proportion to the number of MECs, by using a desired number of SYMCs as shown in FIG. 26. The change in the number of MECs essentially requires a change in the number of the processing circuits for MECs. This, however, can easily be achieved by constructing a control circuit with an externally programmable ROM or the like device.

Other Embodiments of Montgomery Modular Multiplication/Modular Exponentiation Circuit In the algorithm of each of Embodiments described hereinbefore, the processing performed by each PE is a simple integer computation. Therefore, it is not essential that PEs are constructed in the form of a chip. Namely, Montgomery modular exponentiation apparatus can be realized without difficulty by an ordinary DSP or a CPU.

The Embodiments described hereinabove have regular circuit constructions and controls and delays are only local. These Embodiments, therefore, are optimum for production in the form of VLSIs.

It is also possible to use the combination of PEs of FIGS. 33 and 35 as a single PE.

The modular exponentiation/modular multiplication circuit of the present invention can be built up in the form of, for example, a VLSI when a specifically high speed of cryptosystem is required. The modular exponentiation/modular multiplication circuit of the present invention has a regular structure realized by simple PEs. In addition, the control of PEs and delay time in each PE are only local. The modular exponentiation/modular multiplication circuit, therefore, is most suitable for construction and use in the form of a VLSI. Thus, the present invention provides a high-speed cryptosystem.

When preference is given to reduction in size than to increase in the processing speed, such a demand is met by constructing the modular exponentiation/modular multiplication circuit of th invention by a fewer number of PEs. Such an arrangement also is easy to form a circuit without impairing the features provided by the use of PEs, i.e., regularity of the structure and locality of control and delay time. Furthermore, since the computation performed in each PE is a simple integer computation, a simple cryptosystem can be realized by software-type approach employing a CPU or a DSP which performs the computing process in accordance with the present invention.

A demand may arise for increase in the processing speed of a built-up cryptosystem of the invention employing a small-scale circuit such as MEC composed of several pieces of PE. Such a demand can easily be met by using a plurality of such small-scale circuits. Thus, according to the invention, it is possible to obtain a cryptosystem in which a desired increase in the processing speed can be attained simply by adding a module circuit, without requiring modification or alteration of the construction of such cryptic apparatus.

A demand also may arise to increase, after building up of a cryptosystem, the number of bits of the integers employed in the computation for the purpose of enhancing the effectiveness of the cryptosystem. This demand also can be met without difficulty when the same circuit as that already used in the system or a similar circuit containing an increased number of PEs is added to the existing cryptosystem. This owes to the fact that the modular exponentiation/modular multiplication circuit of the present invention enables an easy trade-off between the circuit scale and the number of the processing cycles, i.e., to the fact that any change in the bit numbers of integers employed in the computation can be dealt with by a change in the number of the processing cycles. It is therefore not necessary to rebuild the cryptic apparatus when there is a demand for increase in the cryptographic strength of the system. The same applies to the case where the numbers of bits of the integers are to be reduced. Namely, reduction in the bit numbers of the integers can easily be achieved without requiring rebuilding of the cryptic apparatus.

The described advantages brought about by the present invention cannot be achieved by known modular exponentiation/modular multiplication cryptographic scheme which does not employ parallel processing in an efficient manner. It is to be understood that a flexible and expandable cryptosystem can be realized by the circuit and method carrying out the modular exponentiation/modular multiplication scheme in accordance with the present invention.

Although the present invention has been described in its preferred form with a certain degree of particularity, many apparently widely different embodiments of the invention can be made without departing from the spirit and scope thereon. It is to be understood that the invention is not limited to the specific embodiments thereof except as defined in the appended claims.

What is claimed is:

1. A cryptic communication method using a communication apparatus which performs encryption or decryption of communication data by executing a modular multiplication $A \cdot B \bmod N$ of integers A and B using N as the modulus, said communication apparatus having at least one computing unit which computes and outputs $Z = U \cdot V \cdot R^{-1} \bmod N$ by using an integer R which is prime to N, said method comprising the steps of:
   inputting to one of said computing units A and a constant $R_R$ which is expressed by $R_R = R^2 \bmod N$, thereby causing the computing unit to output $A_R = R_R \cdot R^{-1} \bmod N$;
   inputting to one of said computing units B and said constant $R_R$, thereby causing said computing unit to output $B_R = B \cdot R_R \cdot R^{-1} \bmod N$;
   inputting to one of said computing units $A_R$ and $B_R$, thereby causing said computing unit to output $T_R = A_R \cdot R_R \cdot R^{-1} \bmod N$; and
   inputting to one of said computing units $T_R$ and a constant 1, thereby causing said computing unit to output, as Q, $T_R \cdot 1 \cdot R^{-1} \bmod N$, whereby said modular multiplication $Q = A \cdot B \bmod N$ is executed.

2. A cryptic communication method using a communication apparatus which performs encryption or decryption of a communication data by using a modular exponentiation $C = M^e \bmod N$ concerning integers M and e using N as the modulus, said communication apparatus having at least one computing unit which computes and outputs $Z = U \cdot V \cdot R^{-1} \bmod N$ by using, with respect to input data U and V, an integer R which is prime to N, said method comprising the steps of:
   inputting to one of said computing units M and a constant $R_R$ which is expressed by $R_R = R^2 \bmod N$, thereby causing said computing unit to output $M_R = M \cdot R_R \cdot R^{-1} \bmod N$;
   representing the binary expression of e by $e = [e^t, e^{t-1}, \ldots, e^1]$, determining the values of $e^i$ starting from the lowest order bit;
   representing the initial value of $C_R$ by $R_R \cdot R^{-1} \bmod N$, inputting $C_R$ and $M_R$ to one of said computing units when $e^i$ is determined to be equal to $e^i = 1$, thereby causing said computing unit to output $C_R \cdot M_R \cdot R^{-1} \bmod N$ as a new $C_R$;
   determining whether i of said $e^i$ is greater than 1 or not;
   inputting, when i is greater than 1, $C_R$ as two input data to one of said computing unit, thereby causing said computing unit to output, as new value of $C_R$, $C_R \cdot C_R \cdot R^{-1} \bmod N$; and
   after completion of processing on all $e^i$, inputting the $C_R$ and 1 as a constant to one of said computing units, thereby causing said computing unit to output, as the aimed C, $C = C_R \cdot 1 \cdot R^{-1} \bmod N$, whereby said modular exponentiation $C = M^3 \bmod N$ is executed.

3. A cryptic communication method according to claim 2, further comprising the step of inputting to one of said computing units a constant $R_R$ and a constant 1, thereby obtaining determining $R_R \cdot 1 \cdot R^{-1} \bmod N$ as the initial value of $C_R$.

4. A cryptic communication method using a communication apparatus which performs encryption or decryption of communication data by using a modular exponentiation $C = M^3 \bmod N$ concerning integers M and e using N as the modulus, said communication apparatus having at least one computing unit which computes and outputs $Z = U \cdot V \cdot R^{-1} \bmod N$ by using, with respect to input data U and V, an integer R which is prime to N, said method comprising the steps of:

inputting to one of said computing units M and a constant $R_R$ which is expressed by $R_R = R^2 \bmod N$, thereby causing said computing unit to output $M_R = M \cdot R_R \cdot R^{-1} \bmod N$;

representing the binary expression of e by $e = [e^t, e^{t-1}, \ldots, e^1]$, determining the values of $e^i$ starting from the highest order bit;

representing the initial value of $C_R$ by $R_R \cdot R^{-1} \bmod N$, inputting $C_R$ and $M_R$ to one of said computing units when $e^i$ is determined to be equal to 1, thereby causing said computing unit to output $C_R \cdot M_R \cdot R^{-1} \bmod N$ as a new $C_R$;

determining whether i of said $e^i$ is greater than t or not;

inputting, when i is smaller than t, $M_R$ as two input data to one of said computing units, thereby causing said computing unit to output, as a new value of $M_R$, $M_R \cdot M_R \cdot R^{-1} \bmod N$; and after completion of processing on all $e^i$, inputting $C_R$ and 1 as a constant to one of said computing units, thereby causing said computing unit to output, as the aimed C, $C = C_R \cdot b \cdot R^{-1} \bmod N$, whereby said modular exponentiation $C = M^e \bmod N$ is executed.

5. A cryptic communication method according to claim 4, further comprising the step of inputting to one of said computing units a constant $R_R \cdot 1 \cdot R^{-1} \bmod N$ as the initial value of $C_R$.

6. A cryptic communication method according to one of claims 1, 2, 4, 3 or 5, wherein said constant R and said input data U and V meet the conditions of:

$R = 2^{n+4}$, $U < 2^{n+u}$ and $V < 2^{n+u}$ for values u and r which meet either the conditions $U = 1$ and $r > 1$ or the conditions of $u > 1$ and $r = u + 1$, where n meets the condition of $N < 2^n$.

7. A cryptic communication method which employs encryption or decryption of a communication data by employing a modular multiplication $Q = A \cdot B \bmod N$ for input integers A and B using N as the modulus, said method comprising the steps of:

computing $A \cdot R \bmod N$ using the input A and an integer R which is prime to N, thus determining $A_R$ as the computation result;

computing $B \cdot R \bmod N$ using the input B and said R, thus determining $B_R$ as the computation result;

computing $A_R \cdot B_R \cdot R^{-1} \bmod N$ on the basis of said computing results $A_R$ and $B_R$ and said R, thus determining $T_R$ as the computation result; and computing $T_R \cdot R^{-1} \bmod N$ on the basis of said $T_R$ and said R, thus determining said Q as the computation result;

wherein the computation for determining said $T_R$ is executing by successively computing:

$$T_i = (T_{i-1} + A_i B_R \cdot Y + M_{i-1} N)/Y$$

$$M_{i-1} = (T_{i-1} \bmod Y) \cdot (-N^{-1} \bmod Y) \bmod Y$$

wherein Y equals to $2^v$ and $A_i$ are sections of $A_R$ obtained by dividing $A_R$ for every v bits, where v is an optional integer.

8. A cryptic communication method according to claim 7, wherein each of the successive computations for determining $T_R$ is executed by a single processing element, and the whole of the successive computaitons are performed by a pipe-line processing.

9. A cryptic communication method according to claim 7, wherein multiplication or division by Y in the successive computations for determining $T_R$ is performed by addition with a bit shift.

10. A cryptic communication method according to claim 7, wherein the successive computations for determining $T_R$ is conducted by computing $A_i \cdot B_{j-1}$ and $M_{i-1} \cdot N_j$, where $B_j$ and $N_j$ are sections of the $B_R$ and N obtained by dividing the $B_R$ and N at every d bits, and adding the computation result to the result $T_{i-1}$ of computation of the preceding computing cycle.

11. A cryptic communication method which employs encryption or decryption of a communication data by employing a modular multiplication $Q = A \cdot B \bmod N$ for input integers A and B using N as the modulus, said method comprising the steps of:

computing $A \cdot R \bmod N$ using the input A and an integer R which is prime to N, thus determining $A_R$ as the computation result;

computing $B \cdot R \bmod N$ using the input B and said R, thus determining $B_R$ as the computation result;

computing $A_R \cdot B_R \cdot R^{-1} \bmod N$ on the basis of said computing results $A_R$ and $B_R$ and said R, thus determining $T_R$ as the computation result; and computing $T_R \cdot R^{-1} \bmod N$ on the basis of said $T_R$ and said R, thus determining said Q as the computation result;

wherein the computation for determining said $T_R$ is executing by successively computing:

$$T_i = (T_{i-1}/Y + A_i B_R \cdot) + M_i N$$

$$M_{i-1} = (T_{i-1}/Y + A_i B_R) \bmod Y \cdot (-N^{-1} \bmod Y) \bmod Y$$

wherein Y equals to $2^v$ and $A_i$ are sections of $A_R$ obtained by dividing $A_R$ for every v bits, where v is an optional integer.

12. A cryptic communication according to claim 11, wherein each of the successive computations for determining $T_R$ is executed by a single processing element, and the whole of the successive computations are performed by pipe-line processing.

13. A cryptic communication method according to claim 11, wherein multiplication or division by Y in the successive computations for determining $T_R$ is performed by addition with bit shift.

14. A communication apparatus which performs encryption or decryption of a communication data by executing a modular multiplication $A \cdot B \bmod N$ of integers A and B by using N as the modulus, said communication apparatus comprising:

first computing means for computing $A_R = A \cdot R_R \cdot R^{-1} \bmod N$, upon receipt of A and a constant $R_R$ which is expressed by $R_R = R^2 \bmod N$, where R is an integer prime to N;

second computing means for computing $B_R = B \cdot R_R \cdot R^{-1} \bmod N$ upon receipt of said constant $R_R$ and B;

third computing means for computing $T_R = A_R \cdot B_R \cdot R^{-1} \bmod N$ upon receipt of $A_R$ and $B_R$ output from said first and second computing means; and fourth computing means for computing $T_R \cdot 1 \cdot R^{-1} \bmod N$ and outputting the computation result as said Q, upon receipt of TR output from said third computing means and a constant 1.

15. A communication apparatus which performs encryption or decryption of a communication data by using a modular exponentiation $C = M^e \bmod N$ concerning integers M and e using N as the modulus, said communication apparatus comprising:

first computing means for computing $M_R = M \cdot R_R \cdot R^{-1}$ mod N upon receipt of M and a constant $R_R$ which is expressed by $R_R = R^2$ mod N, where R is an integer prime to N;

first determining means for determining the values of $e^i$ starting from the highest order bit, wherein the binary expression of e is expressed by by $e = [e^t, e^{t-1}, \ldots, e^1]$;

storage means for updating and storing the value of $C_R$ by using $C_R = R_R \cdot R^{-1}$ mod N as the initial value;

second computing means which receives the $C_R$ stored in said storage means and $M_R$ computed by said first computing means when $e^i$ is determined to be equal to $e^i = 1$, thereby causing said computing unit to output $C_R \cdot M_R \cdot R^{-1}$ mod N as a new $C_R$;

second determining means for determining whether i of $e^i$ is greater than 1;

third computing means for receiving $C_R$ when i is determined by said second determining means to be greater than 1, and outputting, as new value of $C_R$, $C_R \cdot C_R \cdot R^{-1}$ mod N; and fourth computing means which computes, upon receipt of Cr stored in said storage means and 1 as a constant, $C = C_R \cdot 1 \cdot R^{-1}$ mod N after completion of computations performed by said second and third computing means on all the values of $e^i$, thereby outputting the computation result as said C.

16. A communication apparatus which performs encryption or decryption of a communication content by using a modular exponentiation $C = M^e$ mod N concerning integers M and e using N as the modulus, said communication apparatus comprising:

first computing means for computing $M_R = M \cdot R_R \cdot R^{-1}$ mod N upon receipt of M and a constant RR which is expressed by $R_R = R^2$ mod N;

first determining means for determining the values of $e^i$ starting from the lowest order bit, wherein the binary expression of e is expressed by by $e = [e^t, e^{t-1}, \ldots, e^1]$;

first storage means for updating and storing the value of $C_R$ by using $C_R = R_R \cdot R^{-1}$ mod N as the initial value;

second storage means for updating and storing the value of $M_R$ using the output of said first computing means as the initial value;

second computing means which receives the $C_R$ stored in said first storage means and $M_R$ computed by said first computing means when $e^i$ is determined to be equal to $e^i = 1$, thereby causing said computing unit to output $C_R \cdot M_R \cdot R^{-1}$ mod N as a new $C_R$;

second determining means for determining whether i of $e^i$ is smaller than t;

third computing means for receiving $M_R$ stored in said second storage means when i is determined by said second determining means to be smaller than t, and outputting, as new value of $M_R$, $M_R \cdot M_R \cdot R^{-1}$ mod N; and fourth computing means which computes, upon receipt of Cr stored in said first storage means and 1 as a constant, $C = C_R \cdot 1 \cdot R^{-1}$ mod N after completion of computations performed by said second and third computing means on all the values of $e^i$, thereby outputting the computation result as said C.

17. A cryptic communication method using a communication apparatus which performs encryption or decryption of communication data by using a modular exponentiation $C = M^e$ mod N concerning integers M and e using N as the modulus, said communication apparatus having a computing unit which computes and outputs $Z = U \cdot V \cdot R^{-1}$ mod N by using, with respect to input data U and V, an integer R which is prime to N, and having a selector which selects the input data for said computing unit, said method comprising the steps of:

selecting M and a constant $R_R$ which is expressed by $R_R = R^2$ mod N, by said selector;

inputting the selected M and $R_R$ to said computing unit, thereby causing said computing unit to output $M_R = M \cdot R_R \cdot R^{-1}$ mod N to said selector;

representing the binary expression of e by $e = [e^t, e^{t-1}, \ldots, e^1]$, determining the values of $e^i$ starting from the least significant bit;

representing the initial value of $C_R$ by $R_R \cdot R^{-1}$ mod N, selecting $C_R$ and $M_R$ by said selector when $e^i$ is determined to be equal to 1;

inputting the selected $C_R$ and $M_R$ to said computing unit, thereby causing said computing unit to output $C_R \cdot M_R \cdot R^{-1}$ mod N to said selector as a new $C_R$;

determining whether i of said $e^i$ is greater than 1 or not;

selecting, when i is greater than 1, $C_R$ as two input data by said selector;

inputting the selected $C_R$ to said computing unit, thereby causing said computing unit to output $C_R \cdot C_R \cdot R^{-1}$ mod N to said selector as a new value of $C_R$;

after completion of processing on all $e^i$, selecting $C_R$ and 1 by said selector; and inputting the selected $C_R$ and 1 to said computing unit, thereby causing said computing unit to output, as the aimed C, $C = C_R \cdot 1 \cdot R^{-1}$ mod N, whereby said modular exponentiation $C = M^e$ mod N is executed.

18. A cryptic communication method according to claim 17, further comprising the steps of:

selecting the constant $R_R$ and 1 by said selector; and inputting the selected $R_R$ and 1 to said computing unit, thereby causing said computing unit to output $R_R \cdot 1 \cdot R^{-1}$ mod N as the initial value of $C_R$.

19. A cryptic communication method using a communication apparatus which performs encryption or decryption of communication data by using a modular exponentiation $C = M^e$ mod N concerning integers M and e using N as the modulus, said communication apparatus having a computing unit which computes and outputs $Z = U \cdot V \cdot R^{-1}$ mod N by using, with respect to input data U and V, an integer R which is prime to N, and having a selector which selects the input data for said computing unit, said method comprising the steps of:

selecting M and a constant $R_R$ which is expressed by $R_R = R^2$ mod N, by said selector;

inputting the selected M and $R_R$ to said computing unit, thereby causing said computing unit to output $M_R = M \cdot R_R \cdot R^{-1}$ mod N to said selector;

representing the binary expression of e by $e = [e^t, e^{t-1}, \ldots, e^1]$, determining the values of $e^i$ starting from the least significant bit;

representing the initial value of $C_R$ by $R_R \cdot R^{-1}$ mod N, selecting $C_R$ and $M_R$ by said selector when $e^i$ is determined to be equal to 1;

inputting the selected $C_R$ and $M_R$ to said computing unit, thereby causing said computing unit to output $C_R \cdot M_R \cdot R^{-1}$ mod N to said selector as a new $C_R$;

determining whether i of said $e^i$ is greater than t or not;

selecting, when i is greater than t, $M_R$ as two input data by said selector;

inputting the selected $C_R$ to said computing unit, thereby causing said computing unit to output $M_R \cdot M_R \cdot R^{-1}$ mod N to said selector as a new value of $M_R$;

after completion of processing on all $e^i$, selecting $C_R$ and 1 by said selector; and inputting the selected $C_R$ and 1 to said computing unit, thereby causing said computing unit to output, as the aimed C, $C = C_R \cdot 1 \cdot R^{-1}$ mod N, whereby said modular exponentiation $C = M^e$ mod N is executed.

20. A cryptic communication method according to claim 19, further comprising the steps of:

selecting the constant $R_R$ and 1 by said selector; and inputting the selected $R_R$ and 1 to said computing unit, thereby causing said computing unit to output $R_R \cdot 1 \cdot R^{-1}$ mod N as the initial value of $C_R$.

* * * * *

UNITED STATES PATENT AND TRADEMARK OFFICE
CERTIFICATE OF CORRECTION

PATENT NO. : 5,321,752
DATED : June 14, 1994
INVENTOR(S) : Keiichi Iwamura, et al.

It is certified that error appears in the above-indentified patent and that said Letters Patent is hereby corrected as shown below:

On the title page, item [56] Other Publications:

Math of computation, vol. 44, 1985, pp.519-521, Montgomery, "Modular Multiplication without Trial Division".

Eurocrypt '90, Advance in Cryptology, May 1990, pp. 230-244, Dusse et al.

"A Cryptographic Library for the Motorola DSP 5600", IEEE J. Solid State Cir., Vol. 23, No. 1, Feb. 1988, pp. 204-207, Lu et al.

"A Programmable VLSI Architecture for Computing Multiplication etc.", Advances in Cryptology Crypto '90, pp. 619-624, Even Systolic Modular Multiplication.

Should Read:

"Modular Multiplication without Trial Division", Mathematics of Computation, vol. 44, No. 170, 1985, pp.519-521, Montgomery.

"A Cryptographic Library for the Motorola DSP 5600", Eurocrypt '90, Advances in Cryptology, May 1990, pp. 230-244, Dusse et al.

"A Programmable VLSI Architecture for Computing Multiplication etc.", IEEE J. Solid State Cir., Vol. 23, No. 1, Feb. 1988, pp. 204-207, Lu et al.

"Systolic Modular Multiplication", Advances in Cryptology-Crypto '90 Proceedings, pp. 619-624, Even.

UNITED STATES PATENT AND TRADEMARK OFFICE
CERTIFICATE OF CORRECTION

PATENT NO. : 5,321,752

DATED : June 14, 1994

INVENTOR(S) : KEIICHI IWAMURA, ET AL.

It is certified that error appears in the above-identified patent and that said Letters Patent is hereby corrected as shown below:

COLUMN 1

Line 22, "E," should read --C,--.

COLUMN 5

Line 49, " "$M_{i-1}=(T_{i-1}/Y+A_i \cdot B_R) \bmod Y) \cdot (-N^{-1} \bmod Y) \bmod Y$" should read --$M_{i-1}=((T_{i-1}/Y+A_i \cdot B_R) \bmod Y) \cdot (-N^{-1} \bmod Y) \bmod Y$--.

COLUMN 8

Line 68, "M" (second occurrence) should read --N--.

COLUMN 9

Line 3, "(coputation 1)" should read --(computation 1)--.
Line 4, "(coputation 1)" should read --(computation 1)--.
Line 30, "$N=A_{n-1} \cdot X^{n-1}+N_{n-2} \cdot X^{n-2}+$" should read --$N=N_{n-1} \cdot X^{n-1}+N_{n-2} \cdot X^{n-2}+$--.
Line 40, "$R=A \cdot B-Q \cdot N(Q=[A \cdot B/N])$" should read --$R=A \cdot B-Q \cdot N \ (Q=[A \cdot B/N])$--.

UNITED STATES PATENT AND TRADEMARK OFFICE
CERTIFICATE OF CORRECTION

PATENT NO. : 5,321,752
DATED : June 14, 1994
INVENTOR(S) : KEIICHI IWAMURA, ET AL.

It is certified that error appears in the above-identified patent and that said Letters Patent is hereby corrected as shown below:

COLUMN 16

Chart #2, "A81" should read --AB1-- and "A83" should read --AB3--.

COLUMN 18

Line 64, "(10)" should read --(11)--.

COLUMN 20

Chart #3, "a182" should read --a1B2--.

COLUMN 21

Line 64, "$T_{n-i}i=1,$" should read --$T_{n-i}$ (i=1,--.

COLUMN 23

Line 32, "$D_{k,n-i}$" should read --$D_{k,n-1}$--.

COLUMN 27

Line 25, "2n" should read --$2^n$--.

COLUMN 28

Line 45, "$T_R<2^{n+2u+1-4}$" should read --$T_R<2^{n+2u+1-v}$--.

COLUMN 29

Line 1, "$e_i 1$" should read --$e_i=1$--.

UNITED STATES PATENT AND TRADEMARK OFFICE
CERTIFICATE OF CORRECTION

PATENT NO. : 5,321,752

DATED : June 14, 1994

INVENTOR(S) : KEIICHI IWAMURA, ET AL.

It is certified that error appears in the above-identified patent and that said Letters Patent is hereby corrected as shown below:

COLUMN 42

Line 55, "$C=M^3$" should read --$C=M^e$--.
Line 65, "$C=M^3$" should read --$C=M^e$--.

COLUMN 43

Line 23, "$C=C_R \cdot b \cdot R^{-1}$" should read --$C=C_R \cdot 1 \cdot R^{-1}$--.
Line 32, "$R=2^{n+4}$," should read --$R=2^{n+v}$,--.
Line 33, "$U=1$" should read --$u=1$--.
Line 55, "$T_i=T_{i-1}+A_1 \cdot B_R \cdot Y+M_{i-1}N)/Y$" should read
--$T_i=T_{i-1}+A_1 \cdot B_R \cdot Y+M_{i-1} \cdot N)/Y$--.

COLUMN 44

Line 32, "$M_{i-1}=(T_{i-1}/Y+A_i \cdot B_R) \bmod Y) \cdot (-N^{-1} \bmod Y) \bmod Y$" should read --$M_{i-1}=((T_{i-1}/Y+A_i \cdot B_R) \bmod Y) \cdot (-N^{-1} \bmod Y) \bmod Y$--.

COLUMN 45

Line 42, "by" (second occurrence) should be deleted.

COLUMN 46

Line 27, "new $C_R$;" should read --new value of $C_R$;--.

COLUMN 47

Line 6, "a new $C_R$;" should read --new value of $C_R$;--.
Line 7, "greater" should read --smaller--.

UNITED STATES PATENT AND TRADEMARK OFFICE
CERTIFICATE OF CORRECTION

PATENT NO. : 5,321,752
DATED : June 14, 1994
INVENTOR(S) : KEIICHI IWAMURA, ET AL.

It is certified that error appears in the above-identified patent and that said Letters Patent is hereby corrected as shown below:

COLUMN 47

Line 9, "greater" should read --smaller--.

Signed and Sealed this

Seventh Day of March, 1995

Attest:

BRUCE LEHMAN

Attesting Officer  Commissioner of Patents and Trademarks